United States Patent [19]

Nakajima

[11] Patent Number: 5,063,264

[45] Date of Patent: Nov. 5, 1991

[54] CRYSTALLINE POLYOLEFIN COMPOSITION

[75] Inventor: Hirokazu Nakajima, Chiba, Japan

[73] Assignee: Chisso Corporation, Japan

[21] Appl. No.: 569,658

[22] Filed: Aug. 20, 1990

[30] Foreign Application Priority Data

Aug. 28, 1989 [JP] Japan ................................. 1-220947
Dec. 8, 1989 [JP] Japan ................................. 1-320138

[51] Int. Cl.$^5$ .............................................. C08K 5/51
[52] U.S. Cl. .................................. 524/118; 524/117; 524/251; 524/252; 524/394; 524/400; 524/127
[58] Field of Search ............... 524/117, 118, 127, 142, 524/144, 149, 251, 252, 394, 400

[56] References Cited

U.S. PATENT DOCUMENTS

| | | | |
|---|---|---|---|
| 4,185,006 | 1/1980 | Rashberger et al. ............... | 524/118 |
| 4,407,986 | 10/1983 | Nomura et al. ...................... | 524/400 |
| 4,820,772 | 4/1989 | Goto et al. ........................... | 524/117 |

FOREIGN PATENT DOCUMENTS

| | | |
|---|---|---|
| 0280938 | 9/1988 | European Pat. Off. . |
| 3122752 | 5/1988 | Japan ................................. 524/394 |
| 3125551 | 5/1988 | Japan ................................. 524/394 |
| 3284243 | 11/1988 | Japan ................................. 524/117 |
| 3284252 | 11/1988 | Japan ................................. 524/117 |
| 1104639 | 4/1989 | Japan ................................. 524/127 |
| 1104647 | 4/1989 | Japan ................................. 524/127 |

Primary Examiner—Paul R. Michl
Assistant Examiner—Peter Szekely
Attorney, Agent, or Firm—Leydig, Voit & Mayer

[57] ABSTRACT

A first crystalline polyolefin composition is provided, comprising 100 parts by weight of a crystalline polyolefin, (A) from 0.001 to 1 part by weight of a fluorophosphite compound represented by formula (I):

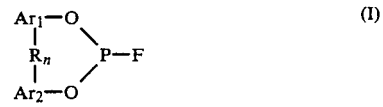

wherein R represents an alkylidene group having from 1 to 4 carbon atoms or a sulfur atom; $Ar_1$ and $Ar_2$, which may be the same or different, each represents an alkylarylene group or a cycloalkylarylene group; and n represents 0 or 1, and (B) from 0.001 to 1 part by weight of at least one of (1) an aliphatic monocarboxylic acid salt with lithium or sodium, (2) a dithiocarbamic acid salt with lithium, sodium or potassium, (3) a 2-mercaptobenzothiazole salt with lithium, sodium or potassium, (4) a 2-mercaptobenzimidazole salt with lithium, sodium or potassium and (5) a benzotriazole salt with lithium, sodium or potassium.

23 Claims, No Drawings

CRYSTALLINE POLYOLEFIN COMPOSITION

FIELD OF THE INVENTION

This invention relates to a crystalline polyolefin composition which provides molded articles excellent in stiffness and heat stiffness. More particularly, it relates to a crystalline polyolefin composition comprising a crystalline polyolefin and a specific amount each of a fluorophosphite compound having a specific structure and a specific metal salt which provides molded articles excellent in stiffness and heat stiffness or a crystalline polyolefin composition comprising a crystalline polyolefin and a specific amount each of a fluorophosphite compound having a specific structure, a specific metal compound and an aliphatic amine which provides molded articles excellent in stiffness and heat stiffness.

BACKGROUND OF THE INVENTION

In general, crystalline polyolefins are relatively cheap and have excellent mechanical properties and are therefore used for the production of injection molded articles, blow molded articles, films, sheets, fibers, etc. However, mechanical properties of crystalline polyolefins are not deemed sufficient in some uses, and application of crystalline polyolefins has thus been limited. In particular, they are inferior to polystyrene, ABS resins, and polyesters, e.g., polyethylene terephthalate and polybutylene terephthalate, in stiffness characteristics inclusive of stiffness and heat stiffness (the term "stiffness characteristics" will hereinafter include both stiffness and heat stiffness). In order to improve stiffness characteristics of crystalline polyolefins, various nucleating agents have been employed.

Molded articles obtained from crystalline polyolefin compositions containing various conventional nucleating agents have somewhat improved but still have unsatisfactory stiffness characteristics.

JP-A-63-227594 (the term "JP-A" as used herein means an "unexamined published Japanese patent application") discloses a composition comprising a crystalline polyolefin having incorporated therein an aromatic fluorophosphorus compound as an antioxidant and, if desired, a lubricant, e.g., calcium stearate, a nucleating agent, or a filler. However, the reference gives no suggestion about (1) a combined use of lithium stearate or sodium stearate as a lubricant, (2) a combined use of potassium stearate, strontium stearate or barium stearate as a lubricant, and an aliphatic amine, (3) a combined use of an aliphatic dicarboxylic acid alkali metal salt, an aromatic carboxylic acid alkali metal salt or an aluminum aromatic carboxylate as a nucleating agent, and an aliphatic amine, or (4) a combined use of magnesium hydroxide, aluminum hydroxide, magnesium oxide, magnesium carbonate or calcium carbonate as a filler, and an aliphatic amine, still less about an improvement in stiffness characteristics brought about by such combinations.

SUMMARY OF THE INVENTION

An object of this invention is to provide a crystalline polyolefin composition which provides molded articles free from the above-described problems and having improved stiffness characteristics.

The inventors have conducted extensive investigations and, as a result, found that a crystalline polyolefin composition comprising a crystalline polyolefin and a specific amount each of a fluorophosphite compound having a specific structure and a specific metal salt or a crystalline polyolefin composition comprising a crystalline polyolefin and a specific amount each of a fluorophosphite compound having a specific structure, a specific metal compound and an aliphatic amine provides molded articles having improved stiffness characteristics and thus reached the present invention.

The present invention consists in:

1) a crystalline polyolefin composition comprising 100 parts by weight of a crystalline polyolefin, from 0.001 to 1 part by weight of a fluorophosphite compound represented by formula (I) (hereinafter referred to as compound A):

wherein R represents an alkylidene group having from 1 to 4 carbon atoms or a sulfur atom; $Ar_1$ and $Ar_2$, which may be the same or different, each represents an alkylarylene group or a cycloalkylarylene group; and n represents 0 or 1, and from 0.001 to 1 part by weight of at least one compound (hereinafter referred to as Compound B) selected from the group consisting of (1) an aliphatic monocarboxylic acid salt with lithium or sodium, (2) a dithiocarbamic acid salt with lithium, sodium or potassium, (3) a 2-mercaptobenzothiazole salt with lithium, sodium or potassium, (4) a 2-mercaptobenzimidazole salt with lithium, sodium or potassium and (5) a benzotriazole salt with lithium, sodium or potassium;

2) a composition as described in 1) above, wherein the Compound A is 2,2'-bis(4,6-di-t-butylphenyl) fluorophosphite, 2,2'-methylenebis(4-methyl-6-t-butylphenyl) fluorophosphite, 2,2'-methylenebis(4,6-di-t-butylphenyl) fluorophosphite, 2,2'-ethylidenebis(4-methyl-6-t-butylphenyl) fluorophosphite, 2,2'-ethylidenebis(4,6-di-t-butylphenyl) fluorophosphite or 2,2'-thiobis(4-methyl-6-t-butylphenyl) fluorophosphite, or a mixture of two or more thereof;

3) a composition as described in 1) above, wherein the Compound B is lithium stearate, sodium stearate, lithium montanate, sodium montanate, lithium 12-hydroxyoctadecanoate, sodium 12-hydroxyoctadecanoate, lithium di-n-butyldithiocarbamate, sodium di-n-butyldithiocarbamate, potassium di-n-butyldithiocarbamate, lithium 2-benzothiazolethiolate, sodium 2-benzothiazolethiolate, potassium 2-benzothiazolethiolate, lithium 2-benzimidazolethiolate, sodium 2-benzimidazolethiolate, potassium 2-benzimidazolethiolate, lithium benzotriazole, sodium benzotriazole or potassium benzotriazole, or a mixture of two or more thereof.

4) a composition as described in 1) above, wherein the composition further comprises from 0.01 to 1 part by weight of an aliphatic amine (hereinafter referred to as Compound C) per 100 parts by weight of the crystalline polyolefin;

5) a composition as described in 4) above, wherein the Compound C is hexamethylenetetramine, triethanolamine, triisopropanolamine, N,N-bis(2-hydroxyethyl)-laurylamine, N,N-bis(2-hydroxyethyl)tridecylamine, N,N-bis((2-hydroxyethyl)myristylamine, N,N-bis(2-hydroxyethyl)pentadecylamine, N,N-bis(2-hydroxyethyl)palmitylamine, N,N-bis(2-hydroxyethyl)stearylamine, N,N-bis(2-hydroxyethyl)oleylamine, N,N-bis(2-hydroxyethyl)docosylamine, N,N-bis(2-hydroxyethyl)octacosylamine, N,N-bis(2-hydroxyethyl)cocoamine, or N,N-bis(2-hydroxyethyl)tallowamine, or a mixture of two or more thereof;

6) a composition as described in any of 1) to 5) above, wherein the composition further comprises from 0.01 to 25 parts by weight of an inorganic filler per 100 parts by weight of the crystalline polyolefin; and 7) a composition as described in 6) above, wherein the inorganic filler is talc, mica, clay, wollastonite, a zeolite, kaolin, bentonite, perlite, diatomaceous earth, asbestos, calcium carbonate, aluminum hydroxide, magnesium hydroxide, silicon dioxide, titanium dioxide, zinc oxide, magnesium oxide, zinc sulfide, barium sulfate, calcium silicate, aluminum silicate, glass fibers, potassium titanate, carbon fibers, carbon black, graphite or metallic fibers, or a mixture of two or more thereof.

The present invention also consists in:

8) a crystalline polyolefin composition comprising 100 parts by weight of a crystalline polyolefin, from 0.001 to 1 part by weight of Compound A, from 0.001 to 1 part by weight of at least one compound (hereinafter referred to as Compound B') selected from the group consisting of (1) an aliphatic monocarboxylic acid salt of potassium, strontium or barium, (2) a hydroxy-higher fatty acid salt with potassium, strontium or barium, (3) an aliphatic polycarboxylic acid salt with lithium, sodium, potassium, strontium or barium, (4) a salt of an aliphatic hydroxy acid having from 2 to 6 carbon atoms with lithium, sodium, potassium, magnesium, strontium or barium, (5) an aromatic carboxylic acid salt with lithium, sodium, strontium, barium or aluminum, (6) a glutamic acid salt with lithium, sodium, potassium, strontium or barium, (7) an aliphatic phosphoric acid salt with sodium, potassium, calcium, strontium or barium, (8) a lithium, sodium, potassium or barium salt of a cyclic phosphorus compound represented by formula (II):

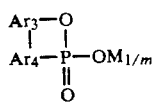

wherein $Ar_3$ and $Ar_4$, which may be the same or different, each represents an arylene group, an alkylarylene group, a cycloalkylarylene group, an arylarylene group or an aralkylarylene group; M represents lithium, sodium, potassium, or barium; and m represents an atomic valence of M, (9) magnesium or aluminum hydroxide, (10) magnesium oxide, (11) magnesium or calcium carbonate and (12) hydrotalcite, and from 0.01 to 1 part by weight of Compound C;

9) a composition as described in 8) above, wherein the Compound A is 2,2,'-bis(4,6-di-t-butylphenyl) fluorophosphite, 2,2'-methylenebis(4-methyl-6-t-butylphenyl) fluorophosphite, 2,2'-methylenebis(4,6-di-t-butylphenyl) fluorophosphite, 2,2'-ethylidenebis(4-methyl-6-t-butylphenyl) fluorophosphite, 2,2'-ethylidenebis(4,6-di-t-butylphenyl) fluorophosphite, or 2,2'-thiobis(4-methyl-6-t-butylphenyl) fluorophosphite, or a mixture of two or more thereof;

10) a composition as described in 8) above, wherein the Compound B' is potassium stearate, strontium stearate, barium stearate, potassium 12-hydroxyoctadecanoate, strontium 12-hydroxyoctadecanoate, barium 12-hydroxyoctadecanoate, lithium adipate, sodium adipate, potassium adipate, strontium adipate, barium adipate, lithium lactate, sodium lactate, potassium lactate, magnesium lactate, strontium lactate, barium lactate, lithium citrate, sodium citrate, potassium citrate, magnesium citrate, strontium citrate, barium citrate, lithium benzoate, sodium benzoate, strontium benzoate, barium benzoate, aluminum p-t-butylbenzoate, monolithium glutamate, monosodium glutamate, monopotassium glutamate, strontium glutamate, barium glutamate, sodium (mono- and di-mixed) stearylphosphate, potassium (mono- and di-mixed) stearylphosphate, calcium (mono- and di-mixed) stearylphosphate, strontium (mono- and di-mixed) stearylphosphate, barium (mono- and di-mixed) stearylphosphate, 10-hydroxy-9,10-dihydro-9-oxa-10-phosphaphenanthrene-10-oxide lithium salt, 10-hydroxy-9,10-dihydro-9-oxa-10-phosphaphenanthrene-10-oxide sodium salt, 10-hydroxy-9,10-dihydro-9-oxa-10-phosphaphenanthrene-10-oxide potassium salt, 10-hydroxy-9,10-dihydro-9-oxa-10-phosphaphenanthrene-10-oxide barium salt, magnesium hydroxide, aluminum hydroxide, magnesium oxide, magnesium carbonate, calcium carbonate or hydrotalcite, or a mixture of two or more thereof;

11) a composition as described in 8) above, wherein the Compound C is hexamethylenetetramine, triethanolamine, triisopropanolamine, N,N-bis(2-hydroxyethyl)laurylamine, N,N-bis(2-hydroxyethyl)tridecylamine, N,N-bis(2-hydroxyethyl)myristylamine, N,N-bis(2-hydroxyethyl)pentadecylamine, N,N-bis(2-hydroxyethyl)palmitylamine, N,N-bis(2-hydroxyethyl)stearylamine, N,N-bis(2-hydroxyethyl)oleylamine, N,N-bis(2-hydroxyethyl)docosylamine, N,N-bis(2-hydroxyethyl)octacosylamine, N,N-bis(2-hydroxyethyl)cocoamine or N,N-bis(2-hydroxyethyl)tallowamine, or a mixture of two or more thereof;

12) a composition as described in any of 8) to 11) above, wherein the composition further comprises from 0.01 to 25 parts by weight of an inorganic filler exclusive of magnesium hydroxide, aluminum hydroxide, magnesium oxide, magnesium carbonate and calcium carbonate per 100 pants by weight of the crystalline polyolefin;

13) a composition as described in 12) above, wherein the inorganic filler is talc, mica, clay, wollastonite, zeolite, kaolin, bentonite, perlite, diatomaceous earth, asbestos, silicon dioxide, titanium dioxide, zinc oxide, zinc sulfide, barium sulfate, calcium silicate, aluminum silicate, glass fiber, potassium titanate, carbon fiber, carbon black, graphite or metallic fiber, or a mixture of two or more thereof;

14) a composition as described in any of 1) to 13) above, wherein the crystalline polyolefin is a crystalline propylene homopolymer whose isotactic pentad ratio (P) and melt flow rate (MFR; output of a molten resin per 10 minutes at 230° C. under a load of 2.16 kg) satisfy a relationship of $1.00 \geq P \geq 0.015 \log MFR + 0.955$;

15) a composition as described in any of 1) to 13) above, wherein the crystalline polyolefin is a crystalline ethylene-propylene block copolymer having an ethylene content of from 3 to 20% by weight which is obtained by polymerizing propylene to prepare a propylene homopolymer whose isotactic pentad ratio (P) and melt flow rate (MFR) satisfy a relationship of $1.00 \geq P \geq 0.015 \log MFR + 0.955$, said propylene homopolymer being in a proportion of from 70 to 95% by weight based on the total polymer, and then polymerizing from 5 to 30% by weight, based on the total polymer, of ethylene or a mixture of ethylene and propylene through one or more stages;

16) a composition as described in any of 1) to 15) above, wherein the composition further comprises at least one of an antioxidant excluding Compound A, a light stabilizer and a metal deactivator;

17) a composition as described in any of 1) to 15) above, wherein the composition further comprises from 0.01 to 1 part by weight, per 100 parts by weight of the crystalline polyolefin, of an antioxidant selected from 2,6-di-t-butyl-p-cresol, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl)benzene, tris(3,5-di-t-butyl-4-hydroxybenzyl) isocyanurate, n-octadecyl-α-(4'-hydroxy-3',5'-di-t-butylphenyl) propionate, tris(4-t-butyl-3-hydroxy-2,6-dimethylbenzyl) isocyanurate, 3,9-bis[1,1-dimethyl-2-{α-(3-t-butyl-4-hydroxy-5-methylphenyl)propionyloxy}ethyl]-2,4,8,10-tetraoxaspiro[5.5]undecane, 2,2-bis[4-{2-(3,5-di-t-butyl-4-hydroxyphenylpropionyloxy)ethoxy}phenyl]propane, bis[2-(3'-t-butyl-2'-hydroxy-5'-methylbenzyl)-6-t-butyl-4-methylphenyl]terephthalate, bis[3,3-bis(4'-hydroxy-3'-t-butylphenyl)butyric acid] ethylene glycol ester, 2,2-thio-diethylenebis[3-(3,5-di-t-butyl-4-hydroxyphenyl) propionate], 4,4'-thiobis(6-t-butyl-3-methylphenol), 2,2'-methylenebis(6-t-butyl-4-methylphenol), 2,2'-ethylidenebis(4,6-di-t-butylphenol), calcium bis[O-ethyl-(3,5-di-t-butyl-4-hydroxybenzyl) phosphonate], 2-t-butyl-6-(3-t-butyl-2-hydroxy-5-methylbenzyl)-4-methylphenyl acrylate, tocopherol, dilauryl thiodipropionate, dimyristyl thiodipropionate, distearyl thiodipropionate, pentaerythritol tetrakis(3-laurylthiopropionate), distearyl disulfide, distearyl-pentaerythritol diphosphite, bis(2,4-di-t-butylphenyl)-pentaerythritol diphosphite, bis(2,6-di-t-butyl-4-methylphenyl)pentaerythritol diphosphite, bis(2,4,6-tri-t-butylphenyl)pentaerythritol diphosphite, tetrakis(2,4-di-t-butylphenyl)-4,4'-biphenylene diphosphonite, tris(2,4-di-t-butylphenyl) phosphite or 2,2'-methylenebis(4,6-di-t-butylphenyl)octyl phosphite, or a mixture of two or more thereof; and 18) a composition as described in any of 1) to 15) above, wherein the composition further comprises from 0.01 to 1 part by weight, per 100 parts by weight of the crystalline polyolefin, of a light stabilizer selected from 2-hydroxy-4-n-octoxybenzophenone, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2,4-di-t-butylphenyl 3',5'-di-t-butyl-4'-hydroxybenzoate, n-hexadecyl 3,5-di-t-butyl-4-hydroxybenzoate, bis(2,2,6,6-tetramethyl-4-piperidyl) succinate, bis(1,2,2,6,6-pentamethyl-4-piperidyl) succinate, bis(2,2,6,6-tetramethyl-4-piperidyl) sebacate, bis(1,2,2,6,6-pentamethyl-4-piperidyl) sebacate, bis(2,2,6,6-tetramethyl-4-piperidyl) 1,5-dioxaspiro[5.5]undecane-3,3-dicarboxylate, bis(1,2,2,6,6-pentamethyl-4-piperidyl) 1,5-dioxaspiro[5.5]undecane-3,3-dicarboxylate, tetrakis(2,2,6,6-tetramethyl-4-piperidyl) 1,2,3,4-butanetetracarboxylate, tetrakis-(1,2,2,6,6-pentamethyl-4-piperidyl) 1,2,3,4-butanetetracarboxylate, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane, poly[[6-[(1,1,3,3-tetramethylbutyl)imino]-1,3,5-triazine-2,4-diyl] [(2,2,6,6-tetramethyl-4-piperidyl)imino] hexamethylene[(2,2,6,6-tetramethyl-4-piperidyl)imino]], poly[[6-morpholino-1,3,5-triazine-2,4-diyl][(2,2,6,6-tetramethyl-4-piperidyl)imino] hexamethylene[(2,2,6,6-tetramethyl-4-piperidyl)imino]] or 1,5,8,12-tetrakis[4,6-bis(N-(1,2,2,6,6-pentamethyl-4-piperidyl)butylamino)-1,3,5-triazin-2-yl]-1,5,8,12-tetraazadodecane, or a mixture of two or more thereof.

DETAILED DESCRIPTION OF THE INVENTION

Crystalline polyolefins which can be used in the present invention include crystalline homopolymers of an α-olefin, e.g., ethylene, propylene, butene-1, pentene-1, 4-methylpentene-1, hexene-1 and octene-1; crystalline or low crystalline random copolymers or crystalline block copolymers of two or more of the above-described α-olefins; copolymers of the above-described α-olefin and vinyl acetate or an acrylic ester, or a saponification product thereof; copolymers of the above-described α-olefin and an unsaturated silane compound; copolymers of the above-described α-olefin and an unsaturated carboxylic acid or an anhydride thereof, or a reaction product between these copolymers and a metallic ion compound; modified polyolefins obtained by modifying the above-described crystalline α-olefin homopolymers, crystalline or low crystalline α-olefin random copolymers, or crystalline α-olefin block copolymers with an unsaturated carboxylic acid or a derivative thereof; and silane-modified polyolefins obtained by modifying the above-described crystalline α-olefin homopolymers, crystalline or low crystalline α-olefin random copolymers, or crystalline α-olefin block copolymers with an unsaturated silane compound. These crystalline polyolefins can be used either individually or in combinations of two or more thereof.

The crystalline polyolefin may be used in combination with various synthetic rubbers (e.g., a non-crystalline ethylene-propylene random copolymer, a non-crystalline ethylene-propylene-non-conjugated diene terpolymer, polybutadiene, polyisoprene, polychloroprene, chlorinated polyethylene, chlorinated polypropylene, a fluorine rubber, a styrene-butadiene rubber, an acrylonitrile-butadiene rubber, a styrene-butadiene-styrene block copolymer, a styrene-isoprene-styrene block copolymer, a styrene-ethylene-butylene-styrene block copolymer and a styrene-propylene-butylene-styrene block copolymer), thermoplastic synthetic resins (e.g., polystyrene, a styrene-acrylonitrile copolymer, an acrylonitrile-butadiene-styrene copolymer, polyamide, polyethylene terephthalate, polybutylene terephthalate, polycarbonate, polyvinyl chloride and a fluorine resin), petroleum resins (e.g., $C_5$-based petroleum resin, hydrogenated $C_5$-based petroleum resin, $C_9$-based petroleum resin, hydrogenated $C_9$-petroleum resin, $C_5$-$C_9$ copolymer petroleum resin, hydrogenated $C_5$-$C_9$ copolymer petroleum resin and acid-modified $C_9$-based petroleum resin), or DCPD resins, such as DCPD resins having a softening point of from 80° to 200° C. (e.g., cyclopentadiene-based petroleum resin, hydrogenated cyclopentadiene-based petroleum resin, cyclopentadiene-$C_5$ copolymer petroleum resin, hydrogenated cyclopentadiene-$C_5$ copolymer petroleum resin, cyclopentadiene-$C_9$ copolymer petroleum resin, hydrogenated cyclopentadiene-$C_9$ copolymer petroleum resin, cyclopentadiene-$C_5$-$C_9$ copolymer petroleum resin and hydrogenated cyclopentadiene-$C_5$-$C_9$ copolymer petroleum resin).

Preferred of the crystalline polyolefins are a crystalline propylene homopolymer; a crystalline propylene copolymer having a propylene content of at least 70% by weight, including a crystalline ethylene-propylene random copolymer, a crystalline propylene-butene-1 random copolymer, a crystalline ethylene-propylene-butene-1 terpolymer and a crystalline propylene-hexene-butene-1 terpolymer; and mixtures of two or more thereof.

In order to obtain further improved stiffness characteristics, it is particularly preferable to use a crystalline propylene homopolymer whose isotactic pentad ratio (P) and melt flow rate (MFR) satisfy the relationship of $1.00 \geq P \geq 0.015 \log MFR + 0.955$ (hereinafter referred to as HCPP(H)) or a crystalline ethylene-propylene block copolymer having an ethylene content of from 3 to 20% by weight which is obtained by polymerizing propylene to prepare a propylene homopolymer whose isotactic pentad ratio (P) and melt flow rate (MFR) satisfy the relationship of $1.00 \geq P \geq 0.015 \log MFR + 0.955$, the propylene homopolymer being in a proportion of from 70 to 95% by weight based on the total polymer, and then polymerizing from 5 to 30% by weight, based on the total polymer, of ethylene or a mixture of ethylene and propylene through one or more stages (hereinafter referred to a HCPP(B)).

HCPP(H) can be prepared by the process proposed by the inventors of the present invention and disclosed in JP-A-58-104907. That is, an organoaluminum compound (I) (e.g., triethylaluminum, diethylaluminum monochloride) or a reaction product (V) between an organoaluminum compound (I) and an electron donor (e.g., diisoamyl ether, ethylene glycol monomethyl ether) is reacted with titanium tetrachloride to obtain a solid product (II). The solid product (II) is then reacted with an electron donor and an electron acceptor (e.g., anhydrous aluminum chloride, titanium tetrachloride, vanadium tetrachloride) to obtain a solid product (III). Propylene is polymerized through one or more stages in the presence of a catalyst system comprising the resulting solid product (III), an organoaluminum compound (I) and an aromatic carboxylic acid ester (IV) (e.g., ethyl benzoate, methyl p-toluylate, ethyl p-toluylate, 2-ethylhexyl p-toluylate) at a (IV)/(III) molar ratio of from 0.1 to 10.0 (hereinafter referred to as catalyst (MC)) to obtain HCPP(H).

HCPP(B) can be prepared through a first stage in which from 70 to 95% by weight, based on the total polymer (except for polymers soluble in a polymerization solvent), of propylene is polymerized and then a second or later stage(s) in which ethylene or a mixture of ethylene and propylene is polymerized. In the second stage (or later stages), from 5 to 30% by weight, based on the above-specified total polymer, of ethylene or a mixture of ethylene and propylene is polymerized. The finally obtained polymer (except for the soluble polymers dissolved in a polymerization solvent) should have an ethylene content of from 3 to 20% by weight. Therefore, where propylene is polymerized in the first stage to a proportion of 70% by weight based on the total polymer, since the ethylene amount to be block copolymerized in the second stage is limited to 20% by weight or less, propylene or an α-olefin except for propylene and ethylene should be block copolymerized in the second stage to a proportion of from 10 to 27% by weight. Where propylene is polymerized in the first stage to an amount of 80% by weight, 20% by weight of ethylene alone may be polymerized in the second stage. Thus, as long as the stage in which ethylene is polymerized and the ethylene content in the total polymer are within the above-described limitations, the second stage can be carried out by block copolymerizing ethylene alone or in combination with propylene or other α-olefins through a single or multiple stages. In more detail, such HCPP(B) can be prepared by the process proposed by the inventors of the present invention and disclosed in JP-A-58-201816. That is, propylene is polymerized in the presence of catalyst (MC) to a proportion of from 70 to 95% by weight based on the total polymer and, then, from 5 to 30% by weight, based on the total polymer, of ethylene or a mixture of ethylene and propylene is polymerized through one or more stages so that the resulting copolymer has an ethylene content of from 3 to 20% by weight. The terminology "one stage" as used herein means one section of monomer feed either in a continuous system or in a batch system.

The terminology "isotactic pentad ratio (P)" as used herein means an isotactic ratio by a pentad unit in a propylene polymer molecular chain as determined by using $^{13}$C-NMR as described in *Macromolecules*, Vol. 6, No. 6, Nov.-Dec., pp. 925-926 (1973). In other words, an isotactic pentad ratio (P) means a ratio of a propylene monomer unit in which five propylene monomer base units are connected in isotacticity. In determining the isotactic pentad ratio, assignment of peaks in $^{13}$C-NMR spectra can be made according to the disclosure of *Macromolecules*, Vol. 8, No. 5, Sep.-Oct., pp. 687-689 (1975). In the examples hereinafter described, $^{13}$C-NMR analysis was conducted with an apparatus for FT-NMR (270 MHz), and the signal detection limit was broadened to 0.001 in terms of isotactic pentad ratio by integrating 7,000 measured values. Since, in general, crystalline propylene homopolymers having a low MFR have a low ratio (P), the lower limit of P corresponding to the MFR should be specified by the above-described relationship between P and MFR in HCPP(H) or HCPP(B). Being a ratio, P has an upper limit of 1.00 in nature, and MFR usually ranges from 0.05 to 100 g/10 min. MFR can be measured at 230° C. under a load of 2.16 kg in accordance with JIS K 7210. An ethylene content can be measured by infrared absorption spectrometry.

It is particularly preferable for obtaining further improved stiffness characteristics to use, as a crystalline polyolefin, an unleashed crystalline propylene polymer obtained by polymerizing in the presence of a highly active catalyst system containing a magnesium halide-supported titanium halide catalyst component and an organoaluminum catalyst component, and particularly a highly active and highly stereoregular catalyst system comprising the above-described highly active catalyst system combined with an electron donating catalyst component.

Compound A which can be used in the present invention includes 2,2'-bis(4,6-di-t-butylphenyl) fluorophosphite, 2,2'-bis(4-methyl-6-t-butylphenyl) fluorophosphite, 2,2'-bis(4-t-amyl-6-methylphenyl) fluorophosphite, 2,2'-bis(4-sec-eicosylphenyl) fluorophosphite, 2,2'-methylenebis(4-methyl-6-t-butylphenyl) fluorophosphite, 2,2'-methylenebis(4-ethyl-6-t-butylphenyl) fluorophosphite, 2,2'-methylenebis(4-methyl-6-nonylphenyl) fluorophosphite, 2,2'-methylenebis(4,6-dinonylphenyl) fluorophosphite, 2,2'-methylenebis(4-methyl-6-cyclohexylphenyl) fluorophosphite, 2,2'-methylenebis(4-methyl-6-(1'-methylcyclohexyl)phenyl) fluorophosphite, 2,2'-isopropylidenebis(4-nonylphenyl) fluorophosphite, 2,2'-butylidenebis(4,6-dimethylphenyl) fluorophosphite, 2,2'-methylenebis(4,6-di-t-butylphenyl) fluorophosphite, 2,2'-ethylidenebis(4-methyl-6-t-butylphenyl) fluorophosphite, 2,2'-ethylidenebis(4-ethyl-6-t-butylphenyl) fluorophosphite, 2,2'-ethylidenebis(4-sec-butyl-6-t-butylphenyl) fluorophosphite, 2,2'-ethylidenebis(4,6-di-t-butylphenyl) fluorophosphite, 2,2'-methylenebis(4-methyl-6-t-octylphenyl) fluorophosphite, 2,2'-butylidenebis(4-methyl-6-(1,-methylcyclohexyl)phenyl) fluorophosphite, 2,2'-methylenebis(4,6-dimethylphenyl) fluorophosphite, 2,2'-thiobis(4-t-octylphenyl) fluorophosphite, 2,2'-thiobis(4,6-di-sec-amylphenyl) fluorophosphite, 2,2'-thiobis(4,6-di-iso-octylphenyl) fluorophosphite, 2,2'-thiobis(5-t-butylphenyl) fluorophosphite, 2,2'-thiobis(4-methyl-6-t-butylphenyl) fluorophosphite, 2,2'-thiobis(4-methyl-6-α-methylbenzylphenyl) fluorophosphite, 2,2'-thiobis(3-methyl-4,6-di-t-butylphenyl) fluorophosphite, and 2,2'-thiobis(4t-amylphenyl) fluorophosphite. Preferred are 2,2'-bis(4,6-di-t-butylphenyl) fluorophosphite, 2,2'-methylenebis(4-methyl-6-t-butylphenyl) fluorophosphite, 2,2'-methylidenebis(4,6-di-t-butylphenyl) fluorophosphite, 2,2'-ethylidenebis(4-methyl-6-t-butylphenyl) fluorophosphite, 2,2'-ethylidenebis(4,6-di-t-butylphenyl) fluorophosphite, and 2,2'-thiobis(4-methyl-6-t-butylphenyl) fluorophosphite.

Compounds A can be prepared through the following reaction scheme according to the process described in JP-A-63-227594.

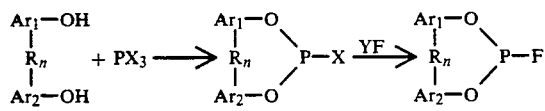

wherein R represents an alkylidene group having from 1 to 4 carbon atoms or a sulfur atom; Ar$_1$ and Ar$_2$, which may be the same or different, each represents an alkylarylene group or a cycloalkylarylene group; X represents a chlorine atom or a bromine atom; YF represents a fluorinating reagent; and n represents 0 or 1.

More specifically, Compound A can be synthesized by reacting a starting bisphenol compound with -phosphorus trichloride or tribromide to obtain a diarylene monochloro- or monobromophosphite, and then reacting the resulting phosphite with a fluorinating reagent (e.g., HF, LiF, NaF, KF, RbF, CsF, SbF$_3$, SbF$_5$, AgF, HgF$_2$, CoF$_3$, SF$_4$).

Compound A may also be prepared by the process disclosed in JP-A-1-135789, an improved process over that of JP-A-63-227594, in which the above-described reaction between a diarylene monochloro- or monobromo-phosphite and a fluorinating reagent is carried out in the presence of a hydrohalogenide of a pyridine compound (e.g., pyridine hydrochloride, pyridine hydrobromide, pyridine hydrofluoride, picoline hydrochloride, quinoline hydrochloride, nicotinyl hydrochloride, 2-aminopyridine hydrochloride, 2-phenylpyridine hydrochloride) as a fluorination accelerator.

Compounds A can be used either individually or in combination of two or more thereof. Compound A is used in an amount of from 0.001 to 1 part by weight, preferably from 0.01 to 0 5 part by weight, per 100 parts by weight of a crystalline polyolefin. If the amount of Compound A is less than 0.001 part by weight, the effect to improve stiffness characteristics cannot be sufficiently exerted. Amounts exceeding 1 part by weight, though usable, produce no further improving effect and are not only impractical but uneconomical.

Specific examples of Compound B which can be used in the present invention include lithium acetate, sodium acetate, lithium propionate, sodium propionate, lithium butyrate, sodium butyrate, lithium valerate, sodium valerate, lithium α-methylbutyrate, sodium α-methylbutyrate, lithium hexanonate, sodium hexanonate, lithium sorbate, sodium sorbate, lithium octanoate, sodium octanoate, lithium 2-ethylhexanoate, sodium 2-ethylhexanoate, lithium nonanoate, sodium nonanoate, lithium decanoate, sodium decanoate, lithium 9-decenoate, sodium 9-decenoate, lithium undecanoate, sodium undecanoate, lithium undecylenate, sodium undecylenate, lithium laurate, sodium laurate, lithium linderate, sodium linderate, lithium myristate, sodium myristate, lithium physeterate, sodium physeterate, lithium myristoleate, sodium myristoleate, lithium palmitate, sodium palmitate, lithium palmitoleate, sodium palmitoleate, lithium hiragoate, sodium hiragoate, lithium stearate, sodium stearate, lithium petroselinate, sodium petroselinate, lithium oleate, sodium oleate, lithium elaidate, sodium elaidate, lithium cis-11-octadecenoate, sodium cis-11-octadecenoate, lithium vaccenate, sodium vaccenate, lithium linolate, sodium linolate, lithium α-ereostearate, sodium α-ereostearate, lithium β-ereostearate, sodium β-ereostearate, lithium punicate, sodium punicate, lithium linolenate, sodium linolenate, lithium γ-linolenate, sodium γ-linolenate, lithium moroctate, sodium moroctate, lithium stearidonate, sodium stearidonate, lithium stearolate, sodium stearolate, lithium arachate, sodium arachate, lithium gadoleate, sodium gadoleate, lithium cis-11-eicosenoate, sodium cis-11-eicosenoate, lithium arachidonate, sodium arachidonate, lithium behenate, sodium behenate, lithium cetoleate, sodium cetoleate, lithium erucate, sodium erucate, lithium brassidate, sodium brassidate, lithium clupanodonate, sodium clupanodonate, lithium lignocerate, sodium lignocerate, lithium selacholeate, sodium selacholeate, lithium 4,8,12,15,18,21-tetracohexaenoate, sodium 4,8,12,15,18,21-tetracohexaenoate, lithium cerotate, sodium cerotate, lithium ximenate, sodium ximenate, lithium montanate, sodium montanate, lithium melissate, sodium melissate, lithium lumequeate, sodium lumequeate, lithium 2-hydroxytetradecanoate, sodium 2-hydroxytetradecanoate, lithium ipurolate, sodium ipurolate, lithium 2-hydroxyhexadecanoate, sodium 2-hydroxyhexadecanoate, lithium jalapinolate, sodium jalapinolate, lithium juniperate, sodium juniperate, lithium ambrettolate, sodium ambrettolate, lithium 9,10,16-trihydroxyhexadecanoate, sodium 9,10,16-trihydroxyhexadecanoate, lithium 2-hydroxyoctadecanotte, sodium 2-hydroxyoctadecanoate, lithium 12-hydroxyoctadecanoate, sodium 12-hydroxyoctadecanoate, lithium 18-hydroxyoctadecanoate, sodium 18-hydroxyoctadecanoate, lithium 9,10-dihydroxyoctadecanoate, sodium 9,10-dihydroxyoctadecanoate, lithium ricinoleate, sodium ricinoleate, lithium kamlolenate, sodium kamlolenate, lithium licanate, sodium licanate, lithium 22-hydroxydocosanoate, sodium 22-hydroxydocosanoate, lithium cerebronate, sodium cerebronate, lithium dimethyldithiocarbamate, sodium dimethyldithiocarbamate, potassium dimethyldithiocarbamate, lithium diethyldithiocarbamate, sodium diethyldithiocarbamate, potassium diethyldithiocarbamate, lithium di-n-butyldithiocarbamate, sodium di-n-butyldithiocarbamate, potassium di-n-butyldithiocarbamate, lithium dinonyldithiocarbamate, sodium dinonyldithiocarbamate, potassium dinonyldithiocarbamate, lithium dilauryldithiocarbamate, sodium dilauryldithiocarbamate, potassium dilauryldithiocarbamate, lithium ethylphenyldithiocarbamate, sodium methylphenyldithiocarbamate, potassium methylphenyldithiocarbamate, lithium ethylphenyldithiocarbamate, sodium ethylphenyldithiocarbamate, potassium ethylphenyldithiocarbamate, lithium diphenyldithiocarbamate, sodium diphenyldithiocarbamate, potassium diphenyldithiocarbamate, lithium ditolyldithiocarbamate, sodium ditolyldithiocarbamate, potassium ditolyldithiocarbamate, lithium dibenzyldithiocarbamate, sodium dibenzyldithiocarbamate, potassium dibenzyldithiocarbamate, lithium 2-benzothiazolethiolate, sodium 2-benzothiazolethiolate, potassium 2-benzothiazolethiolate, lithium 2-tolylthiazolethiolate, sodium 2-tolylthiazolethiolate, potassium 2-tolylthiazolethiolate, lithium 2-benzimidazolethiolate, benzimidazolethiolate, lithium 2-tolylimidazolethiolate, sodium 2-tolylimidazolethiolate, potassium 2-benzimidazolethiolate, lithium benzotriazole, sodium benzotriazole, potassium benzotriazole, lithium tolyltriazole, sodium tolyltriazole and potassium tolyltriazole. Preferred are lithium stearate, sodium stearate, lithium montanate, sodium montanate, lithium 12-hydroxyoctadecanoate, sodium 12-hydroxyoctadecanoate, lithium di-n-butyldithiocarbamate, sodium di-n-butyldithiocarbamate, potassium di-n-butyldithiocarbamate, lithium 2-benzothiazolethiolate, sodium 2-benzothiazolethiolate, potassium 2-benzothiazolethiolate, lithium 2-benzimidazolethiolate, sodium 2-benzimidazolethiolate, potassium 2-benzimidazolethiolate, lithium benzotriazole, sodium benzotriazole and potassium benzotriazole.

Compounds B may be used either individually or in combination of two or more thereof. Compound B is used in an amount of from 0.001 to 1 part by weight, preferably from 0.01 to 0.5 part by weight, per 100 parts by weight of a crystalline polyolefin. If the amount is less than 0.001 part by weight, the effect to improve stiffness characteristics cannot be sufficiently exerted. Amounts exceeding 1 part by weight, though usable, produce no further improving effect and are not only impractical but uneconomical.

Specific examples of Compound B' which can be used in the present invention include a potassium, strontium or barium salt of an aliphatic monocarboxylic acid, e.g., acetic acid, propionic acid, butyric acid, valeric acid, α-methylbutyric acid, hexanoic acid, sorbic acid, octanoic acid, 2-ethylhexanoic acid, nonanoic acid, decanoic acid, 9-decenic acid, undecanoic acid, undecylenic acid, lauric acid, linderic acid, myristic acid, physeteric acid, myristoleic acid, palmitic acid, palmitoleic acid, hiragoic acid, stearic acid, petroselinic acid, oleic acid, elaidic acid, cis-11-octadecenic acid, vaccenic acid, linolic acid, α-eleostearic acid, β-eleostearic acid, punicic acid, linolenic acid, γ-linolenic acid, moroctic acid, stearidonic acid, stearolic acid, arachic acid, gadoleic acid, cis-11-eicosenic acid, arachidonic acid, behenic acid, cetoleic acid, erucic acid, brassidic acid, clupanodonic acid, lignoceric acid, selacholeic acid, 4,8,12,15,18,21-tetracohexaenic acid, cerotic acid, ximenic acid, montanic acid, melissic acid, lumequeic acid, etc.; a potassium, strontium or barium salt of a hydroxy-higher fatty acid, e.g., 2-hydroxytetradecanoic acid, ipurolic acid, 2-hydroxyhexadecanoic acid, jalapinolic acid, juniperic acid, ambrettolic acid, 9,10,16-trihydroxyhexadecanic acid, 2-hydroxyoctadecanoic acid, 12-hydroxyoctadecanoic acid, 18-hydroxyoctadecanoic acid 9,10-dihydroxyoctadecanoic acid, ricinoleic acid, kamlolenic acid, licanic acid, 22-hydroxydocosanic acid, cerebronic acid, etc.; a lithium, sodium, potassium, strontium or barium salt of an aliphatic polycarboxylic acid, e.g., oxalic acid, malonic acid, succinic acid, glutaric acid, adipic acid, pimelic acid, suberic acid, azelaic acid, sebacic acid, 1,2,3-propanetricarboxylic acid, 1,2,3,4-butanetetracarboxylic acid, etc.; a lithium, sodium, potassium, magnesium, strontium or barium salt of an aliphatic hydroxy acid having from 2 to 6 carbon atoms, e.g., glycolic acid, lactic acid, hydroxyacrylic acid, α-hydroxybutyric acid, tartronic acid, glyceric acid, malic acid, tartaric acid, mesotartaric acid, racemic acid, citric acid, etc.; a lithium, sodium, strontium, barium or aluminum salt of an aromatic carboxylic acid, e.g., benzoic acid, o-toluylic acid, m-toluylic acid, p-toluylic acid, p-t-butylbenzoic acid, o-methoxybenzoic acid, m-methoxybenzoic acid, anisic acid, naphthoic acid, phthalic acid, isophthalic acid, terephthalic acid, trimellitic acid, pyromellitic acid, salicylic acid, 3,5-di-t-butyl-4-hydroxybenzoic acid, etc.; monolithium glutamate, monosodium glutamate, monopotassium glutamate, strontium glutamate, barium glutamate; a sodium, potassium, calcium, strontium or barium salt of an aliphatic phosphoric acid, e.g., (mono- and di-mixed) hexylphosphoric acid, (mono- and di-mixed) octylphosphoric acid, (mono- and di-mixed) 2-ethylhexylphosphoric acid, (mono- and di-mixed) decylphosphoric acid, (mono- and di-mixed) laurylphosphoric acid, (mono- and di-mixed) myristylphosphoric acid, (mono- and di-mixed) palmitylphosphoric acid, (mono- and di-mixed) stearylphosphoric acid, (mono- and di-mixed) oleylphosphoric acid, (mono- and di-mixed) linolphosphoric acid, (mono- and di-mixed) linolylphosphoric acid, (mono- and di-mixed) docosylphosphoric acid, (mono- and di-mixed) erucylphosphoric acid, (mono- and di-mixed) tetracosylphosphoric acid, (mono- and di-mixed) hexacosylphosphoric acid, (mono- and di-mixed) octacosylphosphoric acid, etc.; a lithium, sodium, potassium or barium salt of a cyclic phosphorus compound, e.g., 10-hydroxy-9,10-dihydro-9-oxa-10-phosphaphenanthrene-10-oxide, 1-methyl-10-hydroxy-9,10-dihydro-9-oxa-10-phosphaphenanthrene-10-oxide, 2-methyl-10-hydroxy-9,10-dihydro-9-oxa-10-phosphaphenanthrene-10-oxide, 6-methyl-10-hydroxy-9,10-hydro-9-oxa-10-phosphaphenanthrene-10-oxide, 7-methyl-10-hydroxy-9,10-dihydro-9-oxa-10-phosphaphenanthrene-10-oxide, 8-methyl-10-hydroxy-9,10-dihydro-9-oxa-10-phosphaphenanthrene-10-oxide, 6,8-dimethyl-10-hydroxy-9,10-dihydro-9-oxa-10-phosphaphenanthrene-10-oxide, 2,6,8-trimethyl-10-hydroxy-9,10-dihydro-9-oxa-10-phosphaphenanthrene-10-oxide, 2-ethyl-10-hydroxy-9,10-dihydro-9-oxa-10-phosphaphenanthrene-10-oxide, 6-ethyl-10-hydroxy-9,10-dihydro-9-oxa-10-phosphaphenanthrene-10-oxide, 8-ethyl-10-hydroxy-9,10-dihydro-9-oxa-10-phosphaphenanthrene-10-oxide, 6,8-diethyl-10-hydroxy-9,10-dihydro-9-oxa-10-phosphaphenanthrene-10-oxide, 2,6,8-triethyl-10-hydroxy-9,10-dihydro-9-oxa-10-phosphaphenanthrene-10-oxide, 2-isopropyl-10-hydroxy-9,10-dihydro-9-oxa-10-phosphaphenanthrene-10-oxide, 6-isopropyl-10-hydroxy-9,10-dihydro-9-oxa-10-phosphaphenanthrene-10-oxide, 8-isopropyl-10-hydroxy-9,10-dihydro-9-oxa-10-phosphaphenanthrene-10-oxide, 6,8-di-isopropyl-10-hydroxy-9,10-dihydro-9-oxa-10-phosphaphenanthrene-10-oxide, 2,6,8-tri-isopropyl-10-hydroxy-9,10-dihydro-9-oxa-10-phosphaphenanthrene-10-oxide, 2-sec-butyl-10-hydroxy-9,10-dihydro-9-oxa-10-phosphaphenanthrene-10-oxide, 6-sec-butyl-10-hydroxy-9,10-dihydro-9-oxa-10-phosphaphenanthrene-10-oxide, 8-sec-butyl-10-hydroxy-9,10-dihydro-9-oxa-10-phosphaphenanthrene-10-oxide, 1,8-di-sec-butyl-10-hydroxy-9,10-dihydro-9-oxa-10-phosphaphenanthrene-10-oxide, 2,6,8-tri-sec-butyl-10-hydroxy-9,10-dihydro-9-oxa-10-phosphaphenanthrene-10oxide, 2-t-butyl-10-hydroxy-9,10-dihydro-9-oxa-10-phosphaphenanthrene-10-oxide, 6-t-butyl-10-hydroxy-9,10-dihydro-9-oxa-10-phosphaphenanthrene-10-oxide, 8-t-butyl-10-hydroxy-9,10-dihydro-9-oxa-10-phosphaphenanthrene-10-oxide, 1,6-di-t-butyl-10-hydroxy-9,10-dihydro-9-oxa-10-phosphaphenanthrene-10-oxide, 2,6-di-t-butyl-10-hydroxy-9,10-dihydro-9-oxa-10-phosphaphenanthrene-10-oxide, 2,7-di-t-butyl-10-hydroxy-9,10-dihydro-9-oxa-10-phosphaphenanthrene-10-oxide, 2,8-di-t-butyl-10-hydroxy-9,10-dihydro-9-oxa-10-phosphaphenanthrene-10-oxide, 6,8-di-t-butyl-10-hydroxy-9,10-dihydro-9-oxa-10-phosphaphenanthrene-10-oxide, 2,6,8-tri-t-butyl-10-hydroxy-9,10-dihydro-9-oxa-10-phosphaphenanthrene-10-oxide, 2-t-amyl-10-hydroxy-9,10-dihydro-9-oxa-10-phosphaphenanthrene-10-oxide, 6-t-amyl-10-hydroxy-9,10-dihydro-9-oxa-10-phosphaphenanthrene-10-oxide, 8-t-amyl-10-hydroxy-9,10-dihydro-9-oxa-10-phosphaphenanthrene-10-oxide, 6,8-di-t-amyl-10-hydroxy-9,10-dihydro-9-oxa-10-phosphaphenanthrene-10-oxide, 2,6,8-tri-t-amyl-10-hydroxy-9,10-dihydro-9-oxa-10-phosphaphenanthrene-10-oxide, 2-t-octyl-10-hydroxy-9,10-dihydro-9-oxa-10-phosphaphenanthrene-10-oxide, 6-t-octyl-10-hydroxy-9,10-dihydro-9-oxa-10-phosphaphenanthrene-10-oxide, 8-t-octyl-10-hydroxy-9,10-dihydro-9-oxa-10-phosphaphenanthrene-10-oxide, 6,8-di-t-octyl-10-hydroxy-9,10-dihydro-9-oxa-10-phosphaphenanthrene-10-oxide, 2,6,8-tri-t-octyl-10-hydroxy-9,10-dihydro-9-oxa-10-phosphaphenanthrene-10-oxide, 2-cyclohexyl-10-hydroxy-9,10-dihydro-9-oxa-10-phosphaphenanthrene-10-oxide, 6-cyclohexyl-10-hydroxy-9,10-dihydro-9-oxa-10-phosphaphenanthrene-10-oxide, 8-cyclohexyl-10-hydroxy-9,10-dihydro-9-oxa-10-phosphaphenanthrene-10-oxide, 6,8-dicyclohexyl-10-hydroxy-9,10-dihydro-9-oxa-10-phosphaphenanthrene-10-oxide, 2,6,8-tricyclohexyl-10-hydroxy-9,10-dihydro-9-oxa-10-phosphaphenanthrene-10-oxide, 6-phenyl-10-hydroxy-9,10-dihydro-9-oxa-10-phosphaphenanthrene-10-oxide, 2-benzyl-10-hydroxy-9,10-dihydro-9-oxa-10-phosphaphenanthrene-10-oxide, 6-benzyl-10-hydroxy-9,10-dihydro-9-oxa-10-phosphaphenanthrene-10-oxide, 8-benzyl-10-hydroxy-9,10-dihydro-9-oxa-10-phosphaphenanthrene-10-oxide, 6,8-dibenzyl-10-hydroxy-9,10-dihydro-9-oxa-10-phosphaphenanthrene-10-oxide, 2,6,8-tribenzyl-10-hydroxy-9,10-dihydro-9-oxa-10-phosphaphenanthrene-10-oxide, 2-(α-methylbenzyl)-10-hydroxy-9,10-dihydro-9-oxa-10-phosphaphenanthrene-10-oxide, 6-(α-methylbenzyl)-10-hydroxy-9,10-dihydro-9-oxa-10-phosphaphenanthrene-10-oxide, 8-(α-methylbenzyl)-10-hydroxy-9,10-dihydro-9-oxa-10-phosphaphenanthrene-10-oxide, 6,8-di(α-methylbenzyl)-10-hydroxy-9,10-dihydro-9-oxa-10-phosphaphenanthrene-10-oxide, 2,6,8-tri(α-methylbenzyl)-10-hydroxy-9,10-dihydro-9-oxa-10-phosphaphenanthrene-10-oxide, 2,6-di(α,α-dimethylbenzyl)-10-hydroxy-9,10-dihydro-9-oxa-10-phosphaphenanthrene-10-oxide, 6-t-butyl-8-methyl-10-hydroxy-9,10-dihydro-9-oxa-10-phosphaphenanthrene-10-oxide, 6-benzyl-8-methyl-10-hydroxy-9,10-dihydro-9-oxa-10-phosphaphenanthrene-10oxide, 6-cyclohexyl-8-t-butyl-10-hydroxy-9,10-dihydro-9-oxa-10-phosphaphenanthrene-10oxide, 6-benzyl-8-t-butyl-10-hydroxy-9,10-dihydro-9-oxa-10-phosphaphenanthrene-10-oxide, 6-(α-methylbenzyl)-8-t-butyl-10-hydroxy-9,10-dihydro-9-oxa-10-phosphaphenanthrene-10-oxide, 6-t-butyl-8-cyclohexyl-10-hydroxy-9,10-dihydro-9-oxa-10-phosphaphenanthrene-10-oxide, 6-benzyl-8-cyclohexyl-10-hydroxy-9,10-dihydro-9-oxa-10-phosphaphenanthrene-10-oxide, 6-t-butyl-8-benzyl-10-hydroxy-9,10-dihydro-9-oxa-10-phosphaphenanthrene-10-oxide, 6-cyclohexyl-8-benzyl-10-hydroxy-9,10-dihydro-9-oxa-10-phosphaphenanthrene-10-oxide, 2,6-di-t-butyl-8-benzyl-10-hydroxy-9,10-dihydro-9-oxa-10-phosphaphenanthrene-10-oxide, 2,6-dicyclohexyl-8-benzyl-10-hydroxy-9,10-dihydro-9-oxa-10-phosphaphenanthrene-10-oxide, etc.; magnesium hydroxide, aluminum hydroxide, magnesium oxide, magnesium carbonate, calcium carbonate and hydrotalcite. Preferred are potassium stearate, strontium stearate, barium stearate, potassium 12-hydroxyoctadecanoate, strontium 12-hydroxyoctadecanoate, barium 12-hydroxyoctadecanoate, lithium adipate, sodium adipate, potassium adipate, strontium adipate, barium adipate, lithium lactate, sodium lactate, potassium lactate, magnesium lactate, strontium lactate, barium lactate, lithium citrate, sodium citrate, potassium citrate, magnesium citrate, strontium citrate, barium citrate, lithium benzoate, sodium benzoate, strontium benzoate, barium benzoate, aluminum p-t-butylbenzoate, monolithium glutamate, monosodium glutamate, monopotassium glutamate, strontium glutamate, barium glutamate, sodium (mono- and di-mixed) stearylphosphate, potassium (mono-and di-mixed) stearylphosphate, calcium (mono- and di-mixed) stearylphosphate, strontium (mono- and di-mixed) stearylphosphate, barium (mono- and di-mixed) stearylphosphate, 10-hydroxy-9,10-dihydro-9-oxa-10-phosphaphenanthrene-10-oxide lithium salt, 10-hydroxy-9,10-dihydro-9-oxa-10-phosphaphenanthrene-10-oxide sodium salt, 10-hydroxy-9,10-dihydro-9-oxa-10-phosphaphenanthrene-10-oxide potassium salt, 10-hydroxy-9,10-dihydro-9-oxa-10-phosphaphenanthrene-10-oxide barium salt, magnesium hydroxide, aluminum hydroxide, magnesium oxide, magnesium carbonate, calcium carbonate and hydrotalcite.

The Compounds B' can be used either individually or in combination of two or more thereof. Compound B' is used in an amount of from 0.001 to 1 part by weight, preferably from 0.01 to 0.5 part by weight, per 100 parts by weight of a crystalline polyolefin. If the amount is less than 0.001 part by weight, the effect to improve stiffness characteristics cannot be sufficiently exerted. Amounts exceeding 1 part by weight, though usable, produce no further improving effect and are not only impractical but uneconomical.

The composition as described in 1) above preferably contains Compound C to obtain synergistically ensured effects to improve stiffness characteristics.

Specific examples of Compound C which can be used in the present invention include octylamine, laurylamine, myristylamine, palmitylamine, stearylamine, oleylamine, cocoamine, tallowamine, soyamine, N,N-dicocoamine, N,N-ditallowamine, N,N-disoyamine, N-lauryl-N,N-dimethylamine, N-myristyl-N,N-dimethylamine, N-palmityl-N,N-dimethylamine, N-stearyl-N,N-dimethylamine, N-coco-N,N-dimethylamine, N-tallow-N,N-dimethylamine, N-soy-N,N-dimethylamine, N-methyl-N,N-ditallowamine, N-methyl-N,N-dicocoamine, N-oleyl-1,3-diaminopropane, N-tallow-1,3-diaminopropane, hexamethylenediamine, N-lauryl-N,N,N-trimethylammonium chloride, N-palmityl-N,N,N-trimethylammonium chloride, N-stearyl-N,N,N-trimethylammonium chloride, N-docosyl-N,N,N-trimethylammonium chloride, N-coco-N,N,N-trimethylammonium chloride, N-tallow-N,N,N-trimethylammonium chloride, N-soy-N,N,N-trimethylammonium chloride, N,N,N-triethyl-N-benzylammonium chloride, N-lauryl-N,N-dimethyl-N-benzylammonium chloride, N-myristyl-N,N-dimethyl-N-benzylammonium chloride, N-stearyl-N,N-dimethyl-N-benzylammonium chloride, N-coco-N,N-dimethyl-N-benzylammonium chloride, N,N-dioleyl-N,N-dimethylammonium chloride, N,N-dicoco-N,N-dimethylammonium chloride, N,N-ditallow-N,N-dimethylammonium chloride, N,N-disoy-N,N-dimethylammonium chloride, N,N-bis(2-hydroxyethyl)-N-lauryl-N-methylammonium chloride, N,N-bis(2-hydroxyethyl)-N-stearyl-N-methylammonium chloride, N,N-bis(2-hydroxyethyl)-N-oleyl-N-methylammonium chloride, N,N-bis(2-hydroxyethyl)-N-coco-N-methylammonium chloride, N,N-bis(polyoxyethylene)-N-lauryl-N-methylammonium chloride, N,N-bis(polyoxyethylene)-N-stearyl-N-methylammonium chloride, N,N-bis(polyoxyethylene)-N-oleyl-N-methylammonium chloride, N,N-bis(polyoxyethylene)-N-coco-N-methylammonium chloride, N,N-bis(2-hydroxyethyl)-laurylaminobetaine, N,N-bis(2-hydroxyethyl)-tridecylaminobetaine, N,N-bis(2-hydroxyethyl)myristylaminobetaine, N,N-bis(2-hydroxyethyl)pentadecylaminobetaine, N,N-bis(2-hydroxyethyl)palmitylaminobetaine, N,N-bis(2-hydroxyethyl)stearylaminobetaine, N,N-bis(2-hydroxyethyl)oleylaminobetaine, N,N-bis(2-hydroxyethyl)docosylaminobetaine, N,N-bis(2-hydroxyethyl)octacosylaminobetaine, N,N-bis(2-hydroxyethyl)cocoaminobetaine, N,N-bis(2-hydroxyethyl)tallowaminobetaine, hexamethylenetetramine, triethanolamine, triisopropanolamine, N-(2-hydroxyethyl)laurylamine, N-(2-hydroxyethyl)tridecylamine, N-(2-hydroxyethyl)myristylamine, N-(2-hydroxyethyl)pentadecylamine, N-(2-hydroxyethyl)palmitylamine, N-(2-hydroxyethyl)stearylamine, N-(2hydroxyethyl)oleylamine, N-(2-hydroxyethyl)docosylamine, N-(2-hydroxyethyl)octacosylamine, N-(2-hydroxyethyl)cocoamine, N-(2-hydroxyethyl)tallowamine, N-methyl-N-(2-hydroxyethyl)hydroxyethyl)pentadecylamine, N-methyl-N-(2-hydroxyethyl)palmitylamine, N-methyl-N-(2-hydroxyethyl)stearylamine, N-methyl-N-(2-hydroxyethyl)oleylamine, N-methyl-N-(2-hydroxyethyl)docosylamine, N-methyl-N-(2-hydroxyethyl)octacosylamine, N-methyl-N-(2-hydroxyethyl)cocoamine, N-methyl-N-(2-hydroxyethyl)tallowamine; N,N-bis(2-hydroxyethyl) aliphatic amines, e.g., N,N-bis(2-hydroxyethyl)laurylamine, N,N-bis(2-hydroxyethyl)tridecylamine, N,N-bis(2-hydroxyethyl)myristylamine, N,N-bis(2-hydroxyethyl)pentadecylamine, N,N-bis(2-hydroxyethyl)palmitylamine, N,N-bis(2-hydroxyethyl)stearylamine, N,N-bis(2-hydroxyethyl)oleylamine, N,N-bis(2-hydroxyethyl)docosylamine, N,N-bis(2-hydroxyethyl)octacosylamine, N,N-bis(2-hydroxyethyl)cocoamine, N,N-bis(2-hydroxyethyl)tallowamine, etc.; mono- or diesters of these N,N-bis(2-hydroxyethyl) aliphatic amines with fatty acids, e.g., lauric acid, myristic acid, palmitic acid, stearic acid, oleic acid, behenic acid, erucic acid, etc.; polyoxyethylene laurylamino ether, polyoxyethylene stearylamino ether, polyoxyethylene oleylamino ether, polyoxyethylene cocoamino ether, polyoxyethylene tallowamino ether, N,N,N',N,-tetra(2-hydroxyethyl)-1,3-diaminopropane, N,N,N',N,-tetra(2-hydroxyethyl)-1,6-diaminohexane, N-lauryl-N,N',N'-tris(2-hydroxyethyl)-1,3-diaminopropane, N-stearyl-N,N',N'-tris(2-hydroxyethyl)-1,3-diaminopropane, N-coco-N,N',N'-tris(2-hydroxyethyl)-1,3-diaminopropane, N-tallow-N,N',N'-tris(2-hydroxyethyl)-1,3-diaminopropane, N,N-dicoco-N',N'-bis(2-hydroxyethyl)-1,3-diaminopropane, N,N-ditallow-N',N'-bis(2-hydroxyethyl)-1,3-diaminopropane, N-coco-N,N',N'-tris(2-hydroxyethyl)-1,6-diaminohexane, N-tallow-N,N',N'-tris(2-hydroxyethyl)-1,6-diaminohexane, N,N-dicoco-N',N'-bis(2-hydroxyethyl)-1,6-diaminohexane and N,N-ditallow-N',N'-bis(2-hydroxyethyl)-1,6-diaminohexane. Preferred are N,N-bis(2-hydroxyethyl) aliphatic amines. These Compounds C can be used either individually or in combination of two or more thereof.

Compound C is used in an amount of from 0.01 to 1 part by weight, preferably from 0.05 to 0.5 part by weight, per 100 parts by weight of a crystalline polyolefin.

Stiffness characteristics of the composition according to the present invention can be synergistically improved by using an inorganic filler, excluding Compound B', in combination.

Specific examples of suitable inorganic fillers are talc, mica, clay, wollastonite, a zeolite, kaolin, bentonite, perlite, diatomaceous earth, asbestos, silicon dioxide, titanium dioxide, zinc oxide, zinc sulfide, barium sulfate, calcium silicate, aluminum silicate, glass fiber, potassium titanate, carbon fiber, carbon black, graphite and metallic fibers. Particularly preferred is talc. These inorganic fillers may be treated with a surface treating agent, such as coupling agents (e.g., silane compounds, titanate compounds, boron compounds, aluminate compounds, zircoaluminate compounds).

Inorganic fillers which may be added to the composition as described in 6) above further include, in addition to those enumerated above, calcium carbonate, aluminum hydroxide, magnesium hydroxide and magnesium oxide, each of which may be treated with the above-described surface treating agent, e.g., coupling agents.

These inorganic fillers may be used either individually or in combination of two or more thereof. The inorganic filler is used in an amount of from 0.01 to 25 parts by weight, preferably from 0.1 to 20 parts by eight, and more preferably from 1 to 15 parts by weight, per 100 parts by weight of a crystalline polyolefin.

Thermooxidative stability of the composition of the invention can be improved by using a phenol antioxidant in combination. Specific examples of suitable phenol antioxidants are 2,6-di-t-butyl-p-cresol, 2-t-butyl-4,6-dimethylphenol, 2,6-di-t-butyl-4-ethylphenol, 2,6-di-t-butyl-4-n-butylphenol, 2,6-di-isobutyl-4-n-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol n-octadecyl-β-(4'-hydroxy-3',5'-di-t-butylphenyl)propionate, 2,6-di-t-butyl-4-methoxyphenol, 2,5-di-t-butylhydroquinone, 2,5-di-t-amylhydroquinone, 2,2'-thiobis(6-t-butyl-4-methylphenol), 2,2'-thiobis(4-octylphenol), 2,2'-thiobis(6-t-butyl-3-methylphenol), 4,4'-thiobis(6-t-butyl-2-methylphenol), 4,4'-thiobis(6-t-butyl-3-methylphenol), 4,4'-thiobis(2,6-di-t-butylphenol), 2,2'-methylenebis(6-t-butyl-4-methylphenol), 2,2'-methylenebis(6-t-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis[6-(α-methylbenzyl)-4-nonylphenol], 2,2'-methylenebis[6-(α,α-dimethylbenzyl)-4-nonylphenol], 2,2'-methylenebis(4,6-di-t-butylphenol), 2,2'-ethylidenebis(4,6-di-t-butylphenol), 2,2'-ethylidenebis(6-t-butyl-4-isobutylphenol), 4,4'-methylenebis(2,6-di-t-butylphenol), 4,4'-methylenebis(6-t-butyl-2-methylphenol), 4,4'- butylidenebis(6-t-butyl-2-methylphenol), 4,4'-butylidenebis(6-t-butyl-3-methylphenol), 4,4'-butylidenebis(2,6-di-t-butylphenol), 4,4'-butylidenebis(3,6-di-t-butylphenol), 1,1-bis(5-t-butyl-4-hydroxy-2-methylphenyl)butane, 2,6-di(3-t-butyl-5-methyl-2-hydroxybenzyl)-4-methylphenol, calcium bis[0-ethyl-(3,5-di-t-butyl-4-hydroxybenzyl) phosphonate], 2-t-butyl-6-(3-t-butyl-2-hydroxy-5-methylbenzyl)-4-methylphenyl acrylate, 2-t-butyl-6-[3-t-butyl-2-hydroxy-5-methyl(α-methylbenzyl)]-4-methylphenyl acrylate, 2,4-di-t-butyl-6-[3,5-di-t-butyl-2-hydroxy(α-methylbenzyl)]phenyl acrylate, tocopherol, 2,6-diphenyl-4-octadecyloxyphenol, 2,4-bis(n-octylthio)-6-(4-hydroxy-3,5-di-t-butylanilino)-1,3,5-triazine, 2,4,6-tris(2'-hydroxy-4'-octoxyphenyl)-1,3,5-triazine, 2,4,6-tris[3-(3',5'-di-t-butyl-4'-hydroxyphenyl)ethyl]-1,3,5-triazine, 2,4,6-tris(3',5'-di-t-butyl-4'-hydroxybenzylthio)-1,3,5-triazine, 1,3,5-tris-(3',5'-di-t-butyl-4'-hydroxybenzylacetyl)hexahydro-1,3,5-triazine, 1,1,3-tris(5-t-butyl-4-hydroxy-2-methylphenyl)butane, triethylene glycol bis[3-(3-t-butyl-5-methyl-4hydroxyphenyl)propionate], 1,6-hexanediol-bis[3-(3,5-di-t-butyl-4-hydroxyphenyl)propionate], N,N'-bis[3-(3,5-di-t-butyl-4-hydroxyphenyl)propionyl]hexamethylenediamine, diethyl 3,5-di-t-butyl-4-hydroxybenzyl phosphonate, 2,2-thiodiethylenebis[3-(3,5-di-t-butyl-4-hydroxyphenyl)propionate], bis[3,3-bis(4'-hydroxy-3'-t-butylphenyl)butyric acid] ethylene glycol ester, bis[3,3-bis(4'-hydroxy-3'-methyl-5'-t-butylphenyl)butyric acid] ethylene glycol ester, bis[3,3-bis(4'-hydroxy-3',5'-di-t-butylphenyl)butyric acid] ethylene glycol ester, bis[3,3-bis(4'-hydroxy-3'-t-butylphenyl)butyric acid] 2,2-bis(hydroxyethoxyphenyl)propane ester, bis[3,3-bis(4'-hydroxy-3'methyl-5'-t-butylphenyl) butyric acid] 2,2-bis(hydroxyethoxyphenyl)propane ester, bis[3,3-bis(4'-hydroxy-3',5'-di-t-butylphenyl)butyric acid] 2,2-bis(hydroxy-ethoxyphenyl)propane ester, bis[2-(3'-t-butyl-2'-hydroxy-5'-methylbenzyl)-6-t-butyl-4-methylphenyl] terephthalate, 3,9-bis(3,5-di-t-butyl-4-hydroxyphenyl)-2,4,8,10-tetraoxaspiro[5.5]undecane, 3,9-bis[1,1-dimethyl-2-(3,5-d-t-butyl-4-hydroxyphenyl)ethyl]-2,4,8,10-tetraoxaspiro[5.5]undecane, 3,9-bis[1,1-dimethyl-2-{β-(3-t-butyl-4-hydroxy-5-methylphenyl)propionyloxy}ethyl]-2,4,8,10-tetraoxaspiro[5.5]undecane, 3,9-bis[1,1-dimethyl-2-{β-(3,5-di-t-butyl-4-hydroxyphenyl)propionyloxy}ethyl]-2,4,8,10-tetraoxaspiro[5.5]undecane, 3,9-bis[1,1-dimethyl-2-{β-(3,5-diphenyl-4-hydroxyphenyl)propionyloxy}ethyl]-2,4,8,10-tetraoxaspiro[5.5]undecane, 3,9-bis[1,1-dimethyl-2-{β-(3,5-dicyclohexyl-4-hydroxyphenyl)propionyloxy}ethyl]-2,4,8,10-tetraoxaspiro[5.5]undecane, 1,3,5-trimethyl-2,4,6-tris(3,5-di-t-butyl-4-hydroxybenzyl)benzene, tris(3,5-di-t-butyl-4-hydroxybenzyl) isocyanurate, tris(4-t-butyl-3-hydroxy-2,6-dimethylbenzyl) isocyanurate, tris[3-(3,5-di-t-butyl-4-hydroxyphenyl)propionyloxyethyl] isocyanurate, 2,2-bis[4-{2-(3-methyl-5-t-butyl-4-hydroxyphenylpropionyloxy)ethoxy}phenyl]propane, 2,2-bis[4-{2-(3,5-di-t-butyl-4-hydroxyphenylpropionyloxy)ethoxy}phenyl]propane, tetrakis[methylene-3-(3'-methyl-5',-t-butyl-4,-hydroxyphenyl)propionate]methane and tetrakis[-methylene-3-(3',5'-di-t-butyl-4'-hydroxyphenyl)propionate]methane. These phenol antioxidants may be used either individually or in combination of two or more thereof.

The phenol antioxidant is used in an amount of from 0.01 to 1 part by weight, preferably from 0.05 to 0.5 part by weight, per 100 parts by weight of a crystalline polyolefin.

Thermooxidative stability of the composition can also be improved by using a thioether antioxidant as well. Specific examples of suitable thioether antioxidants are dilauryl thiodipropionate, ditridecyl thiodipropionate, dimyristyl thiodipropionate, dicetyl thiodipropionate, distearyl thiodipropionate, dilauryl thiodibutyrate, ditridecyl thiodibutyrate, dimyristyl thiodibutyrate, dicetyl thiodibutyrate, distearyl thiodibutyrate, laurylstearyl thiodipropionate, laurylstearyl thiodibutyrate, pentaerythritol-β-lauryl thiodipropionate, pentaerythritol tetrakis(3-octylthiopropionate), pentaerythritol tetrakis(3-nonylthiopropionate), pentaerythritol tetrakis(3-decylthiopropionate), pentaerythritol tetrakis(3-laurylthiopropionate), pentaerythritol tetrakis(3-tridecylthiopropionate), pentaerythritol tetrakis(3-myristylthiopropionate), pentaerythritol tetrakis(3-palmitylthiopropionate), pentaerythritol tetrakis(3-stearylthiopropionate), pentaerythritol tetrakis(4-octylthiobutyrate), pentaerythritol tetrakis(4-nonylthiobutyrate), pentaerythritol tetrakis(4-decylthiobutyrate), pentaerythritol tetrakis(4-laurylthiobutyrate), pentaerythritol tetrakis(4-tridecylthiobutyrate), pentaerythritol tetrakis(4-myristylthiobutyrate), pentaerythritol tetrakis(4-palmitylthiobutyrate), pentaerythritol tetrakis(4-stearylthiobutyrate), pentaerythritol tetrakis(3-octylthiobutyrate), pentaerythritol tetrakis(3-nonylthiobutyrate), pentaerythritol tetrakis(3-decylthiobutyrate), pentaerythritol tetrakis(3-laurylthiobutyrate), pentaerythritol tetrakis(3-tridecylthiobutyrate), pentaerythritol tetrakis(3-myristylthiobutyrate), pentaerythritol tetrakis(3-palmitylthiobutyrate), pentaerythritol tetrakis(3-stearylthiobutyrate), tetrakis[3-{2-(octyloxycarbonyl)ethylthio}propionyloxymethyl]methane, tetrakis[3-{2-(nonyloxycarbonyl)ethylthio}propionyloxymethyl]methane, tetrakis[3-{2-decyloxycarbonyl)ethylthio}propionyloxymethyl]methane, tetrakis[3-{2-(dodecyloxycarbonyl)ethylthio}propionyloxymethyl]methane, tetrakis[3-{2-(tridecyloxycarbonyl)ethylthio}propionyloxymethyl]methane, tetrakis[3-{2-(tetradecyloxycarbonyl)ethylthio}propionyloxymethyl]methane, tetrakis[3-{2-(hexadecyloxycarbonyl)ethylthio}propionyloxymethyl]methane, tetrakis[3-{2-(octadecyloxycarbonyl)ethylthio}propionyloxymethyl]methane, 1,3,5-tris[3-{2-(octyloxycarbonyl)ethylthio}propionyl]hexahydro-1,3,5-triazine, 1,3,5-tris[3-{2-(nonyloxycarbonyl)ethylthio}propionyl]hexahydro-1,3,5-triazine, 1,3,5-tris[3-{decyloxycarbonyl)ethylthio}propionyl]hexahydro-1,3,5-triazine, 1,3,5-tris[3-{2-(dodecyloxycarbonyl)ethylthio}propionyl]hexahydro-1,3,5-triazine, 1,3,5-tris[3-{2-(tridecyloxycarbonyl)ethylthio}propionyl]hexahydro-1,3,5-triazine, 1,3,5-tris[3-{2-(tetradecyloxycarbonyl)ethylthio}propionyl]hexahydro-1,3,5-triazine, 1,3,5-tris[3-{2-(hexadecyloxycarbonyl)ethylthio}propionyl]hexahydro-1,3,5-triazine, 1,3,5-tris[3-{2-(octadecyloxycarbonyl)ethylthio}propionyl]hexahydro-1,3,5-triazine, 2,4,6-tris[3-{2-(octyloxycarbonyl)ethylthio}propionyl]-1,3,5-triazine, 2,4,6-tris[3-{2-(nonyloxycarbonyl)ethylthio}propionyl]-1,3,5-triazine, 2,4,6-tris[3-{2-decyloxycarbonyl)ethylthio}propionyl]-1,3,5-triazine, 2,4,6-tris[3-{2-(dodecyloxycarbonyl)ethylthio}propionyl]-1,3,5-triazine, 2,4,6-tris[3-{2-tridecyloxycarbonyl)ethylthio}propionyl]-1,3,5-triazine, 2,4,6-tris[3-{2-(tetradecyloxycarbonyl)ethylthio}propionyl]1,3,5-triazine, 2,4,6-tris[3-{2-(hexadecyloxycarbonyl)ethylthio}propionyl]-1,3,5-triazine, 2,4,6-tris[3-{2-(octadecyloxycarbonyl)ethylthio}propionyl]-1,3,5-triazine, tris[3-{2-(octyloxycarbonyl)ethylthio)propionyl]

isocyanurate, tris[3-{2-(nonyloxycarbonyl)ethylthio}propionyl] isocyanurate, tris[3-{2-(decyloxycarbonyl)ethylthio}propionyl] isocyanurate, tris[3-{2-(dodecyloxycarbonyl)ethylthio}propionyl] isocyanurate, tris[3-{2-(tridecyloxycarbonyl)ethylthio}propionyl] isocyanurate, tris[3-{2-(tetradecyloxycarbonyl)ethylthio}propionyl] isocyanurate, tris[3-{2-(hexadecyloxycarbonyl)ethylthio}propionyl] isocyanurate, tris[3-{2-(octadecyloxycarbonyl)ethylthio}propionyl] isocyanurate, tris[3-{2-(octyloxycarbonyl)ethylthio}propionyloxyethyl] isocyanurate, tris[3-{2-(nonyloxycarbonyl)ethylthio}propionyloxyethyl] isocyanurate, tris[3-{2-(decyloxycarbonyl)ethylthio}propionyloxyethyl] isocyanurate, tris[3-{2-(dodecyloxycarbonyl)ethylthio}propionyloxyethyl] isocyanurate, tris[3-{2-(tridecyloxycarbonyl)ethylthio}propionyloxyethyl] isocyanurate, tris[3-{2-(tetradecyloxycarbonyl)ethylthio}propionyloxyethyl] isocyanurate, tris[3-{2-(hexadeycloxycarbonyl)ethylthio}propionyloxyethyl] isocyanurate, tris[3-(2-(octadecyloxycarbonyl)ethylthio}propionyloxyethyl] isocyanurate, bis(4-t-amylphenyl) sulfide, dilauryl disulfide, dimyristyl disulfide, distearyl disulfide, 3,9-bis(2-laurylthioethyl)-2,4,8,10-tetraoxaspiro[5.5]undecane, 3,9-bis(2-myristylthioethyl)-2,4,8,10-tetraoxaspiro[5.5]undecane, 3,9-bis(2-2-laurylthiopropyl)-2,4,8,10-tetraoxaspiro[5.5]undecane, 3,9-bis(2-myristylthiopropyl)-2,4,8,10-tetraoxaspiro[5.5]undecane, 3,9-bis(2-stearylthiopropyl)-2,4,8,10-tetraoxaspiro[5.5]undecane, 3,9-bis[1,1-dimethyl-2-{3-laurylthiopropionyloxy}ethyl]-2,4,8,10-tetraoxaspiro[5.5]undecane, 3,9-bis[1,1-dimethyl-2-{3-myristylthiopropionyloxy}ethyl]-2,4,8,10-tetraoxaspiro[5.5]undecane, 3,9-bis[1,1-dimethyl-2-{3-stearylthiopropionyloxy}ethyl]-2,4,8,10-tetraoxaspiro[5.5]undecane, 3,9-bis[1,1-dimethyl-2-{3-laurylthiobutyroyloxy}ethyl]-2,4,8,10-tetraoxaspiro[5.5]undecane, 3,9-bis[1,1-dimethyl-2-(3-myristylthiobutyroyloxy)ethyl]2,4,8,10-tetraoxaspiro[5.5]undecane, 3,9-bis[1,1-dimethyl-2-(3-stearylthiobutyroyloxy)ethyl]-2,4,8,10-tetraoxaspiro[5.5]undecane, 3-(laurylthio)propionylamide, 3-(myristylthio)propionylamide, 3-(stearylthio)propionylamide, N,N'-methylenebis(3-laurylthiopropionyl)amide, N,N'-methylenebis(3-myristylthiopropionyl )amide, N,N'-methylenebis(3-stearylthiopropionyl)amide, N,N'-ethylenebis(3-laurylthiopropionyl)amide, N,N'-ethylenebis(3-myristylthiopropionyl)amide, N,N'-ethylenebis(3-stearylthiopropionyl)amide, N,N'-bis(3-laurylthiopropionyl) hydrazide, N,N'-bis(3-myristylthiopropionyl) hydrazide, N,N'-bis(3-stearylthiopropionyl) hydrazide, thioethylene glycol bis($\beta$-aminocrotonate), bis[2-methyl-4-(3-alkylthiopropionyloxy)-5-t-butylphenyl]sulfides and poly[1,4-bis(hydroxymethyl)-cyclohexane-thiodipropionate]. These thioether antioxidants may be used either individually or in combination of two or more thereof.

The thioether antioxidant is used in an amount of from 0.01 to 1 part by weight, preferably from 0.05 to 0.5 part by weight, per 100 parts by weight of a crystalline polyolefin.

Thermooxidative stability, weatherability or light stability, and discoloration prevention of the composition can be improved by using a phosphorus antioxidant in combination. Examples of suitable phosphorus antioxidants are distearylpentaerythritol diphosphite, diphenylpentaerythritol diphosphite, bis(nonylphenyl)-pentaerythritol diphosphite, catechyl-2,6-di-t-butyl-4-methylphenyl phosphite, catechyl-2,4,6-tri-t-butylphenyl phosphite, α-naphthylcatechyl phosphite, 2,2'-methylenebis(4-methyl-6-t-butylphenyl)-2-naphthyl phosphite, 4,4'-butylidenebis(3-methyl-6-t-butylphenyl-ditridecyl phosphite), 1,1,3-tris(2-methyl-4-ditridecyl phosphite-5-t-butylphenyl)butane, trilauryl trithiophosphite, tricetyl trithiophosphite, di(laurylthio)pentaerythritol diphosphite, 9,10-dihydro-9-oxa-10-phosphaphenanthrene-10-oxide, 10-hydroxy-9,10-dihydro-9-oxa-10-phosphaphenanthrene-10-oxide, triphenyl phosphite, tris(nonylphenyl) phosphite, tris(2,4-dinonylphenyl) phosphite, tris(mono, dinonylphenyl) phosphite, tris(2,4-di-t-butylphenyl) phosphite, tris(2,6-di-t-butyl-4-methylphenyl) phosphite, bis(2,4-di-t-butylphenyl)-pentaerythritol diphosphite, bis(2,6-di-t-butyl-4-methylphenyl)pentaerythritol diphosphite, bis(2,6-di-t-butyl-4-sec-butylphenyl)pentaerythritol diphosphite, bis(2,4,6-tri-t-butylphenyl)pentaerythritol diphosphite, bis(2,6-di-t-butyl-4-n-octadecyloxycarbonylethylphenyl)pentaerythritol diphosphite, bis[2,6-di-t-butyl-4-(2',4'-di-t-butylphenyloxycarbonyl)phenyl]pentaerythritol diphosphite, bis(2,6-di-t-butyl-4-n-hexadecyloxycarbonylphenyl)pentaerythritol diphosphite, tetrakis(2,4-di-t-butylphenyl)-4,4'-biphenylene diphosphonite, tetrakis(2,6-di-t-butyl-4-methylphenyl)-4,4'-biphenylene diphosphonite, tetrakis(2,6-di-t-butyl-4-n-octadecyloxycarbonylethylphenyl)-4,4'-biphenylene diphosphonite, tetrakis[2,6-di-t-butyl-4-(2',4'-di-t-butylphenyloxycarbonyl)phenyl]-4,4'-biphenylene diphosphonite, tetrakis(2,6-di-t-butyl-4-n-hexadecyloxycarbonylphenyl)-4,4'-biphenylene diphosphonite, tetrakis(2,4-di-t-butylphenyl)-3,9-bis(1,1-dimethyl-2-hydroxyethyl)-2,4,8,10-tetraoxaspiro[5.5]undecane diphosphite, tetrakis(2,6-di-t-butyl-4-methylphenyl)-3,9-bis(1,1-dimethyl-2-hydroxyethyl)-2,4,8,10-tetraoxaspiro[5.5]undecane, diphosphite, tetrakis(2,6-di-t-butyl-4-n-octadecyloxycarbonyulethylphenyl)-3,9-bis(1,1-dimethyl-2-hydroxyethyl)-2,4,8,10-tetraoxaspiro[5.5]undecane diphosphite, tetrakis[2,6-di-t-butyl-4-(2',4'-di-t-butylphenyloxycarbonylphenyl]-3,9-bis(1,1-dimethyl-2-hydroxyethyl)-2,4,8,10-tetraoxaspiro[5.5]undecane diphosphite, tetrakis(2,6-di-t-butyl-4-n-hexadecyloxycarbonylphenyl)-3,9-bis(1,1-dimethyl-2-hydroxyethyl)-2,4,8,10-tetraoxaspiro[5.5]undecane diphosphite, bis[2,2'-methylenebis(4-methyl-6-t-butylphenyl)]-4,4'-biphenylene diphosphonite, bis [2,2'-methylenebis(4,6-di-t-butylphenyl)]-4,4'-biphenylene diphosphonite, bis[2,2'-ethylidenebis(4-methyl-6-t-butylphenyl)]-4,4'-biphenylene diphosphonite, bis[2,2'-ethylidenebis(4,6-di-t-butylphenyl)]-4,4'-biphenylene diphosphonite, bis[2,2'-methylenebis(4-methyl-6-t-butylphenyl)]-3,9-bis(1,1-dimethyl-2-hydroxyethyl)-2,4,8,10-tetraoxaspiro[5.5]undecane diphosphite, bis[2,2'-methylenebis(4,6-di-t-butylphenyl)]-3,9-bis(1,1-dimethyl-2-hydroxyethyl)-2,4,8,10-tetraoxaspiro[5.5]undecane diphosphite, bis[2,2'-ethylidenebis(4-methyl-6-t-butylphenyl)]-3,9-bis(1,1-dimethyl-2-hydroxyethyl)-2,4,8,10-tetraoxaspiro[5.5]undecane diphosphite, bis[2,2'-ethylidenebis(4,6-di-t-butylphenyl)]-3,9-bis(1,1-dimethyl-2-hydroxyethyl)-2,4,8,10-tetraoxaspiro[5.5]undecane diphosphite, 2,2'-bis(4,6-di-t-butylphenyl)octyl phosphite, 2,2'-bis(4,6-di-t-butylphenyl)nonyl phosphite, 2,2'-bis(4,6-di-t-butylphenyl)lauryl phosphite, 2,2'-bis(4,6-di-t-butylphenyl)tridecyl phosphite, 2,2'-bis(4,6-di-t-butylphenyl)myristyl phosphite, 2,2'-bis(4,6-di-t-butylphenyl)stearyl phosphite, 2,2'-bis(4,6-di-t-butylphenyl) (2,4-di-t-butylphenyl) phosphite, 2,2'-bis(4,6-di-t-butylphenyl) (2,6-di-t-butyl-4-methylphenyl) phosphite, 2,2'-bis(4,6-di-t-butylphenyl)(2,4,6-tri-t-butylphenyl) phosphite, 2,2'-bis(4,6-di-t-butylphenyl)(2,6-di-t- butyl-4-n-octadecyloxycarbonylethylphenyl) phosphite, 2,2′-bis(4,6-di-t-butylphenyl)[2,6-di-t-butyl-4-(2′,4′-di-t-butylphenyloxycarbonyl)phenyl] phosphite, 2,2′-bis(4,6-di-t-butylphenyl) (2,6-di-t-butyl-4-n-hexadecyloxycarbonylphenyl) phosphite, 2,2′-methylenebis(4-methyl-6-t-butylphenyl)octyl phosphite, 2,2′-methylenebis(4-methyl-6-t-butylphenyl)nonyl phosphite, 2,2′-methylenebis(4-methyl-6-t-butylphenyl)lauryl phosphite, 2,2′-methylenebis(4-methyl-6-t-butylphenyl)tridecyl phosphite, 2,2′-methylenebis(4-methyl-6-t-butylphenyl)myristyl phosphite, 2,2′-methylenebis(4-methyl-6-t-butylphenyl)stearyl phosphite, 2,2′-methylenebis(4-methyl-6-t-butylphenyl) (2,4-di-t-butylphenyl) phosphite, 2,2′-methylenebis(4-methyl-6-t-butylphenyl) (2,6-di-t-butyl-4-methylphenyl) phosphite, 2,2′-methylenebis(4-methyl-6-t-butylphenyl) (2,4,6-tri-t-butylphenyl) phosphite, 2,2′-methylenebis(4-methyl-6-t-butylphenyl) (2,6-di-t-butyl-4-n-octadecyloxycarbonylethylphenyl) phosphite, 2,2′-methylenebis(4-methyl-6-t-butylphenyl)[2,6-di-t-butyl-4-(2′,4′-di-t-butylphenyloxycarbonyl)phenyl] phosphite, 2,2′-methylenebis(4-methyl-6-t-butylphenyl) (2,6-di-t-butyl-4-n-hexadecyloxycarbonylphenyl) phosphite, 2,2′-methylenebis(4,6-di-t-butylphenyl)octyl phosphite, 2,2′-methylenebis(4,6-di-t-butylphenyl)nonyl phosphite, 2,2′-methylenebis(4,6-di-t-butylphenyl)lauryl phosphite, 2,2′-methylenebis(4,6-di-t-butylphenyl)tridecyl phosphite, 2,2′-methylenebis(4,6-di-t-butylphenyl)myristyl phosphite, 2,2′-methylenebis(4,6-di-t-butylphenyl)stearyl phosphite, 2,2′-methylenebis(4,6-di-t-butylphenyl) (2,4-di-t-butylphenyl) phosphite, 2,2′-methylenebis(4,6-di-t-butylphenyl) (2,6-di-t-butyl-4-methylphenyl) phosphite, 2,2′-methylenebis(4,6-di-t-butylphenyl) (2,4,6-tri-t-butylphenyl) phosphite, 2,2′-methylenebis(4,6-di-t-butylphenyl) (2,6-di-t-butyl-4-n-octadecyloxycarbonylethylphenyl) phosphite, 2,2′-methylenebis(4,6-di-t-butylphenyl)[2,6-di-t-butyl-4-(2′,4′-di-t-butylphenyloxycarbonyl )phenyl] phosphite, 2,2′-methylenebis(4,6-di-t-butylphenyl) (2,6-di-t-butyl-4-n-hexadecyloxycarbonylphenyl) phosphite, 2,2′-ethylidenebis(4-methyl-6-t-butylphenyl)octyl phosphite, 2,2′-ethylidenebis(4-methyl-6-t-butylphenyl)nonyl phosphite, 2,2′-ethylidenebis(4-methyl-6t-butylphenyl)lauryl phosphite, 2,2′-ethylidenebis(4-methyl-6-t-butylphenyl)tridecyl phosphite, 2,2′-ethylidenebis(4-methyl-6-t-butylphenyl)myristyl phosphite, 2,2′-ethylidenebis(4-methyl-6-t-butyl-phenyl]stearyl phosphite, 2,2,-ethylidenebis(4-methyl-6-t-butylphenyl)(2,4-ditbutylphenyl) phosphite, 2,2′-ethylidenebis(4-methyl-6-t-butylphenyl) (2,6-di-t-butyl-4-methylphenyl) phosphite, 2,2′ethylidenebis(4-methyl-6-t-butylphenyl) (2,4,6-tri-t-butylphenyl) phosphite, 2,2′-ethylidenebis(4-methyl-6-t-butylphenyl) (2,6-di-t-butyl-4-n-octadecyloxycarbonylethylphenyl) phosphite, 2,2′-ethylidenebis(4-methyl-6-t-butylphenyl)[2,6-di-t-butyl-4-(2′,4′-di-t-butylphenyloxycarbonyl)phenyl] phosphite, 2,2′-ethylidenebis(4-methyl-6-t-butylphenyl)(2,6-di-t-butyl-4-n-hexadecyloxycarbonylphenyl) phosphite, 2,2′-ethylidenebis(4,6-di-t-butylphenyl)octyl phosphite, 2,2′-ethylidenebis(4,6-di-t-butylphenyl)nonyl phosphite, 2,2′ethylidenebis(4,6-di-t-butylphenyl)lauryl phosphite, 2,2′-ethylidenebis(4,6-di-t-butylphenyl)lauryl phosphite, 2,2′-ethylenebis(4,6-di-t-butylphenyl)tridecyl phosphite, 2,2′-ethylidenebis(4,6-di-t-butylphenyl)myristyl phosphite, 2,2′-ethylidenebis(4,6-di-t-butylphenyl)stearyl phosphite, 2,2′-ethylidenebis(4,6-di-t-butylphenyl)(2,4-di-t-butylphenyl) phosphite, 2,2′-ethylidenebis(4,6-di-t-butylphenyl)(2,6-di-t-butyl-4-methylphenyl) phosphite, 2,2′-ethylidenebis(4,6-di-t-butylphenyl)(2,4,6-tri-t-butylphenyl) phosphite, 2,2′-ethylidenebis(4,6-di-t-butylphenyl)(2,6-di-t-butyl-4-n-octadecyloxycarbonylethylphenyl) phosphite, 2,2′-ethylidenebis(4,6-di-t-butylphenyl)[2,6-di-t-butyl-4-(2′,4′-di-t-butylphenyloxycarbonyl)phenyl] phosphite, 2,2′-ethylidenebis(4,6-di-t-butylphenyl)(2,6-di-t-butyl-4-n-hexadecyloxycarbonylphenyl) phosphite, 2,2′-thiobis(4-methyl-6-t-butylphenyl)octyl phosphite, 2,2′-thiobis(4-methyl-6-t-butylphenyl)nonyl phosphite, 2,2′-thiobis(4-methyl-6-t-butylphenyl)lauryl phosphite, 2,2′-thiobis(4-methyl-6-t-butylphenyl)tridecyl phosphite, 2,2′-thiobis(4-methyl-6-t-butylphenyl)myristyl phosphite, 2,2′-thiobis(4-methyl-6-t-butylphenyl)stearyl phosphite, 2,2′-thiobis(4-methyl-6-t-butylphenyl)(2,4-di-t-butylphenyl) phosphite, 2,2′-thiobis(4-methyl-6-t-butylphenyl)(2,6-di-t-butyl-4-methylphenyl) phosphite, 2,2′-thiobis(4-methyl-6-t-butylphenyl)(2,4,6-tri-t-butylphenyl) phosphite, 2,2′-thiobis(4-methyl-6-t-butylphenyl)(2,6-di-t-butyl-4-n-octadecyloxycarbonylethylphenyl) phosphite, 2,2′-thiobis(4-methyl-6-t-butylphenyl)[2,6-di-t-butyl-4-(2′,4′-di-t-butylphenyloxycarbonyl)phenyl] phosphite and 2,2′-thiobis(4-methyl-6-t-butylphenyl) (2,6-di-t-butyl-4-n-hexadecyloxycarbonylphenyl) phosphite.

These phosphorus antioxidants may be used either individually or in combination of two or more thereof. The amount of the phosphorus antioxidant to be used is from 0.01 to 1 part by weight, particularly from 0.05 to 0.5 part by weight, per 100 parts by weight of a crystalline polyolefin.

Thermooxidative stability and discoloration prevention of the composition can also be improved by using a hydroxylamine antioxidant in combination. Specific examples of usable hydroxylamine antioxidants are N,N-dibenzylhydroxylamine, N,N-dicyclohexylhydroxylamine, N,N-di-n-octylhydroxylamine, N,N-bis(2-ethylhexyl)hydroxylamine, N,N-dinonylhydroxylamine, N,N-dilaurylhydroxylamine, N,N-dimyristylhydroxylamine, N,N-dipalmitylhydroxylamine, N,N-distearylhydroxylamine, N,N-dioleylhydroxylamine, N,N-dicocohydroxylamine, N,N-ditallowhydroxylamine, N,N-bis(hardened tallow)hydroxylamine, N,N-diisohydroxylamine, and N,N-bis(hardened soy)hydroxylamine.

These hydroxylamine antioxidants may be used either individually or in combination of two or more thereof. The hydroxylamine antioxidant is used in an amount of from 0.01 to 1 part by weight, preferably from 0.05 to 0.5 part by weight, per 100 parts by weight of a crystalline polyolefin.

Weatherability or light stability of the composition can be improved by using a light stabilizer in combination. Specific examples of usable light stabilizers include benzophenone ultraviolet absorbents, e.g., 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, bis(5-benzoyl-4-hydroxy-2-methoxyphenyl)methane, 2,2′-dihydroxy-4-methoxybenzophenone, 2,2′-dihydroxy-4,4′-dimethoxybenzophenone, 2,2′,4,4′-tetrahydroxybenzophenone and 2-hydroxy-4-methoxy-2′-carboxybenzophenone; benzotriazole ultraviolet absorbents, e.g., 2-(2′-hydroxy-5′-methylphenyl)-benzotriazole, 2-[2′-hydroxy-3′,5′-bis(α,α-dimethylbenzyl)phenyl]benzotriazole, 2-(2′-hydroxy-3′,5′-di-t-butylphenyl)benzotriazole, 2-(2′-hydroxy-3′-t-butyl-5′- methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2,2'-hydroxy-5'-t-octylphenyl)benzotriazole, 2,2'-methylenebis[4-(1,3,3-tetramethylbutyl)-6-(2N-benzotriazol-2-yl)phenol], methyl-3-[3-t-butyl-5-(2H-benzotriazol-2-yl)-4-hydroxyphenyl] propionate with polyethylene glycol and 2-(2-hydroxyphenyl)benzotriazole copolymers; oxalic acid anilide ultraviolet absorbents, e.g., N,N,-diethyloxalic acid bisanilide, 2-ethoxy-2'-ethyloxalic acid bisanilide, 2-ethoxy-5-t-butyl-2'-ethyloxalic acid bisanilide and 2-ethoxy-5-t-butyl-2'-ethyl-4'-t-butyloxalic acid bisanilide; formamidine ultraviolet absorbents, e.g., N-(4-ethoxycarbonylphenyl)-N'-methyl-N'-phenylformamidine, N-(4-ethoxycarbonylphenyl)-N'-ethyl-N'-phenylformamidine, N-(4-ethoxycarbonylphenyl)-N'-ethoxy-N'-phenylformamidine and N-(4-ethoxycarbonylphenyl)-N',N'-diphenylformamidine; nickel-based quenching agents, e.g., nickel-bis[2,2,'-thiobis(4-t-octylphenolate)], nickel-bis[O-t-butyl-(3,5-di-t-butyl-4-hydroxybenzyl) phosphone], nickel-bis[O-ethyl-(3,5-di-t-butyl-4-hydroxybenzyl)-phosphonate], 2,2'-thiobis(4-t-octylphenolato)butylaminonickel (II), 2,2'-thiobis(4-t-octylphenolato)cyclohexylaminonickel (II), 2,2'-thiobis(4-t-octylphenolato)diethanolaminonickel (II), 2,2'-thiobis(4-t-octylphenolato)phenyldiethanolaminonickel (II), 2,2'-thiobis(4-t-octylphenolato)-iso-octylaminonickel (II), 2,2'-thiobis(4-t-octylphenolato)octylaminonickel (II), 2,2'-thiobis(4-t-octylphenolato)cyclohexyldiethanolaminonickel (II) and nickel dibutyldithiocarbamate; hydroxybenzoate light stabilizers, e.g., 2,4-di-t-butylphenyl 3',5'-di-t-butyl-4'-hydroxybenzoate, 2,6-di-t-butylphenyl 3',5'-di-t-butyl-4'-hydroxybenzoate and n-hexadecyl 3,5-di-t-butyl-4-hydroxybenzoate; and hindered amine light stabilizers, e.g., 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, 1-(4-t-butyl-2-butenyl)-4-hydroxy-2,2,6,6-tetramethylpiperidine, 4-stearoyloxy-2,2,6,6-tetramethylpiperidine, 4-metacryloyloxy-1,2,2,6,6-pentamethylpiperidine, 1-benzyl-2,2,6,6-tetramethyl-4-piperidyl maleate, bis(2,2,6,6-tetramethyl-4-piperidyl) succinate, bis(1,2,2,6,6-pentamethyl-4-piperidyl) succinate, bis(2,2,6,6-tetramethyl-4-piperidyl) adipate, bis(2,2,6,6-tetramethyl-4-piperidyl) sebacate, bis(2,2,6,6-tetramethyl-4-piperidyl) fumarate, bis(1,2,3,6-tetramethyl-2,6-diethyl-4-piperidyl) sebacate, bis(1-allyl-2,2,6,6-tetramethyl-4-piperidyl) phthalate, bis(1,2,2,6,6-pentamethyl-4-piperidyl) sebacate, 1,1'-(1,2-ethanediyl)-bis(3,3,5,5-tetramethylpiperazinone), 2-methyl-2-(2,2,6,6-tetramethyl-4-piperidyl)imino-N-(2,2,6,6-tetramethyl-4-piperidyl)propionamide, 2-methyl-2-(1,2,2,6,6-pentamethyl-4-piperidyl)imino-N-(1,2,2,6,6-pentamethyl-4-piperidyl)propionamide, 1-propargyl-4-β-cyanoethyloxy-2,2,6,6-tetramethylpiperidine, 1-acetyl-2,2,6,6-tetramethyl-4-piperidyl acetate, trimellitic acid tris(2,2,6,6-tetramethyl-4-piperidyl) ester, 1-acryloyl-4-benzyloxy-2,2,6,6-tetramethylpiperidine, bis(1,2,2,6,6-pentamethyl-4-piperidyl)dibutyl malonate, bis(1,2,2,6,6-pentamethyl-4-piperidyl)dibenzyl malonate, bis(1,2,3,6-tetramethyl-2,6-diethyl-4-piperidyl)dibenzyl malonate, bis(1,2,2,6,6-pentamethyl-4-piperidyl)-2-(3,5-di-t-butyl-4-hydroxybenzyl)-2-n-butyl malonate, bis(2,2,6,6-tetramethyl-4-piperidyl) 1,5-dioxaspiro[5.5]undecane-b 3,3-dicarboxylate, bis(1,2,2,6,6-pentamethyl-4-piperidyl) 1,5-dioxaspiro[5.5]undecane-3,3-dicarboxylate, bis(1-acetyl-2,2,6,6-tetramethyl-4-piperidyl-) 1,5-dioxaspiro[5.5]undecane-3,3-dicarboxylate, 1,3-bis[2,2'-[bis(2,2,6,6-tetramethyl-4-piperidyl) 1,3-dioxacyclohexane-5,5-dicarboxylate]], bis(2,2,6,6-tetramethyl-4-piperidyl) 2-[1-methylethyl]-1,3-dioxacyclohexane-5,5-dicarboxylate, 1,2-bis[2,2'-[bis(2,2,6,6-tetramethyl-4-piperidyl) 2-methyl-1,3-dioxanecyclohexane-5,5-dicarboxylate]], bis(2,2,6,6-tetramethyl-4-piperidyl)-2-[2-(3,5-di-t-butyl-4-hydroxyphenyl)]ethyl 2-methyl-1,3-dioxacyclohexane-5,5-dicarboxylate, bis(2,2,6,6-tetramethyl-4-piperidyl) 1,5dioxaspiro[5.11-]heptadecane,-3,3-dicarboxylate, hexane-1',6'-bis-4-carbamoyloxy-1-n-butyl-2,2,6,6-tetramethylpiperidine), toluene-2',4'-bis(4-carbamoyloxy-1-n-butyl-2,2,6,6-tetramethylpiperidine), dimethyl-bis(2,2,6,6-tetramethylpiperidine-4-oxy)silane, phenyl-tris(2,2,6,6-tetramethylpiperidine-4-oxy)silane, tris(1-propyl-2,2,6,6-tetramethyl4-piperidyl) phosphite, tris(1-propyl-2,2,6,6-tetramethyl-4-piperidyl) phosphate, phenyl-[bis(1,2,2,6,6-pentamethyl-4-piperidyl)] phosphonate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, tetrakis(2,2,6,6-tetramethyl-4-piperidyl) 1,2,3,4-butanetetracarbonamide, tetrakis(1,2,2,6,6-pentamethyl-4-piperidyl) 1,2,3,4-butanetetracarbonamide, 2-dibutylamino-4,6-bis(9-aza-3-ethyl-8,8,10,10-tetramethyl-1,5-dioxaspiro[5.5]-3-undecylmethoxy)-s-triazine, 2-dibutylamino-4,6-bis(9-aza-3-ethyl-8,8,9,10,10-pentamethyl-1,5-dioxaspiro[5.5]-3-undecylmethoxy)-s-triazine, tetrakis(9-aza-3-ethyl-8,8,10,10-tetramethyl-1,5-dioxaspiro[5.5]-3-undecylmethyl) 1,2,3,4-butanetetracarboxylate, tetrakis(9-aza-3-ethyl-(8,8,9,10,10-pentamethyl-1,5-dioxaspiro[5.5]-3-undecylmethyl) 1,2,3,4-butanetetracarboxylate, tridecyl.tris(2,2,6,6-tetramethyl-4-piperidyl) 1,2,3,4-butanetetracarboxylate, tridecyl.tris(1,2,2,6,6-pentamethyl-4-piperidyl)1,2,3,4-butanetetracarboxylate, di(tridecyl).bis(2,2,6,6-tetramethyl-4-piperidyl) 1,2,3,4-butanetetracarboxylate, di(tridecyl).bis(1,2,2,6,6-pentamethyl-4-piperidyl) 1,2,3,4-butanetetracarboxylate, 2,2,4,4-tetramethyl-7-oxa-3,20-diazadispiro[5.1.11.2-]heneicosan-21-one, 3,9-bis[1,1-dimethyl-2-(tris(2,2,6,6-tetramethyl-4-piperidyloxycarbonyl)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane, poly(2,2,6,6-tetramethyl-4-piperidyl acrylate), poly(1,2,2,6,6-pentamethyl-4-piperidyl acrylate), poly(2,2,6,6-tetramethyl-4-piperidyl methacrylate), poly(1,2,2,6,6-pentamethyl-4-piperidyl) methacrylate), poly[[bis(2,2,6,6-tetramethyl-4-piperidyl) itaconate] [vinyl butyl ether]], poly[[bis(1,2,2,6,6-pentamethyl-4-piperidyl) itaconate] [vinyl butyl ether]], poly[[bis(2,2,6,6-tetramethyl-4-piperidyl) itaconate][vinyl octyl ether]], poly[[bis(1,2,2,6,6-pentamethyl-4-piperidyl-) itaconate] [vinyl octyl ether]], a dimethyl succinate 2-(4-hydroxy-2,2,6,6-tetramethylpiperidyl)ethanol condensate, poly[hexamethylene[(2,2,6,6-tetramethyl-4-piperidyl)imino]], poly[ethylene[(2,2,6,6-tetramethyl-4-piperidyl)imino]-hexamethylene[(2,2,6,6-tetramethyl-4-piperidyl)imino]], poly[[1,3,5-triazine-2,4-diyl] [(2,2,6,6-tetramethyl-4-piperidyl)imino] hexamethylene[(2,2,6,6-tetramethyl-4-piperidyl)imino]], poly[[6-(diethylimino)-1,3,5-triazine-2,4-diyl] [(2,2,6,6-tetramethyl-4-piperidyl)imino]hexamethylene[(2,2,6,6-tetramethyl-4-piperidyl)imino]], poly[[6-[(2-ethylhexyl)imino]-1,3,5-triazine-2,4-diyl] [(2,2,6,6-tetramethyl-4-piperidyl)imino] hexamethylene[(2,2,6,6-tetramethyl-4-piperidyl)imino]], poly[[6-[(1,1,3,3-tetramethylbutyl)imino]-1,3,5-triazine-2,4-diyl] [(2,2,6,6-tetramethyl-4-piperidyl)imino]], hexamethylene[(2,2,6,6-tetramethyl-4-piperidyl)imino]], poly[[6-(cyclohexylimino)-1,3,5-triazine-2,4-diyl] [(2,2,6,6-tetramethyl-4-piperidyl)imino] hexamethylene[(2,2,6,6-tetramethyl-4-piperidyl-)imino]], poly[[6-morpholino-1,3,5-triazine-2,4-diyl] [(2,2,6,6-tetramethyl-4-piperidyl)imino]hexamethylene[(2,2,6,6-tetramethyl-4-piperidyl)imino]], poly[[6-(butoxyimino)-1,3,5-triazine-2,4-diyl] [(2,2,6,6-tetramethyl-4-piperidyl)imino]hexamethylene[(2,2,6,6-tetramethyl-4-piperidyl)imino]], poly[[6-[(1,1,3,3-tetramethylbutyl)oxy]-1,3,5-triazine-2,4-diyl] [(2,2,6,6-tetramethyl-4-piperidyl)imino] hexamethylene[(2,2,6,6-tetramethyl-4-piperidyl)imino]], poly[oxy[6-[(1-piperidyl)-1,3,5-triazine-2,4-diyloxy-1,2-ethanediyl] [(2,2,6,6-tetramethyl-3-oxo-1,4-piperidyl)-1,2-ethanediyl] [(3,3,5,5-tetramethyl-2-oxo-1,4-piperidyl)-1,2-ethanediyl]], poly[oxy[6-[(1,1,3,3-tetramethylbutyl)imino]-1,3,5-triazine-2,4-diyloxy-1,2-ethanediyl] [(2,2,6,6-tetramethyl-3-oxo-1,4-piperidyl)-1,2-ethanediyl] [(3,3,5,5-tetramethyl-2-oxo-1,4-piperidyl)-1,2-ethanediyl]], poly[[6-[(ethylacetyl)imino]-1,3,5-triazine-2,4-diyl] [(2,2,6,6-tetramethyl-4-piperidyl)imino] hexamethylene[(2,2,6,6-tetramethyl-4-piperidyl)imino]], poly[[6-[(2,2,6,6-tetramethyl-4-piperidyl)butylimino]-1,3,5-triazine-2,4-diyl] [(2,2,6,6-tetramethyl-4-piperidyl)imino] hexamethylene[(2,2,6,6-tetramethyl-4-piperidyl)imino]], 1,6,11-tris[{4,6-bis(N-butyl-N-(2,2,6,6-tetramethyl-4-piperidyl)amino)-1,3,5-triazin-2-yl}amino]undecane, 1,6,11-tris[{4,6-bis(N-butyl-N-(1,2,2,6,6-pentamethyl-4-piperidyl)amino)-1,3,5-triazin-2-yl}amino]undecane, 1,6,11-tris[{4,6-bis(N-octyl-N-(2,2,6,6-tetramethyl-4-piperidyl)amino)-1,3,5-triazin-2-yl}amino]undecane, 1,6,11-tris[{4,6-bis(N-octyl-N-(1,2,2,6,6-pentamethyl-4-piperidyl)amino)-1,3,5-triazin-2-yl}amino]undecane, 1,5,8,12-tetrakis[4,6-bis(N-2,2,6,6-tetramethyl-4-piperidyl)-butylamino)-1,3,5-triazin-2-yl]-1,5,8,12-tetraazadodecane and 1,5,8,12-tetrakis[4,6-bis(N-(1,2,2,6,6-pentamethyl-4-piperidyl)butylamino)-1,3,5-triazin-2-yl]-1,5,8,12-tetraazadodecane.

These light stabilizers can be used either individually or in combination of two or more thereof. The light stabilizer is used in an amount of from 0.01 to 1 part by weight, preferably from 0.05 to 0.5 part by weight, per 100 parts by weight of a crystalline polyolefin.

Resistance to heavy metals of the composition of the present invention can be improved by using a metal deactivator in combination.

Specific examples of suitable metal deactivators include benzotriazole, 2,4,6-triamino-1,3,5-triazine, 3,9-bis[2-(3,5-diamino-2,4,6-triazaphenyl)ethyl]-2,4,8,10-tetraoxaspiro[5.5]undecane, ethylenediaminetetraacetic acid, an alkali metal (Li, Na, K) salt of ethylenediaminetetraacetic acid, N,N'-disalicylidene-1,2-propylenediamine, N,N'-disalicylidene-1,2-propylenediamine, N,N''-disalicylidene-N'-methyldipropylenetriamine, 3-salicyloylamino-1,2,4-triazole, decamethylenedicarboxylic acid bis(N,-salicyloylhydrazide), nickel-bis(1-phenyl-3-methyl-4-decanoyl-5-pirazolate), 2-ethoxy-2'-ethyloxanilide, 5-t-butyl-2-ethoxy-2'-ethyloxanilide, N,N-diethyl-N',N'-diphenyloxamide, N,N'-diethyl-N,N'-diphenyloxamide, oxalic acid bis(benzylidenehydrazide), thiodipropionic acid bis(benzylidenehydrazide), isophthalic acid bis(2-phenoxypropionylhydrazide), bis(salicyloylhydrazine), N-salicylidene-N,-salicyloylhydrazone, N,N'-bis[3-(3,5-di-t-butyl-4-hydroxyphenyl)propionyl]hydrazine, tris[2-t-butyl-4-thio(2'-methyl-4'-hydroxy-5'-t-butylphenyl)-5-methylphenyl] phosphite, bis[2-t-butyl-4-thio(2'-methyl-4'-hydroxy-5'-t-butylphenyl)-5-methylphenyl]pentaerythritol diphosphite, tetrakis[2-t-butyl-4-thio(2'-methyl-4'-hydroxy-5'-t-butylphenyl)-5-methylphenyl]-1,6-hexamethylenebis(N-hydroxyethyl-N-methylsemicarbazide) diphosphite, tetrakis[2-t-butyl-4-thio(2'-methyl-4'-hydroxy-5'-t-butylphenyl)-5-methylphenyl]-1,10-decamethylenedicarboxylic acid dihydroxyethylcarbonylhydrazide diphosphite, tetrakis[2-t-butyl-4-thio(2'-methyl-4'-hydroxy-5'-t-butylphenyl)-5-methylphenyl]-1,10-decamethylenedicarboxylic acid disalicyloylhydrazide diphosphite, tetrakis[2-t-butyl-4-thio(2'-methyl-4'-hydroxy-5'-t-butylphenyl) -5-methylphenyl]-di(hydroxyethylcarbonyl)hydrazide diphosphite, tetrakis[2-t-butyl-4-thio(2'-methyl-4'-hydroxy-5'-t-butylphenyl)-5-methylphenyl]-N,N'-bis(hydroxyethyl)oxamide diphosphite and N,N'-bis[2-{3-(3,5-di-t-butyl-4-hydroxyphenyl)propionyloxy}ethyl]oxamide.

These metal deactivators may be used either individually or in combination of two or more thereof. The metal deactivator is used in an amount of from 0.01 to 1 part by weight, preferably from 0.05 to 0.5 part by weight, per 100 parts by weight of a crystalline polyolefin.

Molding processability of the composition of the present invention using a crystalline propylene polymer as a crystalline polyolefin can be improved by using a radical generator in combination. Specific examples of suitable radical generators include benzoyl peroxide, t-butyl perbenzoate, t-butyl peracetate, t-butyl peroxyisopropylcarbonate, 2,5-dimethyl-2,5-di(benzoylperoxy)hexane, 2,5-dimethyl-2,5-di(benzoylperoxy)hexyne-3, t-butyl diperadipate, t-butyl peroxy-3,5,5-trimethylhexanoate, methyl ethyl ketone peroxide, cyclohexanone peroxide, di-t-butyl peroxide, dicumyl peroxide, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, t-butyl cumyl peroxide, 1,1-bis(t-butylperoxy)-3,3,5-trimethylcyclohexane, 1,1-bis(t-butylperoxy)cyclohexane, 2,2-bis(t-butylperoxy)butane, p-menthane hydroperoxide, diisopropylbenzene hydroperoxide, cumene hydroperoxide, t-butyl hydroperoxide, p-cymene hydroperoxide, 1,1,3,3-tetramethylbutyl hydroperoxide, 2,5-dimethyl-2,5-di(hydroperoxy)hexane, trimethylsilyl cumyl peroxide, 2,5-dimethyl-2,5-bis(trimethylsilylperoxy)hexane, 2,5-dimethyl-2,5-bis(trimethylsilylperoxy)hexyne-3 and 1,3-bis(trimethylsilylperoxyisopropyl)benzene.

These radical generators may be used either individually or in combination of two or more thereof. The radical generator is used in an amount of from 0.001 to 0.5 part by weight, preferably from 0.01 to 0.2 part by weight, per 100 parts by weight of a crystalline propylene polymer.

Further, the composition according to the present invention may contain other various additives commonly compounded into crystalline polyolefins as far as the expected characteristics of the composition are not impaired. Such additives include clarifiers, nucleating agents (exclusive of Compound B'), lubricants, antistatic agents (exclusive of Compound B' and Compound C), anti-fogging agents, anti-blocking agents, anti-dropping agents, flame retardants (exclusive of Compound B'), flame retardant assistants, pigments, halogen scavengers (exclusive of Compound B' and Compound C), e.g., hydrotalcite, dispersing agents or neutralizing agents (exclusive of Compound B and Compound B'), e.g., metallic soaps and organic fillers, e.g., wood meal, pulp, waste-paper, synthetic fibers and natural fibers.

The composition of the invention can be prepared by mixing prescribed amounts of Compound A, Compound B (or Compound B' and Compound C in place of Compound B), and the above-described various additives commonly added to crystalline polyolefins with crystalline polyolefins in an ordinary mixing apparatus, e.g., a Henschel mixer (trade name), a super mixer, a ribbon blender or a Banbury mixer, and melt-kneading and pelletizing the blend in an ordinary kneading apparatus, e.g., a single-screw extruder, a twin-screw extruder, a Brabender and a roll, at a melt-kneading temperature of from 150° to 300° C., preferably from 180° to 270° C. The resulting composition can be molded into desired articles by various molding techniques, such as injection molding, extrusion molding, blow molding, etc.

While the working mechanism of the combination of Compound A and Compound B or the combination of Compound A, Compound B', and Compound C has not yet been clarified, the following assumption could be made.

Compound B or B' appears to function as a metallic ion donor for Compound A to form a coordinate bond or ionic bond between the metallic ion thereof and a fluorine atom which is an element having the highest electronegativity of the elements constituting Compound A, thereby serving as a nucleating agent to improve stiffness characteristics. Further, it is believed that the cation of Compound C forms a coordinate bond or ionic bond in any form between Compound A and Compound B' thereby to synergistically make a contribution to the improvement of stiffness characteristics.

The present invention is now illustrated in greater detail with reference to the following examples and comparative examples, but it should be understood that the present invention is not deemed to be limited thereto. All the parts and percents are given by weight unless otherwise indicated.

Physical properties of compositions prepared in Examples and Comparative Examples were evaluated according to the following test methods.

1) Stiffness (Flexural Modulus)

Pellets were injection molded to prepare a 100 mm long, 10 mm wide, and 4 mm thick specimen for flexural test. Stiffness was evaluated by flexural modulus of the specimen as measured in accordance with JIS K 7203. The higher the flexural modulus, the higher the stiffness.

1 2) Heat Stiffness (Heat Distortion Temperature)

Pellets were injection molded to prepare a 130 mm long, 13 mm wide, and 6.5 mm thick specimen for test of deflection temperature under load. Heat stiffness was evaluated by heat distortion temperature under load of the specimen as measured in accordance with JIS K 7207 (load: 4.6 kgf/cm$^2$). The higher the heat distortion temperature, the higher the heat stiffness.

3) Impact Resistance (Izod Impact Strength)

Pellets were injection molded to prepare a 63.5 mm long, 13 mm wide, and 3.5 mm thick specimen for Izod impact test (notched). Impact resistance was evaluated by Izod impact strength as measured according to JIS K 7110 (23° C.). The higher the Izod impact strength, the higher the impact resistance.

PREPARATION EXAMPLES 1 TO 3

Preparation of HCPP(H) for Use in Examples 1 to 55 and 144 to 198 and Comparative Examples 1 to 55 and 144 to 198

(1) Preparation of Catalyst n-Hexane (600 ml), 0.50 mol of diethylaluminum monochloride (hereinafter abbreviated as DEAC), and 1.20 mol of diisoamyl ether were mixed at 25° C. for 1 minute and allowed to react at that temperature for 5 minutes to obtain a reaction mixture (V) (diisoamyl ether/DEAC molar ratio=2.4). In a reactor whose atmosphere had been displaced with nitrogen was added 4.0 mol of titanium tetrachloride and heated to 35° C. The whole reaction mixture (V) was added dropwise thereto over 180 minutes, followed by keeping the mixture at the same temperature for 30 minutes. The temperature was elevated to 75° C., at which the reaction was continued for an additional one hour. The reaction mixture was cooled to room temperature (20° C.), and the supernatant liquor was removed. To the residue was added 4,000 ml of n-hexane, followed by decantation to remove the supernatant liquor. The operation of addition of n-hexane and decantation was repeated four times to finally obtain 190 g of a solid product (II). The whole amount of the solid product (II) was suspended in 3,000 ml of n-hexane, and 160 g of diisoamyl ether and 350 g of titanium tetrachloride were added to the suspension at room temperature (20° C.) over about 1 minute, and the mixture was allowed to react at 65° C. for 1 hour. After completion of the reaction, the reaction mixture was cooled to room temperature. After the supernatant liquor was removed by decantation, 4,000 ml of n-hexane was added thereto, followed by stirring for 10 minutes. After standing, the supernatant liquor was removed by decantation. The operation of addition of n-hexane and decantation was repeated 5 times, and the residue was dried under reduced pressure to obtain a solid product (III).

(2) Preparation of Preliminarily Activated Catalyst

The atmosphere of a 20 l-stainless steel reactor equipped with a tilted agitating blade was displaced with nitrogen gas, and 15 l of n-hexane, 42 g of DEAC, and 30 g of the solid product (III) were put therein at room temperature. To the reactor, 15 Nl of hydrogen was introduced to conduct a reaction at a propylene partial pressure of 5 kg/cm$^2$G for 5 minutes. The unreacted propylene, hydrogen, and n-hexane were removed under reduced pressure to obtain a preliminarily activated catalyst (VI) as particles (82.0 g of propylene was reacted per gram of the solid product (III)).

(3) Polymerization of Propylene

Into a 250 l-stainless steel polymerization vessel equipped with a turbo-agitating blade whose atmosphere had been replaced with nitrogen were charged 100 l of dry n-hexane and then 10 g of DEAC, 10 g of the preliminarily activated catalyst (VI), and 11.0 g of methyl p-toluylate. Then, hydrogen was introduced thereinto in an amount of 100 Nl (Preparation Example 1), 200 Nl (Preparation Example 2) or 410 Nl (Preparation Example 3). The inner temperature was raised to 70° C., propylene was fed into the vessel, and the inner pressure was elevated to 10 kg/cm$^2$G. Polymerization was conducted for 4 hours while keeping the temperature at 70° C. and the pressure at 10 kg/cm$^2$G. Methanol (25 l) was fed to the reactor, and the temperature was elevated to 80° C. After 30 minutes, 100 g of a 20% sodium hydroxide aqueous solution was added thereto, followed by stirring for 20 minutes. Fifty liters of pure water were added thereto, and any unreacted propylene was discharged. The aqueous layer was withdrawn, and 50 l of pure water was again added, followed by stirring for 10 minutes for washing. The aqueous layer was withdrawn, and an n-hexane slurry of HCPP(H) was then withdrawn. The slurry was filtered, and the filtrate was dried to obtain HCPP(H) as a white powder. The HCPP(H) prepared in Preparation Example 1, 2 or 3 was designated HCPP(H)-(I), HCPP(H)-(II) or HCPP(H)-(III), respectively. Melt flow rate (MFR) and isotactic pentad ratio (P) of the resulting HCPP(H) were determined. The results obtained are shown in Table 1 below.

PREPARATION EXAMPLE 4

Preparation of Crystalline Propylene Homopolymer (hereinafter referred to as PP(H)) for Use in Examples 56 to 77 and 199 to 220 and Comparative Examples 56 to 77 and 199 to 220

In a 250 l-stainless steel polymerization vessel equipped with a turbo-agitating blade whose atmosphere had been replaced with nitrogen were charged 100 l of dry n-hexane and then 10 g of DEAC, 40 g of a commercially available activated catalyst (AA type) which had been prepared by reducing titanium tetrachloride with metallic aluminum and grinding, and 22.0 g of methyl p-toluylate. Then, 200 Nl of hydrogen was added thereto. The inner temperature was elevated to 70° C., propylene was fed into the vessel, and the inner pressure was raised to 10 kg/cm$^2$G. Polymerization reaction was conducted for 4 hours while maintaining the temperature at 70° C. and the pressure at 10 kg/cm$^2$. Twenty-five liters of methanol was added thereto, and the temperature was increased to 80° C. After 30 minutes, 100 g of a 20% sodium hydroxide aqueous solution was added thereto, followed by stirring for 20 minutes. Fifty liters of pure water was added, and any unreacted propylene was discharged. The aqueous layer was withdrawn, and 50 l of water was added thereto, followed by stirring for 10 minutes for washing. The aqueous layer was withdrawn, and an n-hexane slurry of PP(H) was then withdrawn. The slurry was filtered, and the filtrate was dried to obtain PP(H) as a white powder. MFR and P of the resulting PP(H) were measured, and the results are shown in Table 1.

PREPARATION EXAMPLES 5 TO 7

Preparation of HCPP(B) for Use in Examples 78 to 121 and 221 to 264 and Comparative Examples 78 to 121 and 221 to 264

(1) Preparation of Catalyst n-Hexane (600 ml), 0.50 mol of DEAC, and 1.20 mol of diisoamyl ether were mixed at 25° C. for 1 minute and allowed to react at that temperature for 5 minutes to obtain a reaction mixture (V) (diisoamyl ether/DEAC molar ratio=2.4). In a reactor whose atmosphere had been displaced with nitrogen was charged 4.0 mol of titanium tetrachloride and heated to 35° C. The whole amount of the above prepared reaction mixture (V) was added dropwise thereto over 180 minutes, followed by keeping the mixture at the same temperature for 30 minutes. The temperature was elevated to 75° C., at which the reaction was continued for an additional one hour. The reaction mixture was cooled to room temperature (20° C.), and the supernatant liquor was removed. To the residue was added 4,000 ml of n-hexane, followed by decantation to remove the supernatant liquor. The operation of addition of n-hexane and decantation was repeated four times to finally obtain 190 g of a solid product (II). The whole amount of the solid product (II) was suspended in 3,000 ml of n-hexane, and 160 g of diisoamyl ether and 350 g of titanium tetrachloride were added to the suspension at room temperature (20° C.) over about 1 minute, and the mixture was allowed to react at 65° C. for 1 hour. After completion of the reaction, the reaction mixture was cooled to room temperature. After the supernatant liquor was removed by decantation, 4,000 ml of n-hexane was added thereto, followed by stirring for 10 minutes. After standing, the supernatant liquor was removed by decantation. The operation of addition of n-hexane and decantation was repeated 5 times, and the residue was dried under reduced pressure to obtain a solid product (III).

(2) Preparation of Preliminarily Activated Catalyst

The atmosphere of a 20 l-stainless steel reactor equipped with a tilted agitating blade was displaced with nitrogen gas, and 15 l of n-hexane, 42 g of DEAC, and 30 g of the solid product (III) were put therein. To the reactor, 15 Nl of hydrogen was introduced to conduct a reaction at a propylene partial pressure of 5 kg/cm$^2$G for 5 minutes. The unreacted propylene, hydrogen, and n-hexane were removed under reduced pressure to obtain a preliminarily activated catalyst (VI) as particles (82.0 g of propylene was reacted per gram of the solid product (III)).

(3) Polymerization

Into a 400 l-stainless steel polymerization vessel equipped with a turbo-agitating blade whose atmosphere had been replaced with nitrogen were charged 250 l of dry n-hexane and then 10 g of DEAC, 10 g of the preliminarily activated catalyst (VI), and 11.0 g of methyl p-toluylate. Then, hydrogen was introduced thereinto while keeping a gaseous phase hydrogen concentration at 6 mol% (Preparation Example 5), 8 mol% (Preparation Example 6), or 10 mol% (Preparation Example 7). The inner temperature was raised to 70° C., propylene was fed into the vessel, and the inner pressure was elevated to 10 kg/cm$^2$G. Polymerization was conducted for 4 hours while keeping the temperature at 70° C. and the pressure at 10 kg/cm$^2$G. Propylene feed was stopped, and the unreacted propylene was discharged. A part of the slurry in the polymerization vessel was taken out, filtered, washed, and dried to obtain HCPP(H) as a white powder. MFR and P of the resulting HCPP(H) were determined. The results obtained are shown in Table 2 below.

After the unreacted propylene was discharged, the inner temperature and pressure were kept at 60° C. and 0.1 kg/cm$^2$G. Ethylene and propylene were continuously fed to the reaction vessel for 2 hours while fixing the ethylene proportion at 33% based on the total monomers so that the total amount of ethylene fed was 2.4 kg (Preparation Example 5), 5.4 kg (Preparation Example 6), or 8.8 kg (Preparation Example 7). After conducting second-stage polymerization for 2 hours, the ethylene and propylene feed was stopped, and the unreacted monomers were discharged. Then, 25 l of methanol was added to the reaction mixture, and the temperature was raised to 75° C. After 30 minutes, 100 g of a 20% sodium hydroxide aqueous solution was added thereto, followed by stirring for 20 minutes. Pure water (100 l) was added thereto, and the remaining propylene was discharged. The aqueous layer was removed, and 100 l of pure water was again added thereto, followed by stirring for 10 minutes for washing. The aqueous layer was withdrawn, and an n-hexane slurry of HCPP(B) was then withdrawn. The slurry was filtered, and the filtrate was dried to obtain HCPP(B) as a white powder. MFR, and ethylene contents of the resulting HCPP(B) were measured, and the results are shown in Table 2. The HCPP(B) prepared in Preparation Example 5, 6 or 7 was designated HCPP(B)-(I), HCPP(B)-(II) or HCPP(B)-(III), respectively.

PREPARATION EXAMPLE 8

Preparation of Crystalline Ethylene-Propylene Block Copolymer (hereinafter referred to PP(B)) for Use in Examples 122 to 143 and 265 to 286 and Comparative Examples 122 to 143 and 265 to 286

In a 400 l-stainless steel polymerization vessel equipped with a turbo-agitating blade whose atmosphere had been displaced with nitrogen were charged 250 l of dry n-hexane and then 10 g of DEAC, 30 g of a commercially available activated catalyst (AA type) which had been prepared by reducing titanium tetrachloride with metallic aluminum and grinding, and 11.0 g of methyl p-toluylate. Hydrogen was then blown thereinto while keeping a gaseous phase hydrogen concentration at 8 mol%. The inner temperature was elevated to 70° C., propylene was fed into the vessel, and the inner pressure was raised to 10 kg/cm$^2$G. Polymerization reaction was conducted for 4 hours while maintaining the temperature at 70° C and the pressure at 10 kg/cm$^2$G. Propylene feed was stopped, and the unreacted propylene was discharged. A part of the slurry in the vessel was taken out, filtered, washed, and dried to obtain a crystalline propylene homopolymer as a white powder. MFR and P of the resulting polymer were measured, and the results are shown in Table 2.

After the unreacted propylene was discharged, the inner temperature and pressure were kept at 60° C. and 0.1 kg/cm$^2$G. Ethylene and propylene were continuously fed to the reaction vessel for 2 hours while fixing the ethylene proportion at 33% based on the total monomers so that the total amount of ethylene fed was 5.4 kg. After conducting second-stage polymerization for 2 hours, the ethylene and propylene feed was stopped, and the unreacted monomers were discharged. Then, 25 l of methanol was added to the reaction mixture, and the temperature was raised to 75° C. After 30 minutes, 100 g of a 20% sodium hydroxide aqueous solution was added thereto, followed by stirring for 20 minutes. Pure water (100 l) was added thereto, and any remaining propylene was discharged. The aqueous layer was removed, and 100 l of pure water was again added thereto, followed by stirring for 10 minutes for washing. The aqueous layer was withdrawn, and an n-hexane slurry of PP(B) was then withdrawn. The slurry was filtered, and the filtrate was dried to obtain PP(B) as a white powder. MFR and ethylene contents of the resulting PP(B) were measured, and the results are shown in Table 2.

TABLE 1

|  | Preparation Example | | | |
|---|---|---|---|---|
|  | 1 | 2 | 3 | 4 |
| MFR (g/10 min) | 2.5 | 10.6 | 34.0 | 9.8 |
| P | 0.972 | 0.981 | 0.990 | 0.935 |

TABLE 2

|  | Preparation Example | | | |
|---|---|---|---|---|
|  | 5 | 6 | 7 | 8 |
| Crystalline propylene homopolymer obtained in first stage: | | | | |
| MFR (g/10 min) | 11.5 | 19.0 | 26.0 | 18.5 |
| P | 0.982 | 0.979 | 0.985 | 0.941 |
| Finally obtained crystalline ethylene-propylene block copolymer: | | | | |
| MFR (g/10 min) | 8.5 | 9.0 | 7.7 | 8.1 |
| TC$_2$=* (%) | 4.2 | 8.5 | 12.1 | 8.3 |
| RC$_2$=** (%) | 62 | 60 | 62 | 62 |

Note:
*Ethylene content in the total polymer
**Ethylene content in the portion polymerized in the second stage

EXAMPLES 1 TO 11 AND COMPARATIVE EXAMPLES 1 TO 11

A hundred parts of non-stabilized powderous HCPP(H)-(I) prepared in Preparation Example 1 (MFR: 2.5 g/10 min) as a crystalline polyolefin and prescribed amounts of 2,2'-bis(4,6-di-t-butylphenyl) fluorophosphite, 2,2'-methylenebis(4,6-di-t-butylphenyl) fluorophosphite or 2,2'-ethylidenebis(4,6-di-t-butylphenyl) fluorophosphite as Compound A, lithium acetate, sodium acetate, lithium stearate or sodium stearate as Compound B and other additives were put in a Henschel mixer (trade name) at a compounding ratio shown in Table 3 below and mixed with stirring for 3 minutes. The resulting blend was melt-kneaded in a twin-screw extruder (diameter: 30 mm) at 200° C. to pelletize.

For comparison, 100 parts of non-stabilized powderous HCPP(H)-(I) (MFR: 2.5 g/10 min) and prescribed amounts of additives shown in Table 3 were mixed and pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 3.

EXAMPLES 12 TO 22 AND COMPARATIVE EXAMPLES 12 TO 22

A hundred parts of non-stabilized powderous HCPP(H)-(II) prepared in Preparation Example 2 (MFR: 10.6 g/10 min) as a crystalline polyolefin and prescribed amounts of 2,2'-bis(4-sec-eicosylphenyl) fluorophosphite or 2,2'-ethylidenebis(4,6-di-t-butylphenyl) fluorophosphite as Compound A, lithium stearate, sodium stearate, lithium montanate or sodium montanate as Compound B and other additives shown in Table 4 were put in a Henschel mixer (trade name) at a compound ratio shown in Table 4 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(H)-(II) (MFR: 10.6 g/10 min) and additives were mixed as shown in Table 4, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 4.

EXAMPLES 23 TO 33 AND COMPARATIVE EXAMPLES 23 TO 33

A hundred parts of non-stabilized powderous HCPP(H)-(III) prepared in Preparation Example 3 (MFR: 34.0 g/10 min) as a crystalline polyolefin and prescribed amounts of 2,2'-methylenebis(4-methyl-6-t-butylphenyl) fluorophosphite, 2,2'-methylenebis(4,6-di-t-butylphenyl) fluorophosphite or 2,2'-ethylienebis(4,6-di-t-butylpyhenyl) fluorophosphite as Compound A, lithium montanate, sodium montanate, lithium 12-hydroxyoctadecanoate or sodium 12-hydroxyoctadecanoate as Compound B and other additives shown in Table 5 were put in a Henschel mixer (trade name) at a compound ratio shown in Table 5 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(H)-(III) (MFR: 34.0 g/10 min) and additives were mixed as shown in Table 5, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 5.

EXAMPLES 34 TO 44 AND COMPARATIVE EXAMPLES 34 TO 44

A hundred parts of a polymer blend comprising 12% of non-stabilized powderous HCPP(H)-(I) prepared in Preparation Example 1 (MFR: 2.5 g/10 min), 83% of a non-stabilized powderous crystalline ethylene-propylene random copolymer (MFR: 7.0 g/10 min; ethylene content: 2.5%) and 5% of a non-stabilized powderous Ziegler-Natta system high-density , ethylene homopolymer (density: 0.963 g/cm$^3$; MI (molten resin output per 10 minutes at 190° C. under a load of 2.16 kg): 5.0 g/10 min)) as a crystalline polyolefin and prescribed amounts of 2,2'-methylenebis(4,6-di-t-butylphenyl) fluorophosphite, 2,2'-methylenebis(4,6-dinonylphenyl) fluorophosphite or 2,2'-ethylidenebis(4,6-di-t-butylphenyl) fluorophosphite as Compound A, sodium 12-hydroxyoctadecanoate, lithium dimethyldithiocarbamate, sodium diethyldithiocarbamate or potassium di-n-butyldithiocarbamate as Compound B and other additives shown in Table 6 were put in a Henschel mixer (trade name) at a compound ratio shown in Table 6 and mixed with stirring for 3 minutes. The resulting blend was melt-kneaded in a twin-screwed extruder (diameter: 30 mm) at 200° C. to obtain pellets.

For comparison, 100 parts of a polymer blend comprising 12% of non-stabilized powderous HCPP(H)-(I) (MFR: 2.5 g/10 min), 83% of an non-stabilized powderous crystalline ethylene-propylene random copolymer (MFR: 7.0 g/10 min; ethylene content: 2.5%) and 5% of an non-stabilized powderous Ziegler-Natta system high-density ethylene homopolymer (density: 0.963 g/cm$^3$; MI: 5.0 g/10 min) and additives were mixed as shown in Table 6, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 6.

EXAMPLES 45 TO 55 AND COMPARATIVE EXAMPLES 45 TO 55

A hundred parts of a polymer blend comprising 60% of non-stabilized powderous HCPP(H)-(I) prepared in Preparation Example 1 (MFR: 2.5 g/10 min), 10% of a non-stabilized powderous crystalline ethylene-propylene random copolymer (MFR: 7.0 g/10 min; ethylene content: 4.0%), 10% of a nonstabilized powderous crystalline ethylene-propylene-butene-1 terpolymer (MFR: 7.0 g/10 min; ethylene content: 4.0%; butene-1 content: 4.5%) and 20% of an non-stabilized powderous Ziegler-Natta system high-density ethylene-propylene copolymer (density: 0.950 g/cm$^3$; MI: 5.0 g/10 min; methyl branch ratio: 3.0/1000 carbon atoms) as a crystalline polyolefin and prescribed amounts of 2,2'-methylenebis(4,6-di-t-butylphenyl) fluorophosphite, 2,2'-ethylidenebis(4-methyl-6-t-butylphenyl) fluorophosphite or 2,2'-ethylidenebis(4,6-di-t-butylphenyl) fluorophosphite as Compound A, lithium stearate, lithium 2-benzothiazolethiolate, sodium 2-benzothiazolethiolate or potassium 2-tolylthiazolethiolate as Compound B and other additives shown in Table 7 were put in a Henschel mixer (trade name) at a compound ratio shown in Table 7 and mixed with stirring for 3 minutes. The resulting blend was melt-kneaded in a twin-screwed extruder (diameter: 30 mm) at 200° C. to obtain pellets.

For comparison, 100 parts of a polymer blend comprising 60% of non-stabilized powderous HCPP(H)-(I) (MFR: 2.5 g/10 min), 10% of a non-stabilized powderous crystalline ethylene-propylene random copolymer (MFR: 7.0 g/10 min; ethylene content: 4.0%), 10% of a non-stabilized powderous crystalline ethylene-propylene-butene-1 terpolymer (MFR: 7.0 g/10 min; ethylene content: 4.0%; butene-1 content: 4.5%), and 20% of a non-stabilized powderous Ziegler-Natta system high-density ethylene-propylene copolymer (density: 0.950 g/cm$^3$; MI: 5.0 g/10 min; methyl branch ratio: 3.0/1000 carbon atoms) and additives were mixed as shown in Table 7, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 7.

EXAMPLES 56 TO 66 AND COMPARATIVE EXAMPLES 56 TO 66

A hundred parts of non-stabilized powderous PP(H) prepared in Preparation Example 4 (MFR: 9.8 g/10 min) as a a crystalline polyolefin and prescribed amounts of 2,2'-methylenebis(4,6-di-t-butylphenyl) fluorophosphite, 2,2'-ethylidenebis(4,6-di-t-butylphenyl) fluorophosphite or 2,2'-butylidenebis(4-methyl-6-(1'-methylcyclohexyl)phenyl fluorophosphite as Compound A, sodium stearate, lithium 2-benzimidazolethiolate, sodium 2-tolylimidazolethiolate or potassium 2-benzimidazolethiolate as Compound B and other additives shown in Table 8 were put in a Henschel mixer (trade name) at a compound ratio shown in Table 8 and mixed with stirring for 3 minutes. The resulting blend was melt-kneaded in a twin-screwed extruder (diameter: 30 mm) at 200° C. to obtain pellets.

For comparison, 100 parts of non-stabilized powderous PP(H) prepared in Preparation Example 4 (MFR: 9.8 g/10 min) and additives were mixed as shown in Table 8, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 8.

EXAMPLES 67 TO 77 AND COMPARATIVE EXAMPLES 67 TO 77

A hundred parts of non-stabilized powderous PP(H) prepared in Preparation Example 4 (MFR: 9.8 g/10 min) as a crystalline polyolefin and prescribed amounts of 2,2'-methylenebis(4,6-di-t-butylphenyl) fluorophosphite, 2,2'-ethylidenebis(4,6-di-t-butylphenyl) fluorophosphite or 2,2'thiobis(4-methyl-6-t-butylphenyl) fluorophosphite as Compound A, sodium montanate, lithium tolyltriazole, sodium benzotriazole or potassium benzotriazole as Compound B and other additives shown in Table 9 were put in a Henschel mixer (trade name) at a compound ratio shown in Table 9 and mixed with stirring for 3 minutes. The resulting blend was melt-kneaded in a twin-screwed extruder (diameter: 30 mm) at 200° C. to obtain pellets.

For comparison, 100 parts of non-stabilized powderous PP(H) prepared in Preparation Example 4 (MFR: 9.8 g/10 min) and additives were mixed as shown in Table 9, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 9.

EXAMPLES 78 TO 88 AND COMPARATIVE EXAMPLES 78 TO 88

A hundred parts of non-stabilized powderous HCPP(B)-(I) prepared in Preparation Example 5 (MFR: 8.5 g/10 min; ethylene content: 4.2%) as a crystalline polyolefin and prescribed amounts of 2,2'-methylenebis(4,6-di-t-butylphenyl) fluorophosphite, 2,2'-ethylidenebis(4,6-di-t-butylphenyl) fluorophosphite or 2,2'-thiobis(4-methyl-6-α-methylbenzylphenyl) fluorophosphite as Compound A, lithium stearate, sodium stearate, lithium montanate or sodium montanate as Compound B and other additives shown in Table 10 were put in a Henschel mixer (trade name) at a compound ratio shown in Table 10 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(B)-(I) (MFR: 8.5 g/10 min; ethylene content: 4.2%) and additives were mixed as shown in Table 10, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 10.

EXAMPLES 89 TO 99 AND COMPARATIVE EXAMPLES 89 TO 99

A hundred parts of non-stabilized powderous HCPP(B)-(II) prepared in Preparation Example 6 (MFR: 9.0 g/10 min; ethylene content: 8.5%) as a crystalline polyolefin and prescribed amounts of 2,2'-bis(4,6-di-t-butylphenyl) fluorophosphite, 2,2'-methylenebis(4,6-di-t-butylphenyl) fluorophosphite or 2,2'-ethylidenebis(4,6-di-t-butylphenyl) fluorophosphite as Compound A, lithium stearate, sodium stearate, lithium 12-hydroxyoctadecanoate or sodium 12-hydroxyoctadecanoate as Compound B and other additives shown in Table 11 were put in a Henschel mixer (trade name) at a compound ratio shown in Table 11 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(B)-(II) (MFR: 9.0 g/10 min; ethylene content: 8.5%) and additives were mixed as shown in Table 11, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 11.

EXAMPLES 100 TO 110 AND COMPARATIVE EXAMPLES 100 TO 110

A hundred part of non-stabilized powderous HCPP(B)-(III) prepared in Preparation Example 7 (MFR: 7.7 g/10 min; ethylene content: 12.1%) as a crystalline polyloefin and prescribed amounts of 2,2'-methylenebis(4-methyl-6-t-butylphenyl) fluorophosphite, 2,2'-methylenebis(4,6-di-t-butylphenyl) fluorophosphite or 2,2'-ethylidenebis(4,6-di-t-butylphenyl) fluorophosphite as Compound A, lithium montanate, lithium dimethyldithiocarbamate, sodium diethyldithiocarbamate or potassium di-n-butyldithiocarbamate as Compound B and other additives shown in Table 12 were put in a Henschel mixer (trade name) at a compound ratio shown in Table 12 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(B)-(III) (MFR: 7.7 g/10 min; ethylene content: 12.1%) and additives were mixed as shown in Table 12, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 12.

EXAMPLES 111 TO 121 AND COMPARATIVE EXAMPLES 111 TO 121

A hundred parts of non-stabilized powderous HCPP(B)-(II) prepared in Preparation Example 6 (MFR: 9.0 g/10 min; ethylene content: 8.5%) as a crystalline polyolefin and prescribed amounts of 2,2'-methylenebis(4,6-di-t-butylphenyl) fluorophosphite, 2,2'-methylenebis(4,6-dinonylphenyl) fluorophosphite or 2,2'-ethylidenebis(4,6-di-t-butylphenyl) fluorophosphite as Compound A, sodium montanate, lithium 2-benzothiazolethiolate, sodium 2-benzothiazolethiolate or potassium 2-tolylthiazolethiolate as Compound B and other additives shown in Table 13 were put in a Henschel mixer (trade name) at a compound ratio shown in Table 13 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(B)-(II) (MFR: 9.0 g/10 min; ethylene content: 8.5%) and additives were mixed as shown in Table 13, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 13.

EXAMPLES 122 TO 132 AND COMPARATIVE EXAMPLES 122 TO 132

A hundred parts of non-stabilized powderous PP(B) prepared in Preparation Example 8 (MFR: 8.1 g/10 min; ethylene content: 8.3%) as a crystalline polyolefin and prescribed amounts of 2,2'-methylenebis(4,6-di-t-butylphenyl) fluorophosphite, 2,2'-ethylidenebis(4-methyl-6-t-butylphenyl) fluorophosphite or 2,2'-ethylidenebis(4,6-di-t-butylphenyl) fluorophosphite as Compound A, lithium 12-hydroxyoctadecanoate, lithium 2-benzimidazolethiolate, sodium 2-tolylimidazolethiolate or potassium 2-benzimidazolethiolate as Compound B and other additives shown in Table 14 were put in a Henschel mixer (trade name) at a compound ratio shown in Table 14 and mixed with stirring for 3 minutes. The resulting blend was melt-kneaded in a twin-screwed extruder (diameter: 30 mm) at 200° C. to obtain pellets.

For comparison, 100 parts of non-stabilized powderous PP(B) prepared in Preparation Example 8 (MFR: 8.1 g/10 min; ethylene content: 8.3%) and additives were mixed as shown in Table 14, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 14.

EXAMPLES 133 TO 143 AND COMPARATIVE EXAMPLES 133 TO 143

A hundred parts of non-stabilized powderous PP(B) prepared in Preparation Example 8 (MFR: 8.1 g/10 min; ethylene content: 8.3%) as a crystalline polyolefin and prescribed amounts of 2,2'-methylenebis(4,6-di-t-butylphenyl) fluorophosphite, 2,2'-ethylidenebis(4,6-di-t-butylphenyl) fluorophosphite or 2,2'-thiobis(4-methyl-6-t-butylphenyl) fluorophosphite as Compound A, sodium 12-hydroxyoctadecanoate, lithium tolyltriazole, sodium benzotriazole or potassium benzotriazole as Compound B and other additives shown in Table 15 were put in a Henschel mixer (trade name) at a compound ratio shown in Table 15 and mixed with stirring for 3 minutes. The resulting blend was melt-kneaded in a twin-screwed extruder (diameter: 30 mm) at 200° C. to obtain pellets.

For comparison, 100 parts of non-stabilized powderous PP(B) prepared in Preparation Example 8 (MFR: 8.1 g/10 min; ethylene content: 8.3%) and additives were mixed as shown in Table 15, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 15.

EXAMPLES 144 TO 154 AND COMPARATIVE EXAMPLES 144 TO 154

A hundred parts of non-stabilized powderous HCPP(H)-(I) prepared in Preparation Example 1 (MFR: 2.5 g/10 min) as crystalline polyolefin and prescribed amounts of 2,2'-bis(4,6-di-t-butylphenyl) fluorophosphite, 2,2'methylenebis(4,6-di-t-butylphenyl) fluorophosphite or 2,2'-ethylidenebis(4,6-di-t-butylphenyl) fluorophosphite as Compound A, potassium acetate, potassium stearate, strontium 2-ethylhexanoate or strontium stearate as Compound B', laurylamine, N,N-dicocoamine, N,N-bis(2-hydroxyethyl)cocoamine or N,N-bis(2-hydroxyethyl)tallowamine as Compound C and other additives shown in Table 16 were put in a Henschel mixer (trade name) at a compound ratio shown in Table 16 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(H)-(I) (MFR: 2.5 g/10 min) and additives were mixed as shown in Table 16, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 16.

EXAMPLES 155 TO 165 AND COMPARATIVE EXAMPLES 155 TO 165

A hundred parts of non-stabilized powderous HCPP(H)-(II) prepared in Preparation Example 2 (MFR: 10.6 g/10 min) as a crystalline polyolefin and prescribed amounts of 2,2'-bis(4-sec-eicosylphenyl) fluorophosphite, 2,2'-methylenebis(4,6-di-t-butylphenyl) fluorophosphite or 2,2'ethylidenebis(4,6-di-t-butylphenyl) fluorophosphite as Compound A, barium stearate, barium montanate, potassium 12-hydroxyoctadecanoate or strontium 2-hydroxytetradecanoate as Compound B', N-stearyl-N,N-dimethylamine, hexamethylenediamine, N,N-bis(2-hydroxyethyl)cocoamine or N,N-bis(2-hydroxyethyl)tallowamine as Compound C and other additives shown in Table 17 were put in a Henschel mixer (trade name) at a compound ratio shown in Table 17 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(H)-(II) (MFR: 10.6 g/10 min) and additives were mixed as shown in Table 17, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 17.

EXAMPLES 166 TO 176 AND COMPARATIVE EXAMPLES 166 TO 176

A hundred parts of non-stabilized powderous HCPP(H)-(III) prepared in Preparation Example 3 (MFR: 34.0 g/10 min) as a crystalline polyolefin and prescribed amounts of 2,2'-methylenebis(4-methyl-6-t-butylphenyl) fluorophosphite, 2,2'-methylenebis(4,6-di-t-butylphenyl) fluorophosphite or 2,2'-ethylidenebis(4,6-di-t-butylphenyl) fluorophosphite as Compound A, barium ricinoleate, lithium oxalate, sodium succinate or potassium adipate as Compound B', N-tallow-1,3-diaminopropane, hexamethylenetetramine, N,N-bis(2-hydroxyethyl)cocoamine or N,N-bis(2-hydroxyethyl)tallowamine as Compound C and other additives shown in Table 18 were put in a Henschel mixer (trade name) at a compound ratio shown in Table 18 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(H)-(III) (MFR: 34.0 g/10 min) and additives were mixed as shown in Table 18, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 18.

EXAMPLES 177 TO 187 AND COMPARATIVE EXAMPLES 177 TO 187

A hundred parts of a polymer blend comprising 12% of non-stabilized powderous HCPP(H)-(I) prepared in Preparation Example 1 (MFR: 2.5 g/10 min), 83% of a non-stabilized powderous crystalline ethylene-propylene random copolymer (MFR: 7.0 g/10 min; ethylene content: 2.5%) and 5% of a non-stabilized powderous Ziegler-Natta system high-density ethylene homopolymer (density: 0.963 g/cm$^3$; MI: 5.0 g/10 min) as a crystalline polyolefin and prescribed amounts of 2,2'-methylenebis(4,6-dinonylphenyl) fluorophosphite or 2,2'-methylenebis(4,6-dinonylphenyl) fluorophosphite as 2,2'-ethylidenebis(4,6-di-t-butylphenyl) fluorophosphite as Compound A, strontium sebacate, barium 1,2,3,4-butanetetracarboxylate, lithium glycolate or sodium lactate as Compound B', N-docosyl-N,N,N-trimethylammonium chloride, N,N,N-triethyl-N-benzylammonium chloride, N,N-bis(2-hydroxyethyl)cocoamine or N,N-bis(2-hydroxyethyl)tallowamine as Compound C and other additives shown in Table 19 were put in a Henschel mixer (trade name) at a compound ratio shown in Table 19 and mixed with stirring for 3 minutes. The resulting blond was melt-kneaded in a twin-screwed extruder (diameter: 30 mm) at 200° C. to obtain pellets.

For comparison, 100 parts of a polymer blend comprising 12% of non-stabilized powderous HCPP(H)-(I) (MFR: 2.5 g/10 min), 83% of a non-stabilized powderous crystalline ethylene-propylene random copolymer (MFR: 7.0 g/10 min; ethylene content: 2.5%) and 5% of a non-stabilized powderous Ziegler-Natta system high-density ethylene homopolymer (density: 0.963 g/cm$^3$; MI: 5.0 g/10 min) and additives were mixed as shown in Table 19, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 19.

EXAMPLES 188 TO 198 AND COMPARATIVE EXAMPLES 188 TO 198

A hundred parts of a polymer blend comprising 60% of non-stabilized powderous HCPP(H)-(I) prepared in Preparation Example 1 (MFR: 2.5 g/10 min), 10% of a non-stabilized powderous crystalline ethylene-propylene random copolymer (MFR: 7.0 g/10 min; ethylene content: 4.0%), 10% of a non-stabilized powderous crystalline ethylene-propylene-butene-1 terpolymer (MFR: 7.0 g/10 min; ethylene content: 4.0%; butene-1 content: 4.5%) and 20% of a non-stabilized powderous Ziegler-Natta system high-density ethylenepropylene copolymer (density: 0.950 g/cm$^3$; MI: 5.0 g/10 min; methyl branch ratio: 3.0/1000 carbon atoms) as a crystalline polyolefin and prescribed amounts of 2,2'-methylenebis(4,6-di-t-butylphenyl) fluorophosphite, 2,2'-ethylidenebis(4-methyl-6-t-butylphenyl) fluorophosphite or 2,2'ethylidenebis(4,6-di-t-butylphenyl) fluorophosphite as Compound A, potassium malate, magnesium tartrate, strontium racemate or barium citrate as Compound B', N,N-bis(2-hydroxyethyl)-N-oleyl-N-methylammonium chloride, N,N-bis(2-hydroxyethyl)stearylaminobetaine, triisopropanolamine or N,N-bis(2-hydroxyethyl)cocoamine as Compound C and other additives shown in Table 20 were put in a Henschel mixer (trade name) at a compound ratio shown in Table 20 and mixed with stirring for 3 minutes. The resulting blend was melt-kneaded in a twin-screwed extruder (diameter: 30 mm) at 200° C. to obtain pellets.

For comparison, 100 parts of a polymer blend comprising 60% of non-stabilized powderous HCPP(H)-(I) (MFR: 2.5 g/10 min), 10% of an non-stabilized powderous crystalline ethylene-propylene random copolymer (MFR: 7.0 g/10 min; ethylene content: 4.0%), 10% of a non-stabilized powderous crystalline ethylene-propylene-butene-1 terpolymer (MFR: 7.0 g/10 min; ethylene content: 4.0%; butene-1 content: 4.5%) and 20% of a non-stabilized powderous Ziegler-Natta system high-density ethylene-propylene copolymer (density: 0.950 g/cm$^3$; MI: 5.0 g/10 min; methyl branch ratio: 3.0/1000 carbon atoms) and additives were mixed as shown in Table 20, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 20.

EXAMPLES 199 TO 209 AND COMPARATIVE EXAMPLES 199 TO 209

A hundred parts of non-stabilized powderous PP(H) prepared in Preparation Example 4 (MFR: 9.8 g/10 min) as a crystalline polyolefin and prescribed amounts of 2,2'-methylenebis(4,6-di-t-butylphenyl) fluorophosphite, 2,2'-ethylidenebis(4,6-di-t-butylphenyl) fluorophosphite or 2,2'-butylidenebis(4-methyl-6-(1,-methylcyclohexyl)phenyl) fluorophosphite as Compound A, lithium terephthalate, lithium pyromellitate, sodium benzoate or sodium p-toluylate as Compound B', triisopropanolamine, N,N-bis(2-hydroxyethyl)cocoamine, N,N-bis(2-hydroxyethyl)tallowamine or octadecanoic acid 2-[(2-hydroxyethyl)octadecylamino]ethyl ester as Compound C and other additives shown in Table 21 were put in a Henschel mixer at a compound ratio shown in Table 21 and mixed with stirring for 3 minutes. The resulting blend was melt-kneaded in a twin-screwed extruder (diameter: 30 mm) at 200° C. to obtain pellets.

For comparison, 100 parts of non-stabilized powderous PP(H) prepared in Preparation Example 4 (MFR: 9.8 g/10 min) and additives were mixed as shown in Table 21, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 21.

EXAMPLES 210 TO 220 AND COMPARATIVE EXAMPLES 210 TO 220

A hundred parts of non-stabilized powderous PP(H) prepared in Preparation Example 4 (MFR: 9.8 g/10 min) as a crystalline polyolefin and prescribed amounts of 2,2'-methylenebis(4,6-di-t-butylphenyl)] fluorophosphite, 2,2'-ethylidenebis(4,6-di-t-butylphenyl) fluorophosphite or 2,2'-thiobis(4-methyl-6-t-butylphenyl) fluorophosphite as Compound A, strontium naphthoate, strontium phthalate, barium salicylate or barium 3,5-di-t-butyl-4-hydroxybenzoate as Compound B', octadecanoic acid 2-[(2-hydroxyethyl)octadecylamino]ethyl ester, (octadecylimino)diethylene distearate, polyoxyethylene laurylamino ether or polyoxyethylene stearylamino ether as Compound C and other additives shown in Table 22 were put in a Henschel mixer (trade name) at a compound ratio shown in Table 22 and mixed with stirring for 3 minutes. The resulting blend was melt-kneaded in a twin-screwed extruder (diameter: 30 mm) at 200° C. to obtain pellets.

For comparison, 100 parts of non-stabilized powderous PP(H) prepared in Preparation Example 4 (MFR: 9.8 g/10 min) and additives were mixed as shown in Table 22, and the blend was pelletized in the same manner as described above.

Specimens for evaluating stiffness and heat stiffness were prepared by injection molding of the pellets at a resin temperature of 250° C. and a mold temperature of 50° C.

Stiffness and heat stiffness were evaluated using the specimens in accordance with the above-described test methods. The results obtained are shown in Table 22.

EXAMPLES 221 TO 231 AND COMPARATIVE EXAMPLES 221 TO 231

A hundred parts of non-stabilized powderous HCPP(B)-(I) prepared in Preparation Example 5 (MFR: 8.5 g/10 min; ethylene content: 4.2%) as a crystalline polyolefin and prescribed amounts of 2,2'-methylenebis(4,6-di-t-butylphenyl) fluorophosphite, 2,2'-ethylidenebis(4,6-di-t-butylphenyl) fluorophosphite or 2,2'-thiobis(4-methyl-6-α-methylbenzylphenyl) fluorophosphite as Compound A, aluminum p-t-butylbenzoate, aluminum anisate, monolithium glutamate or monosodium glutamate as Compound B', polyoxyethylene laurylamino ether, polyoxyethylene stearylamino ether, N,N,N',N'-tetra(2-hydroxyethyl)-1,3-diaminopropane or N-tallow-N,N',N'-tris(2-hydroxyethyl)-1,3-diaminopropane as Compound C and other additives shown in Table 23 were put in a Henschel mixer (trade name) at a compound ratio shown in Table 23 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(B)-(I) (MFR: 8.5 g/10 min; ethylene content: 4.2%) and additives were mixed as shown in Table 23, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 23.

EXAMPLES 232 TO 242 AND COMPARATIVE EXAMPLES 232 TO 242

A hundred parts of non-stabilized powderous HCPP(B)-(II) prepared in Preparation Example 6 (MFR: 9.0 g/10 min; ethylene content: 8.5%) as a crystalline polyolefin and prescribed amounts of 2,2'-bis(4,6-di-t-butylphenyl) fluorophosphite, 2,2'-methylenebis(4,6-di-t-butylphenyl) fluorophosphite or 2,2'-ethylidenebis(4,6-di-t-butylphenyl) fluorophosphite as Compound A, monopotassium glutamate, strontium glutamate, barium glutamate or sodium (mono- and di-mixed) 2-ethylhexylphosphate as Compound B', polyoxyethylene stearylamino ether, N,N,N',N'-tetra(2-hydroxyethyl)-1,3-diaminopropane, N-tallow-N,N',N'-tris(2-hydroxyethyl)-1,3-diaminopropane or N,N-dicoco-N',N'-bis(2-hydroxyethyl)-1,6-diaminohexane as Compound C and other additives shown in Table 24 were put in a Henschel mixer (trade name) at a compound ratio shown in Table 24 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(B)-(II) (MFR: 9.0 g/10 min; ethylene content: 8.5%) and additives were mixed as shown in Table 24, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 24.

EXAMPLES 243 TO 253 AND COMPARATIVE EXAMPLES 243 TO 253

A hundred parts of non-stabilized powderous HCPP(B)-(III) prepared in Preparation Example 7 (MFR: 7.7 g/10 min; ethylene content: 12.1%) as a crystalline polyolefin and prescribed amounts of 2,2'-methylenebis(4-methyl-6-t-butylphenyl) fluorophosphite, 2,2'-methylenebis(4,6-di-t-butylphenyl) fluorophosphite or 2,2'-ethylidenebis(4,6-di-t-butylphenyl) fluorophosphite as Compound A, potassium (mono- and di-mixed) laurylphosphate, calcium (mono- and di-mixed) stearylphosphate, strontium (mono- and di-mixed) docosylphosphate or barium (mono- and di-mixed) octacosylphosphate as Compound B', N,N-bis(2-hydroxyethyl)cocoamine, N,N-bis(2-hydroxyethyl)tallowamine, octadecanoic acid 2-[(2-hydroxyethyl)octadecylamino]ethyl ester or (octadecylimino)-diethylene distearate as Compound C and other additives shown in Table 25 were put in a Henschel mixer (trade name) at a compound ratio shown in Table 25 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(B)-(III) (MFR: 7.7 g/10 min; ethylene content: 12.1%) and additives were mixed as shown in Table 25, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 25.

EXAMPLES 254 TO 264 AND COMPARATIVE EXAMPLES 254 TO 264

A hundred parts of non-stabilized powderous HCPP(B)-(II) prepared in Preparation Example 6 (MFR: 9.0 g/10 min; ethylene content: 8.5%) as a crystalline polyolefin and prescribed amounts of 2,2'-methylenebis(4,6-di-t-butylphenyl) fluorophosphite, 2,2'-methylenebis(4,6-dinonylphenyl) fluorophosphite or 2,2'-ethylidenebis(4,6-di-t-butylphenyl) fluorophosphite as Compound A, a lithium salt of 2,6,8-tri-t-butyl-10-hydroxy-9,10-dihydro-9-oxa-10-phosphaphenanthrene-10oxide, a sodium salt of 10-hydroxy-9,10-dihydro-9-oxa-10-phosphaphenanthrene-10-oxide, a sodium salt of 2-cyclohexyl-10-hydroxy-9,10-dihydro-9-oxa-10-phosphaphenanthrene-10-oxide or a potassium salt of 6-phenyl-10-hydroxy-9,10-dihydro-9-oxa-10-phosphaphenanthrene-10-oxide as Compound B', N,N-bis(2-hydroxyethyl)cocoamine, N,N,N',N'-tetra(2-hydroxyethyl)-1,3-diaminopropane, N-tallow-N,N',N'-tris(2-hydroxyethyl)-1,3-diaminopropane or N,N-dicoco-N',N'-bis(2-hydroxyethyl)-1,6-diaminohexane and other additives shown in Table 26 were put in a Henschel mixer (trade name) at a compound ratio shown in Table 26 and mixed with stirring for 3 minutes. The resulting blend was melt-kneaded in a twin-screwed extruder (diameter: 30 mm) at 200° C. to obtain pellets.

For comparison, 100 parts of non-stabilized powderous HCPP(B)-(II) (MFR: 9.0 g/10 min; ethylene content: 8.5%) and additives were mixed as shown in Table 26, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 26.

EXAMPLES 265 TO 275 AND COMPARATIVE EXAMPLES 265 TO 275

A hundred parts of non-stabilized powderous PP(B) prepared in Preparation Example 8 (MFR: 8.1 g/10 min; ethylene content: 8.3%) as a crystalline polyolefin and prescribed amounts of 2,2'-methylenebis(4,6-di-t-butylphenyl) fluorophosphite, 2,2'-ethylidenebis(4-methyl-6-t-butylphenyl) fluorophosphite or 2,2'-ethylidenebis(4,6-di-t-butylphenyl) fluorophosphite as Compound A, a barium salt of 2-benzyl-10-hydroxy-9,10-dihydro-9-oxa-10-phosphaphenanthrene-10-oxide, a barium salt of 6-(α-methylbenzyl)-8-t-butyl-10-hydroxy-9,10-dihydro-9-oxa-10-phosphaphenanthrene-10-oxide, magnesium hydroxide or aluminum hydroxide as Compound B', N,N-bis(2-hydroxyethyl)tallowamine, N,N,N',N,-tetra(2-hydroxyethyl)1,3-diaminopropane, N-tallow-N,N',N'-tris(2-hydroxyethyl)-1,3-diaminopropane or N,N-dicoco-N',N'-bis(2-hydroxyethyl)1,6- diaminohexane as Compound C and other additives as shown in Table 27 were put in a Henschel mixer (trade name) at a compound ratio shown in Table 27 and mixed with stirring for 3 minutes. The resulting blend was melt-kneaded in a twin-screwed extruder (diameter: 30 mm) at 200° C. to obtain pellets.

For comparison, 100 parts of non-stabilized powderous PP(B) (MFR: 8.1 g/10 min; ethylene content: 8.3%) and additives were mixed as shown in Table 27, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 27.

EXAMPLES 276 TO 286 AND COMPARATIVE EXAMPLES 276 TO 286

A hundred parts of non-stabilized powderous PP(B) prepared in Preparation Example 8 (MFR: 8.1 g/10 min; ethylene content: 8.3%) as a crystalline polyolefin and prescribed amounts of 2,2'-methylenebis(4,6-di-t-butylphenyl) fluorophosphite, 2,2'-ethylenebis(4,6-di-t-butylphenyl) fluorophosphite or 2,2'-thiobis(4-methyl-6-t-butylphenyl) fluorophosphite as Compound A, magnesium oxide, magnesium carbonate, calcium carbonate or hydrotalcite as Compound B', octadecanoic acid 2-[(2-hydroxyethyl)octadecylamino]ethyl ester, N,N,N',N'-tetra(2-hydroxyethyl)-1,3-diaminopropane, N-tallow-N,N',N'-tris(2-hydroxyethyl)-1,3-diaminopropane or N,N-dicoco-N',N'-bis(2-hydroxyethyl)-1,6-diaminohexane as Compound C and other additives as shown in Table 28 were put in a Henschel mixer (trade name) at a compound ratio shown in Table 28 and mixed with stirring for 3 minutes. The resulting blend was melt-kneaded in a twin-screwed extruder (diameter: 30 mm) at 200° C. to obtain pellets.

For comparison, 100 parts of non-stabilized powderous PP(B) (MFR: 8.1 g/10 min; ethylene content: 8.3%) and additives were mixed as shown in Table 28, and the blend was pelletized in the same manner as described above.

Specimens for evaluating stiffness, heat stiffness, and impact resistance were prepared by injection molding of the pellets at a resin temperature of 250° C. and a mold temperature of 50° C.

Stiffness, heat stiffness, and impact resistance were evaluated using the specimens in accordance with the above-described test methods. The results obtained are shown in Table 28.

In Tables 3 to 28 shown below, Compounds A, B, B' and C and other additives used are as follows.

Compound A (I) 2,2'-Bis(4,6-di-t-butylphenyl) fluorophosphite
(II): 2,2'-Bis(4-sec-eicosylphenyl) fluorophosphite
(III): 2,2'-Methylenebis(4-methyl-6-t-butylphenyl) fluorophosphite
(IV): 2,2'-Methylenebis(4,6-di-t-butylphenyl) fluorophosphite
(V): 2,2'-Methylenebis(4,6-dinonylphenyl) fluorophosphite
(VI): 2,2'-Ethylidenebis(4-methyl-6-t-butylphenyl) fluorophosphite
(VII): 2,2'-Ethylidenebis(4,6-di-t-butylphenyl) fluorophosphite
(VIII): 2,2'-Butylidenebis(4-methyl-6-(1,-methylcyclohexyl)phenyl) fluorophosphite
(IX): 2,2'-Thiobis(4-methyl-6-t-butylphenyl) fluorophosphite
(X): 2,2'-Thiobis(4-methyl-6-α-methylbenzylphenyl) fluorophosphite

Compound B (I): Lithium acetate
(II): Sodium acetate
(III): Lithium stearate
(IV): Sodium stearate
(V): Lithium montanate
(VI): Sodium montanate
(VII): Lithium 12-hydroxyoctadecanoate
(VIII): Sodium 12-hydroxyoctadecanoate
(IX): Lithium dimethyldithiocarbamate
(X): Sodium diethyldithiocarbamate
(XI): Potassium di-n-butyldithiocarbamate
(XII): Lithium 2-benzothiazolethiolate
(XIII): Sodium 2-benzothiazolethiolate
(XIV): Potassium 2-tolylthiazolethiolate
(XV): Lithium 2-benzimidazolethiolate
(XVI): Sodium 2-tolylimidazolethiolate
(XVII): Potassium 2-benzimidazolethiolate
(XVIII): Lithium tolyltriazole
(XIX): Sodium benzotriazole
(XX): Potassium benzotriazole

Compound B'

(I): Potassium acetate
(II): Potassium stearate
(III): Strontium 2-ethylhexanoate
(IV): Strontium stearate
(V): Barium stearate
(VI): Barium montanate
(VII): Potassium 12-hydroxyoctadecanoate
(VIII): Strontium 2-hydroxytetradecanoate
(IX): Barium ricinoleate
(X): Lithium oxalate
(XI): Sodium succinate
(XII): Potassium adipate
(XIII): Strontium sebacate
(XIV): Barium 1,2,3,4-butanetetracarboxylate
(XV): Lithium glycolate
(XVI): Sodium lactate
(XVII): Potassium malate
(XVIII): Magnesium tartrate
(XIX): Strontium racemate
(XX): Barium citrate
(XXI): Lithium terephthalate
(XXII): Lithium pyromellitate
(XXIII): Sodium benzoate
(XXIV): Sodium p-toluylate
(XXV): Strontium naphthoate
(XXVI): Strontium phthalate
(XXVII): Barium salicylate
(XXVIII): Barium 3,5-di-t-butyl-4-hydroxybenzoate
(XXIX): Aluminum p-t-butylbenzoate
(XXX): Aluminum anisate
(XXXI): Monolithium glutamate
(XXXII): Monosodium glutamate
(XXXIII): Monopotassium glutamate
(XXXIV): Strontium glutamate
(XXXV): Barium glutamate (XXXVI): Sodium (mono- and di-mixed) 2-ethylhexylphosphate
(XXXVII): Potassium (mono- and di-mixed) laurylphosphate
(XXXVIII): Calcium (mono- and di-mixed) stearylphosphate
(XXXIX): Strontium (mono- and di-mixed) docosylphosphate
(XL): Barium (mono- and di-mixed) octacosylphosphate
(XLI): Lithium 2,6,8-tri-t-butyl-10-hydroxy-9,10-dihydro-9-oxa-10-phosphaphenanthrene-10-oxide
(XLII): Sodium 10-hydroxy-9,10-dihydro-9-oxa-10-phosphaphenanthrene-10-oxide
(XLIII): Sodium 2-cyclohexyl-10-hydroxy-9,10-dihydro-9-oxa-10-phosphaphenanthrene-10-oxide
(XLIV): Potassium 6-phenyl-10-hydroxy-9,10-dihydro-9-oxa-10-phosphaphenanthrene-10-oxide
(XLV): Barium 2-benzyl-10-hydroxy-9,10-dihydro-9-oxa-10-phosphaphenanthrene-10-oxide
(XLVI): Barium 6-(α-methylbenzyl)-8-t-butyl-10-hydroxy-9,10-dihydro-9-oxa-10-phosphaphenanthrene-10oxide
(XLVII): Magnesium hydroxide
(XLVIII): Aluminum hydroxide
(XLIX): Magnesium oxide
(L): Magnesium carbonate
(LI): Calcium carbonate
(LII): Hydrotalcite ($Mg_{4.5}Al_2(OH)_{13}CO_3 \cdot 3.5H_2O$) ("DHT-4A" produced by Kyowa Chemical Industry Co., Ltd.)

Compound C (I): Laurylamine
(II): N,N-Dicocoamine
(III): N-Stearyl-N,N-dimethylamine
(IV): Hexamethylenediamine
(V): N-Tallow-1,3-diaminopropane
(VI): Hexamethylenetetramine
(VII): N-Docosyl-N,N,N-trimethylammonium chloride
(VIII): N,N,N-Triethyl-N-benzylammonium chloride
(IX): N,N-Bis(2-hydroxyethyl)-N-oleyl-N-methylammonium chloride
(X): N,N-Bis(2-hydroxyethyl)stearylaminobetaine
(XI): Triisopropanolamine
(XII): N,N-Bis(2-hydroxyethyl)cocoamine
(XIII): N,N-Bis(2-hydroxyethyl)tallowamine
(XIV): Octadecanoic acid 2-[(2-hydroxyethyl)octadecylamino]ethyl ester
(XV): (Octadecylimino)diethylene distearate
(XVI): Poly oxyethylene laurylamino ether

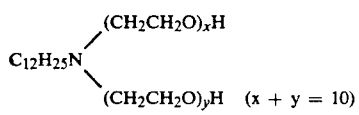

(XVII): Polyoxyethylene stearylamino ether

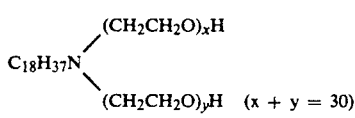

(XVIII): N,N,N',N'-Tetra(2-hydroxyethyl)-1,3-diaminopropane
(XIX): N-Tallow-N,N',N'-tris(2-hydroxyethyl)-1,3-diaminopropane
(XX): N,N-Dicoco-N',N'-bis(2-hydroxyethyl)-1,6-diaminohexane Inorganic Filler 1: Talc (average particle size: 2 to 3 μm)
2: Calcium carbonate (average particle size: 1 to 2 μm)
3: Barium sulfate (average particle size: 0.4 to 0.6 μm)
4: Silicon dioxide (average particle size: 1.8 μm)

Phenol Antioxidant

1: 2,6-Di-t-butyl-p-cresol
2: Tetrakis[methylene-3-(3',5,-di-t-butyl-4'-hydroxyphenyl)propionate]methane
3: 1,3,5-Trimethyl-2,4,6-tris(3,5-di-t-butyl-4-hydroxybenzyl)benzene
4: Tris(3,5-di-t-butyl-4-hydroxybenzyl) isocyanurate
5: n-Octadecyl-β-(4'-hydroxy-3',5'-di-t-butylphenyl) propionate
6: Tris(4-t-butyl-3-hydroxy-2,6-dimethylbenzyl) isocyanurate
7: 3,9-Bis[1,1-dimethyl-2-{β-(3-t-butyl-4-hydroxy-5methylphenyl)propionyloxy}ethyl]-2,4,8,10-tetraoxaspiro[5.5]undecane
8: 2,2-Bis[4-{2-(3,5-di-t-butyl-4-hydroxyphenylpropionyl-oxy)ethoxy}phenyl]propane
9: Bis[2-(3,-t-butyl-2,-hydroxy-5,-methylbenzyl)-6-t-butyl-4-methylphenyl] terephthalate
10: Bis[3,3-bis(4'-hydroxy-3'-t-butylphenyl)butyric acid] ethylene glycol ester
11: 2,2'-Ethylidenebis(4,6-di-t-butylphenol)
12: 2-t-Butyl-6-(3-t-butyl-2-hydroxy-5-methylbenzyl)-4-methylphenyl acrylate
13: Tocopherol Thioether Antioxidant 1: Dimyristyl thiodipropionate
2: Distearyl thiodipropionate
3: Pentaerythritol tetrakis(3-laurylthiopropionate)

Phosphorus Antioxidant

1: Bis(2,4-di-t-butylphenyl)pentaerythritol diphosphite
2: Bis(2,6-di-t-butyl-4-methylphenyl)pentaerythritol diphosphite
3: Bis(2,4,6-tri-t-butylphenyl)pentaerythritol diphosphite
4: Tetrakis(2,4-di-t-butylphenyl)-4,4'-biphenylene diphosphonite
5: Tris(2,4-di-t-butylphenyl) phosphite
6: 2,2,-Methylenebis(4,6-di-t-butylphenyl) octylphosphite Light stabilizer 1: 2-Hydroxy-4-n-octoxybenzophenone
2: 2-(2'-Hydroxy-3'-t-butyl-5'-methylphenyl)-5-chlorobenzotriazole
3: 2,4-Di-t-butylphenyl 3',5'-di-t-butyl-4'-hydroxybenzoate
4: Bis(2,2,6,6-tetramethyl-4-piperidyl) sebacate
5: Tetrakis(2,2,6,6-tetramethyl-4-piperidyl) 1,2,3,4-butanetetracarboxylate
6: 3,9-Bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane
7: Poly[[6-[(1,1,3,3-tetramethylbutyl)imino]-1,3,5-triazine-2,4-diyl] [(2,2,6,6-tetramethyl-4-piperidyl)imino]

hexamethylene[(2,2,6,6-tetramethyl-4-piperidyl)imino]]
8: Poly[[6-morpholino-1,3,5-triazine-2,4-diyl] [(2,2,6,6-tetramethyl-4-piperidyl)imino] hexamethylene[(2,2,6,6-tetramethyl-4-piperidyl)imino]]

Metal Deactivator

1: N,N'-Bis[2-{3-(3,5-di-t-butyl-4-hydroxyphenyl)propionyloxy}ethyl] oxamide
2: Tris[2-t-butyl-4-thio(2'-methyl-4'-hydroxy-5'-t-butylphenyl)-5-methylphenyl] phosphite
3: N,N'-Bis[3-(3,5-di-t-butyl-4-hydroxyphenyl)propionyl] hydrazine
4: 3-Salicyloylamino-1,2,4-triazole
5: Decamethylenedicarboxylic acid bis(N'-salicyloylhydrazide)

Radical Generator

1: 2,5-Dimethyl-2,5-di(t-butylperoxy)hexane
2: 1,3-Bis(t-butylperoxyisopropyl)benzene

Clarifier

1: 1.3,2.4-Dibenzylidenesorbitol
2: 1.3,2.4-Di(p-methylbenzylidene)sorbitol
3: 1.3,2.4-Di(p-ethylbenzylidene)sorbitol
4: 1.3-p-Chlorobenzylidene-2.4-p-methylbenzylidenesorbitol

Antistatic Agent

Glyceryl monostearate

Lubricant

1: Oleylamide
2: Erucamide
3: N,N'-Ethylenebisstearamide

EPR

Non-crystalline ethylene-propylene random copolymer (Mooney viscosity: 63-ML1+4 (100° C.); propylene content: 23%; "JSR T 7961" produced by Japan Synthetic Rubber Co., Ltd.)

EPDM

Non-crystalline ethylene-propylene-ethylidene norbornene random copolymer (Mooney viscosity: 82-ML1+4 (100° C.); propylene content: 26%; iodine value: 15.0; "JSR EP 57P" produced by Japan Synthetic Rubber Co., Ltd.)

Nucleating Agent

1: Sodium benzoate
2: Aluminum p-t-butylbenzoate
3: Sodium bis(p-t-butylphenyl)phosphate
4: Benzoic acid

Metal Salt

1: Calcium stearate
2: Zinc stearate
3: Sodium lactate
4: Sodium (mono- and di-mixed) stearylphosphate
5: Lithium dodecylsulfate
6: Sodium polyoxyethylene lauryl ether sulfate
7: Sodium dodecylbenzenesulfonate

Aromatic Amine 4,4'-Bis($\alpha,\alpha'$-dimethylbenzyl)diphenylamine

TABLE 3

| Composition (part*): | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Compound A (I) | 0.1 | — | — | — | — | — | — | — | — | — | — |
| Compound A (IV) | — | 0.1 | — | — | — | — | — | 0.1 | 0.1 | 0.1 | 0.1 |
| Compound A (VII) | — | — | 0.1 | 0.1 | 0.1 | 0.1 | 0.1 | — | — | — | — |
| Compound B (I) | — | — | — | 0.1 | — | — | — | — | — | — | — |
| Compound B (II) | — | — | — | — | 0.1 | — | — | — | — | — | — |
| Compound B (III) | 0.1 | 0.1 | 0.1 | — | — | 0.1 | — | — | — | — | — |
| Compound B (IV) | — | — | — | — | — | — | 0.1 | 0.1 | 0.1 | 0.1 | 0.1 |
| Compound C (I) | — | — | — | — | — | — | — | 0.1 | — | — | — |
| Compound C (II) | — | — | — | — | — | — | — | — | 0.1 | — | — |
| Compound C (XII) | — | — | — | — | — | — | — | — | — | 0.1 | — |
| Compound C (XIII) | — | — | — | — | — | — | — | — | — | — | 0.1 |
| Phenol Antioxidant 1 | — | — | — | 0.1 | 0.1 | 0.1 | 0.1 | 0.1 | 0.1 | 0.1 | 0.1 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × $10^4$ (kgf/cm$^2$) | 2.35 | 2.34 | 2.35 | 2.33 | 2.35 | 2.36 | 2.35 | 2.40 | 2.41 | 2.44 | 2.42 |
| Heat Distortion Temperature (°C.) | 144 | 145 | 145 | 144 | 145 | 145 | 145 | 146 | 147 | 148 | 148 |

| Composition (part*): | Comparative Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Compound A (I) | — | — | — | — | — | — | — | — | — | — | — |
| Compound A (IV) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (I) | — | — | — | — | — | — | — | — | — | — | — |
| Compound B (II) | — | — | — | — | — | — | — | — | — | — | — |
| Compound B (III) | — | — | — | — | — | — | — | — | — | — | — |
| Compound B (IV) | — | — | — | — | — | — | — | — | — | — | — |
| Compound C (I) | — | — | — | — | — | — | — | — | — | — | — |
| Compound C (II) | — | — | — | — | — | — | — | — | — | — | — |

TABLE 3-continued

| | | | | | | | | | | | |
|---|---|---|---|---|---|---|---|---|---|---|---|
| Compound C (XII) | — | — | — | — | — | — | — | — | — | — | — |
| Compound C (XIII) | — | — | — | — | — | — | — | — | — | — | — |
| Phenol Antioxidant 1 | — | 0.1 | 0.1 | 0.1 | 0.1 | 0.1 | 0.1 | 0.1 | 0.1 | 0.1 | 0.1 |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus × 10⁴ (kgf/cm²) | 1.75 | 2.18 | 2.01 | 2.23 | 1.60 | 1.59 | 1.84 | 1.65 | 1.59 | 1.64 | 1.64 |
| Heat Distortion Temperature (°C.) | 125 | 141 | 138 | 141 | 125 | 117 | 134 | 124 | 121 | 118 | 124 |

Note: *Per 100 parts of a crystalline polyolefin

TABLE 4

| | Example No. | | | | | | | | | | |
|---|---|---|---|---|---|---|---|---|---|---|---|
| Composition (part*): | 12 | 13 | 14 | 15 | 16 | 17 | 18 | 19 | 20 | 21 | 22 |
| Compound A (II) | 0.1 | — | — | — | — | — | — | — | — | — | — |
| Compound A (IV) | — | 0.1 | — | — | — | — | — | 0.001 | 0.001 | 0.001 | 0.001 |
| Compound A (VII) | — | — | 0.1 | 0.001 | 0.001 | 0.001 | 0.001 | — | — | — | — |
| Compound B (III) | — | — | — | 0.001 | — | — | — | — | — | — | — |
| Compound B (IV) | — | — | — | — | 0.001 | — | — | — | — | — | — |
| Compound B (V) | 0.1 | 0.1 | 0.1 | — | — | 0.001 | — | — | — | — | — |
| Compound B (VI) | — | — | — | — | — | — | 0.001 | 0.001 | 0.001 | 0.001 | 0.001 |
| Compound C (III) | — | — | — | — | — | — | — | 0.01 | — | — | — |
| Compound C (IV) | — | — | — | — | — | — | — | — | 0.01 | — | — |
| Compound C (XII) | — | — | — | — | — | — | — | — | — | 0.01 | — |
| Compound C (XIII) | — | — | — | — | — | — | — | — | — | — | 0.01 |
| Phenol Antioxidant 2 | — | — | — | 0.05 | 0.05 | 0.05 | 0.05 | 0.05 | 0.05 | 0.05 | 0.05 |
| Thioether Antioxidant 1 | — | — | — | 0.1 | 0.1 | 0.1 | 0.1 | 0.1 | 0.1 | 0.1 | 0.1 |
| Clarifier 1 | — | — | — | 0.25 | — | — | — | — | — | — | — |
| Clarifier 2 | — | — | — | — | 0.25 | — | — | — | — | — | — |
| Clarifier 3 | — | — | — | — | — | 0.25 | — | — | — | — | — |
| Clarifier 4 | — | — | — | — | — | — | 0.25 | — | — | — | — |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × 10⁴ (kgf/cm²) | 2.30 | 2.31 | 2.31 | 2.30 | 2.30 | 2.32 | 2.31 | 2.38 | 2.39 | 2.40 | 2.41 |
| Heat Distortion Temperature (°C.) | 143 | 144 | 145 | 143 | 144 | 145 | 144 | 145 | 146 | 147 | 146 |

| | Comparative Example No. | | | | | | | | | | |
|---|---|---|---|---|---|---|---|---|---|---|---|
| Composition (part*): | 12 | 13 | 14 | 15 | 16 | 17 | 18 | 19 | 20 | 21 | 22 |
| Compound A (II) | — | — | — | — | — | — | — | — | — | — | — |
| Compound A (IV) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (III) | — | — | — | — | — | — | — | — | — | — | — |
| Compound B (IV) | — | — | — | — | — | — | — | — | — | — | — |
| Compound B (V) | — | — | — | — | — | — | — | — | — | — | — |
| Compound B (VI) | — | — | — | — | — | — | — | — | — | — | — |
| Compound C (III) | — | — | — | — | — | — | — | — | — | — | — |
| Compound C (IV) | — | — | — | — | — | — | — | — | — | — | — |
| Compound C (XII) | — | — | — | — | — | — | — | — | — | — | — |
| Compound C (XIII) | — | — | — | — | — | — | — | — | — | — | — |
| Phenol Antioxidant 2 | — | 0.05 | 0.05 | 0.05 | 0.05 | 0.05 | 0.05 | 0.05 | 0.05 | 0.05 | 0.05 |
| Thioether Antioxidant 1 | — | 0.1 | 0.1 | 0.1 | 0.1 | 0.1 | 0.1 | 0.1 | 0.1 | 0.1 | 0.1 |
| Clarifier 1 | — | — | — | — | — | — | — | — | — | — | — |
| Clarifier 2 | — | — | — | — | — | — | — | — | — | — | — |
| Clarifier 3 | — | — | — | — | — | — | — | — | — | — | — |
| Clarifier 4 | — | — | — | — | — | — | — | — | — | — | — |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |

TABLE 4-continued

| | | | | | | | | | | | |
|---|---|---|---|---|---|---|---|---|---|---|---|
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus × $10^4$ (kgf/cm$^2$) | 1.70 | 2.12 | 1.93 | 2.18 | 1.55 | 1.52 | 1.80 | 1.61 | 1.54 | 1.60 | 1.61 |
| Heat Distortion Temperature (°C.) | 123 | 140 | 138 | 140 | 123 | 115 | 133 | 121 | 120 | 118 | 123 |

Note: *Per 100 parts of a crystalline polyolefin

TABLE 5

| | Example No. | | | | | | | | | | |
|---|---|---|---|---|---|---|---|---|---|---|---|
| Composition (part*): | 23 | 24 | 25 | 26 | 27 | 28 | 29 | 30 | 31 | 32 | 33 |
| Compound A (III) | 0.1 | — | — | — | — | — | — | 0.001 | 0.001 | 0.001 | 0.001 |
| Compound A (IV) | — | 0.1 | — | — | — | — | — | 0.002 | 0.002 | 0.002 | 0.002 |
| Compound A (VII) | — | — | 0.1 | 0.005 | 0.005 | 0.005 | 0.005 | 0.001 | 0.001 | 0.001 | 0.001 |
| Compound B (V) | — | — | — | 0.005 | — | — | — | 0.001 | 0.001 | 0.001 | 0.001 |
| Compound B (VI) | — | — | — | — | 0.005 | — | — | 0.001 | 0.001 | 0.001 | 0.001 |
| Compound B (VII) | 0.1 | 0.1 | 0.1 | — | — | 0.005 | — | 0.001 | 0.001 | 0.001 | 0.001 |
| Compound B (VIII) | — | — | — | — | — | — | 0.005 | 0.002 | 0.002 | 0.002 | 0.002 |
| Compound C (V) | — | — | — | — | — | — | — | 0.03 | — | — | — |
| Compound C (VI) | — | — | — | — | — | — | — | — | 0.03 | — | — |
| Compound C (XII) | — | — | — | — | — | — | — | — | — | 0.03 | — |
| Compound C (XIII) | — | — | — | — | — | — | — | — | — | — | 0.03 |
| Inorganic Filler 1 | 0.1 | 0.1 | 0.1 | 0.1 | 0.1 | 0.1 | 0.1 | 0.1 | 0.1 | 0.1 | 0.1 |
| Phenol Antioxidant 3 | — | — | — | 0.1 | 0.1 | 0.1 | 0.1 | 0.1 | 0.1 | 0.1 | 0.1 |

| | Comparative Example No. | | | | | | | | | | |
|---|---|---|---|---|---|---|---|---|---|---|---|
| Composition (part*): | 23 | 24 | 25 | 26 | 27 | 28 | 29 | 30 | 31 | 32 | 33 |
| Compound A (III) | — | — | — | — | — | — | — | — | — | — | — |
| Compound A (IV) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (V) | — | — | — | — | — | — | — | — | — | — | — |
| Compound B (VI) | — | — | — | — | — | — | — | — | — | — | — |
| Compound B (VII) | — | — | — | — | — | — | — | — | — | — | — |
| Compound B (VIII) | — | — | — | — | — | — | — | — | — | — | — |
| Compound C (V) | — | — | — | — | — | — | — | — | — | — | — |
| Compound C (VI) | — | — | — | — | — | — | — | — | — | — | — |
| Compound C (XII) | — | — | — | — | — | — | — | — | — | — | — |
| Compound C (XIII) | — | — | — | — | — | — | — | — | — | — | — |
| Inorganic Filler 1 | 0.1 | 0.1 | 0.1 | 0.1 | 0.1 | 0.1 | 0.1 | 0.1 | 0.1 | 0.1 | 0.1 |
| Phenol Antioxidant 3 | — | 0.1 | 0.1 | 0.1 | 0.1 | 0.1 | 0.1 | 0.1 | 0.1 | 0.1 | 0.1 |

| | Example No. | | | | | | | | | | |
|---|---|---|---|---|---|---|---|---|---|---|---|
| Composition (part*): | 23 | 24 | 25 | 26 | 27 | 28 | 29 | 30 | 31 | 32 | 33 |
| Metal Deactivator 1 | — | — | — | 0.1 | — | — | — | — | — | — | — |
| Metal Deactivator 2 | — | — | — | — | 0.1 | — | — | — | — | — | — |
| Metal Deactivator 3 | — | — | — | — | — | 0.1 | — | — | — | — | — |
| Metal Deactivator 4 | — | — | — | — | — | — | 0.1 | — | — | — | — |
| Metal Deactivator 5 | — | — | — | — | — | — | — | 0.1 | — | — | — |
| Lubricant 1 | — | — | — | — | — | — | — | — | 0.1 | — | — |
| Lubricant 2 | — | — | — | — | — | — | — | — | — | 0.1 | — |
| Lubricant 3 | — | — | — | — | — | — | — | — | — | — | 0.1 |
| Nucleating Agent 1 | — | — | — | — | — | — | — | — | — | — | — |
| Nucleating Agent 2 | — | — | — | — | — | — | — | — | — | — | — |

| | Comparative Example No. | | | | | | | | | | |
|---|---|---|---|---|---|---|---|---|---|---|---|
| Composition (part*): | 23 | 24 | 25 | 26 | 27 | 28 | 29 | 30 | 31 | 32 | 33 |
| Metal Deactivator 1 | — | — | — | — | — | — | — | — | — | — | — |
| Metal Deactivator 2 | — | — | — | — | — | — | — | — | — | — | — |
| Metal Deactivator 3 | — | — | — | — | — | — | — | — | — | — | — |
| Metal Deactivator 4 | — | — | — | — | — | — | — | — | — | — | — |
| Metal Deactivator 5 | — | — | — | — | — | — | — | — | — | — | — |
| Lubricant 1 | — | — | — | — | — | — | — | — | — | — | — |
| Lubricant 2 | — | — | — | — | — | — | — | — | — | — | — |
| Lubricant 3 | — | — | — | — | — | — | — | — | — | — | — |
| Nucleating Agent 1 | — | 0.1 | — | — | — | — | — | — | — | — | — |

TABLE 5-continued

| | | | | | | | | | | | |
|---|---|---|---|---|---|---|---|---|---|---|---|
| Nucleating Agent 2 | — | — | 0.1 | — | — | — | — | — | — | — | — |

| | Example No. | | | | | | | | | | |
|---|---|---|---|---|---|---|---|---|---|---|---|
| Composition (part*): | 23 | 24 | 25 | 26 | 27 | 28 | 29 | 30 | 31 | 32 | 33 |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × 10⁴ (kgf/cm²) | 2.66 | 2.66 | 2.70 | 2.68 | 2.69 | 2.71 | 2.70 | 2.74 | 2.77 | 2.79 | 2.78 |
| Heat Distortion Temperature (°C.) | 149 | 150 | 151 | 150 | 151 | 150 | 151 | 153 | 152 | 153 | 154 |

| | Comparative Example No. | | | | | | | | | | |
|---|---|---|---|---|---|---|---|---|---|---|---|
| Composition (part*): | 23 | 24 | 25 | 26 | 27 | 28 | 29 | 30 | 31 | 32 | 33 |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus × 10⁴ (kgf/cm²) | 2.00 | 2.41 | 2.29 | 2.51 | 1.88 | 1.85 | 2.18 | 1.95 | 1.92 | 1.95 | 1.97 |
| Heat Distortion Temperature (°C.) | 129 | 144 | 142 | 145 | 130 | 121 | 139 | 128 | 127 | 121 | 129 |

Note: *Per 100 parts of a crystalline polyolefin

TABLE 6

| | Example No. | | | | | | | | | | |
|---|---|---|---|---|---|---|---|---|---|---|---|
| Composition (part*): | 34 | 35 | 36 | 37 | 38 | 39 | 40 | 41 | 42 | 43 | 44 |
| Compound A (IV) | 0.1 | — | — | — | — | — | — | 0.01 | 0.01 | 0.01 | 0.01 |
| Compound A (V) | — | 0.1 | — | — | — | — | — | — | — | — | — |
| Compound A (VII) | — | — | 0.1 | 0.01 | 0.01 | 0.01 | 0.01 | — | — | — | — |
| Compound B (VIII) | — | — | — | 0.01 | — | — | — | — | — | — | — |
| Compound B (X) | 0.1 | 0.1 | 0.1 | — | 0.01 | — | — | — | — | — | — |
| Compound B (XI) | — | — | — | — | — | 0.01 | — | 0.02 | 0.02 | 0.02 | 0.02 |
| Compound B (XI) | — | — | — | — | — | — | 0.01 | — | — | — | — |
| Compound C (VII) | — | — | — | — | — | — | — | 0.5 | — | — | — |
| Compound C (VIII) | — | — | — | — | — | — | — | — | 0.5 | — | — |
| Compound C (XII) | — | — | — | — | — | — | — | — | — | 0.5 | — |
| Compound C (XIII) | — | — | — | — | — | — | — | — | — | — | 0.5 |

| | Comparative Example No. | | | | | | | | | | |
|---|---|---|---|---|---|---|---|---|---|---|---|
| Composition (part*): | 34 | 35 | 36 | 37 | 38 | 39 | 40 | 41 | 42 | 43 | 44 |
| Compound A (IV) | — | — | — | — | — | — | — | — | — | — | — |
| Compound A (V) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (VIII) | — | — | — | — | — | — | — | — | — | — | — |
| Compound B (X) | — | — | — | — | — | — | — | — | — | — | — |
| Compound B (XI) | — | — | — | — | — | — | — | — | — | — | — |
| Compound B (XI) | — | — | — | — | — | — | — | — | — | — | — |
| Compound C (VII) | — | — | — | — | — | — | — | — | — | — | — |
| Compound C (VIII) | — | — | — | — | — | — | — | — | — | — | — |
| Compound C (XII) | — | — | — | — | — | — | — | — | — | — | — |
| Compound C (XIII) | — | — | — | — | — | — | — | — | — | — | — |

| | Example No. | | | | | | | | | | |
|---|---|---|---|---|---|---|---|---|---|---|---|
| Composition (part*): | 34 | 35 | 36 | 37 | 38 | 39 | 40 | 41 | 42 | 43 | 44 |
| Phenol Antioxidant 4 | — | — | — | 0.1 | 0.1 | 0.1 | 0.1 | 0.1 | 0.1 | 0.1 | 0.1 |
| Thioether Anitoxidant 2 | — | — | — | 0.1 | 0.1 | 0.1 | 0.1 | 0.1 | 0.1 | 0.1 | 0.1 |
| Light stabilizer 1 | — | — | — | — | — | — | — | — | 0.1 | — | — |
| Light stabilizer 2 | — | — | — | — | — | — | — | — | — | 0.1 | — |
| Light stabilizer 3 | — | — | — | — | — | — | — | — | — | — | 0.1 |
| Light stabilizer 4 | — | — | — | 0.1 | — | — | — | — | 0.1 | — | — |
| Light stabilizer 5 | — | — | — | — | 0.1 | — | — | — | — | 0.1 | — |
| Light stabilizer 6 | — | — | — | — | — | 0.1 | — | — | — | — | 0.1 |
| Light stabilizer 7 | — | — | — | — | — | — | 0.1 | — | — | — | — |
| Light stabilizer 8 | — | — | — | — | — | — | — | 0.1 | — | — | — |

| | Comparative Example No. | | | | | | | | | | |
|---|---|---|---|---|---|---|---|---|---|---|---|
| Composition (part*): | 34 | 35 | 36 | 37 | 38 | 39 | 40 | 41 | 42 | 43 | 44 |

TABLE 6-continued

| | | | | | Example No. | | | | | | |
|---|---|---|---|---|---|---|---|---|---|---|---|
| Phenol Antioxidant 4 | — | 0.1 | 0.1 | 0.1 | 0.1 | 0.1 | 0.1 | 0.1 | 0.1 | 0.1 | 0.1 |
| Thioether Antioxidant 2 | — | 0.1 | 0.1 | 0.1 | 0.1 | 0.1 | 0.1 | 0.1 | 0.1 | 0.1 | 0.1 |
| Light stabilizer 1 | — | — | — | — | — | — | — | — | — | — | — |
| Light stabilizer 2 | — | — | — | — | — | — | — | — | — | — | — |
| Light stabilizer 3 | — | — | — | — | — | — | — | — | — | — | — |
| Light stabilizer 4 | — | — | — | — | — | — | — | — | — | — | — |
| Light stabilizer 5 | — | — | — | — | — | — | — | — | — | — | — |
| Light stabilizer 6 | — | — | — | — | — | — | — | — | — | — | — |
| Light stabilizer 7 | — | — | — | — | — | — | — | — | — | — | — |
| Light stabilizer 8 | — | — | — | — | — | — | — | — | — | — | — |

| | Example No. | | | | | | | | | | |
|---|---|---|---|---|---|---|---|---|---|---|---|
| Composition (part*): | 34 | 35 | 36 | 37 | 38 | 39 | 40 | 41 | 42 | 43 | 44 |
| Radical Generator 1 | 0.05 | 0.05 | 0.05 | 0.05 | 0.05 | 0.05 | 0.05 | 0.05 | 0.05 | 0.05 | 0.05 |
| EPR | 10 | 10 | 10 | 10 | 10 | 10 | 10 | 10 | 10 | 10 | 10 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |

| | Comparative Example No. | | | | | | | | | | |
|---|---|---|---|---|---|---|---|---|---|---|---|
| Composition (part*): | 34 | 35 | 36 | 37 | 38 | 39 | 40 | 41 | 42 | 43 | 44 |
| Radical Generator 1 | 0.05 | 0.05 | 0.05 | 0.05 | 0.05 | 0.05 | 0.05 | 0.05 | 0.05 | 0.05 | 0.05 |
| EPR | 10 | 10 | 10 | 10 | 10 | 10 | 10 | 10 | 10 | 10 | 10 |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |

| | Example No. | | | | | | | | | | |
|---|---|---|---|---|---|---|---|---|---|---|---|
| Composition (part*): | 34 | 35 | 36 | 37 | 38 | 39 | 40 | 41 | 42 | 43 | 44 |
| Metal Salt 6 | — | — | — | — | — | — | — | — | — | — | — |
| Metal Salt 7 | — | — | — | — | — | — | — | — | — | — | — |
| Flexural Modulus × $10^4$ (kgf/cm$^2$) | 1.30 | 1.31 | 1.32 | 1.31 | 1.32 | 1.33 | 1.35 | 1.42 | 1.41 | 1.43 | 1.42 |
| Heat Distortion Temperature (°C.) | 105 | 105 | 103 | 105 | 104 | 105 | 106 | 108 | 109 | 110 | 109 |
| Izod Impact Strength (kgf-cm/cm) | 7.7 | 7.5 | 7.7 | 7.6 | 7.8 | 7.9 | 7.6 | 7.9 | 8.0 | 8.1 | 8.0 |

| | Comparative Example No. | | | | | | | | | | |
|---|---|---|---|---|---|---|---|---|---|---|---|
| Composition (part*): | 34 | 35 | 36 | 37 | 38 | 39 | 40 | 41 | 42 | 43 | 44 |
| Metal Salt 6 | — | — | — | — | — | — | — | — | — | 0.1 | — |
| Metal Salt 7 | — | — | — | — | — | — | — | — | — | — | 0.1 |
| Flexural Modulus × $10^4$ (kgf/cm$^2$) | 0.82 | 1.13 | 1.09 | 1.18 | 0.80 | 0.75 | 0.98 | 0.82 | 0.80 | 0.83 | 0.84 |
| Heat Distortion Temperature (°C.) | 82 | 102 | 99 | 103 | 82 | 80 | 85 | 81 | 80 | 78 | 82 |
| Izod Impact Strength (kgf-cm/cm) | 6.8 | 6.9 | 7.1 | 6.9 | 6.5 | 6.6 | 6.8 | 6.8 | 7.1 | 7.0 | 6.8 |

Note: *Per 100 parts of crystalline polyolefin

TABLE 7

| | Example No. | | | | | | | | | | |
|---|---|---|---|---|---|---|---|---|---|---|---|
| Composition (part*): | 45 | 46 | 47 | 48 | 49 | 50 | 51 | 52 | 53 | 54 | 55 |
| Compound A (IV) | 0.1 | — | — | — | — | — | — | 0.03 | 0.03 | 0.03 | 0.03 |
| Compound A (VI) | — | 0.1 | — | — | — | — | — | — | — | — | — |
| Compound A (VII) | — | — | 0.1 | 0.03 | 0.03 | 0.03 | 0.03 | — | — | — | — |
| Compound B (III) | — | — | — | 0.03 | — | — | — | — | — | — | — |
| Compound B (XII) | 0.1 | 0.1 | 0.1 | — | 0.03 | — | — | — | — | — | — |
| Compound B (XIII) | — | — | — | — | — | 0.03 | — | 0.03 | 0.03 | 0.03 | 0.03 |
| Compound B (XIV) | — | — | — | — | — | — | 0.03 | — | — | — | — |
| Compound C (IX) | — | — | — | — | — | — | — | 0.05 | — | — | — |
| Compound C (X) | — | — | — | — | — | — | — | — | 0.05 | — | — |
| Compound C (XI) | — | — | — | — | — | — | — | — | — | 0.05 | — |
| Compound C (XII) | — | — | — | — | — | — | — | — | — | — | 0.05 |
| Phenol Antioxidant 5 | — | — | — | 0.1 | 0.1 | 0.1 | 0.1 | 0.1 | 0.1 | 0.1 | 0.1 |
| Thioether Antioxidant 1 | — | — | — | 0.2 | 0.2 | 0.2 | 0.2 | 0.2 | 0.2 | 0.2 | 0.2 |
| Radical Generator 2 | 0.05 | 0.05 | 0.05 | 0.05 | 0.05 | 0.05 | 0.05 | 0.05 | 0.05 | 0.05 | 0.05 |

TABLE 7-continued

| | | | | | | | | | | | |
|---|---|---|---|---|---|---|---|---|---|---|---|
| EPDM | 5 | 5 | 5 | 5 | 5 | 5 | 5 | 5 | 5 | 5 | 5 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus ×10⁴ (kgf/cm²) | 1.72 | 1.73 | 1.75 | 1.74 | 1.76 | 1.75 | 1.76 | 1.83 | 1.85 | 1.84 | 1.86 |
| Heat Distortion Temperature (°C.) | 135 | 136 | 134 | 135 | 136 | 134 | 133 | 136 | 137 | 137 | 138 |
| Izod Impact Strength (kgf-cm/cm) | 7.2 | 7.3 | 7.2 | 7.4 | 7.5 | 7.6 | 7.3 | 7.7 | 7.5 | 7.7 | 7.9 |

| | Comparative Example No. | | | | | | | | | | |
|---|---|---|---|---|---|---|---|---|---|---|---|
| Composition (part*): | 45 | 46 | 47 | 48 | 49 | 50 | 51 | 52 | 53 | 54 | 55 |
| Compound A (IV) | — | — | — | — | — | — | — | — | — | — | — |
| Compound A (VI) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (III) | — | — | — | — | — | — | — | — | — | — | — |
| Compound B (XII) | — | — | — | — | — | — | — | — | — | — | — |
| Compound B (XIII) | — | — | — | — | — | — | — | — | — | — | — |
| Compound B (XIV) | — | — | — | — | — | — | — | — | — | — | — |
| Compound C (IX) | — | — | — | — | — | — | — | — | — | — | — |
| Compound C (X) | — | — | — | — | — | — | — | — | — | — | — |
| Compound C (XI) | — | — | — | — | — | — | — | — | — | — | — |
| Compound C (XII) | — | — | — | — | — | — | — | — | — | — | — |
| Phenol Antioxidant 5 | — | 0.1 | 0.1 | 0.1 | 0.1 | 0.1 | 0.1 | 0.1 | 0.1 | 0.1 | 0.1 |
| Thioether Antioxidant 1 | — | 0.2 | 0.2 | 0.2 | 0.2 | 0.2 | 0.2 | 0.2 | 0.2 | 0.2 | 0.2 |
| Radical Generator 2 | 0.05 | 0.05 | 0.05 | 0.05 | 0.05 | 0.05 | 0.05 | 0.05 | 0.05 | 0.05 | 0.05 |
| EPDM | 5 | 5 | 5 | 5 | 5 | 5 | 5 | 5 | 5 | 5 | 5 |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus ×10⁴ (kgf/cm²) | 1.51 | 1.58 | 1.55 | 1.59 | 1.41 | 1.38 | 1.45 | 1.43 | 1.40 | 1.41 | 1.43 |
| Heat Distortion Temperature (°C.) | 120 | 130 | 126 | 131 | 116 | 110 | 122 | 113 | 110 | 106 | 114 |
| Izod Impact Strength (kgf-cm/cm) | 6.7 | 6.8 | 6.5 | 6.9 | 6.5 | 6.7 | 6.5 | 6.6 | 6.4 | 6.2 | 6.4 |

Note: *Per 100 parts of a crystalline polyolefin

TABLE 8

| | Example No. | | | | | | | | | | |
|---|---|---|---|---|---|---|---|---|---|---|---|
| Composition (part*): | 56 | 57 | 58 | 59 | 60 | 61 | 62 | 63 | 64 | 65 | 66 |
| Compound A (IV) | 0.1 | — | — | — | — | — | — | 0.05 | 0.05 | 0.05 | 0.05 |
| Compound A (VII) | — | 0.1 | — | 0.05 | 0.05 | 0.05 | 0.05 | — | — | — | — |
| Compound A (VIII) | — | — | 0.1 | — | — | — | — | — | — | — | — |
| Compound B (IV) | — | — | — | 0.05 | — | — | — | 0.02 | 0.02 | 0.02 | 0.02 |
| Compound B (XV) | 0.1 | 0.1 | 0.1 | — | 0.05 | — | — | — | — | — | — |
| Compound B (XVI) | — | — | — | — | — | 0.05 | — | 0.03 | 0.03 | 0.03 | 0.03 |
| Compound B (XVII) | — | — | — | — | — | — | 0.05 | — | — | — | — |
| Compound C (XI) | — | — | — | — | — | — | — | 1.0 | — | — | — |
| Compound C (XII) | — | — | — | — | — | — | — | — | 1.0 | — | — |
| Compound C (XIII) | — | — | — | — | — | — | — | — | — | 1.0 | — |
| Compound C (XIV) | — | — | — | — | — | — | — | — | — | — | 1.0 |
| Phenol Antioxidant 6 | — | — | — | 0.03 | 0.03 | 0.03 | 0.03 | 0.03 | 0.03 | 0.03 | 0.03 |
| Thioether Antioxidant 3 | — | — | — | 0.1 | 0.1 | 0.1 | 0.1 | 0.1 | 0.1 | 0.1 | 0.1 |
| Phosphorus Antioxidant 1 | — | — | — | 0.05 | — | — | — | — | — | 0.01 | — |
| Phosphorus Antioxidant 2 | — | — | — | — | 0.05 | — | — | — | — | 0.01 | — |
| Phosphorus Antioxidant 3 | — | — | — | — | — | 0.05 | — | — | — | 0.01 | — |
| Phosphorus Antioxidant 4 | — | — | — | — | — | — | 0.05 | — | — | — | 0.01 |

TABLE 8-continued

|  | | | | | | | | | | | |
|---|---|---|---|---|---|---|---|---|---|---|---|
| Phosphorus Antioxidant 5 | — | — | — | — | — | — | — | 0.05 | — | — | 0.01 |
| Phosphorus Antioxidant 6 | — | — | — | — | — | — | — | — | 0.05 | — | 0.01 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus $\times 10^4$ (kgf/cm$^2$) | 1.85 | 1.85 | 1.86 | 1.85 | 1.86 | 1.88 | 1.87 | 1.95 | 1.96 | 1.99 | 1.98 |
| Heat Distortion Temperature (°C.) | 123 | 122 | 123 | 122 | 123 | 123 | 122 | 123 | 124 | 123 | 124 |

|  | Comparative Example No. | | | | | | | | | | |
|---|---|---|---|---|---|---|---|---|---|---|---|
| Composition (part*): | 56 | 57 | 58 | 59 | 60 | 61 | 62 | 63 | 64 | 65 | 66 |
| Compound A (IV) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound A (VIII) | — | — | — | — | — | — | — | — | — | — | — |
| Compound B (IV) | — | — | — | — | — | — | — | — | — | — | — |
| Compound B (XV) | — | — | — | — | — | — | — | — | — | — | — |
| Compound B (XVI) | — | — | — | — | — | — | — | — | — | — | — |
| Compound B (XVII) | — | — | — | — | — | — | — | — | — | — | — |
| Compound C (XI) | — | — | — | — | — | — | — | — | — | — | — |
| Compound C (XII) | — | — | — | — | — | — | — | — | — | — | — |
| Compound C (XIII) | — | — | — | — | — | — | — | — | — | — | — |
| Compound C (XIV) | — | — | — | — | — | — | — | — | — | — | — |
| Phenol Antioxidant 6 | — | 0.03 | 0.03 | 0.03 | 0.03 | 0.03 | 0.03 | 0.03 | 0.03 | 0.03 | 0.03 |
| Thioether Antioxidant 3 | — | 0.1 | 0.1 | 0.1 | 0.1 | 0.1 | 0.1 | 0.1 | 0.1 | 0.1 | 0.1 |
| Phosphorus Antioxidant 1 | — | — | — | — | — | — | — | — | — | — | — |
| Phosphorus Antioxidant 2 | — | — | — | — | — | — | — | — | — | — | — |
| Phosphorus Antioxidant 3 | — | — | — | — | — | — | — | — | — | — | — |
| Phosphorus Antioxidant 4 | — | — | — | — | — | — | — | — | — | — | — |
| Phosphorus Antioxidant 5 | — | — | — | — | — | — | — | — | — | — | — |
| Phosphorus Antioxidant 6 | — | — | — | — | — | — | — | — | — | — | — |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus $\times 10^4$ (kgf/cm$^2$) | 1.38 | 1.69 | 1.64 | 1.73 | 1.11 | 1.10 | 1.32 | 1.18 | 1.10 | 1.13 | 1.12 |
| Heat Distortion Temperature (°C.) | 105 | 118 | 115 | 119 | 106 | 100 | 112 | 105 | 100 | 101 | 105 |

Note: *Per 100 parts of a crystalline polyolefin

TABLE 9

|  | Example No. | | | | | | | | | | |
|---|---|---|---|---|---|---|---|---|---|---|---|
|  | 67 | 68 | 69 | 70 | 71 | 72 | 73 | 74 | 75 | 76 | 77 |
| Composition (part*): | | | | | | | | | | | |
| Compound A (IV) | 0.1 | — | — | — | — | — | — | 0.07 | 0.07 | 0.07 | 0.07 |
| Compound A (VII) | — | 0.1 | — | 0.07 | 0.07 | 0.07 | 0.07 | — | — | — | — |
| Compound A (IX) | — | — | 0.1 | — | — | — | — | — | — | — | — |
| Compound B (VI) | — | — | — | 0.07 | — | — | — | — | — | — | — |
| Compound B (XVIII) | 0.1 | 0.1 | 0.1 | — | 0.07 | — | — | — | — | — | — |
| Compound B (XIX) | — | — | — | — | — | 0.07 | — | 0.07 | 0.07 | 0.07 | 0.07 |
| Compound B (XX) | — | — | — | — | — | — | 0.07 | — | — | — | — |
| Compound C (XIV) | — | — | — | — | — | — | — | 0.03 | — | — | — |
| Compound C (XV) | — | — | — | — | — | — | — | — | 0.03 | — | — |
| Compound C (XVI) | — | — | — | — | — | — | — | — | — | 0.03 | — |
| Compound C (XVII) | — | — | — | — | — | — | — | — | — | — | 0.03 |
| Phenol Antioxidant 7 | — | — | — | 0.1 | 0.1 | 0.1 | 0.1 | 0.1 | 0.1 | 0.1 | 0.1 |

TABLE 9-continued

|  |  |  |  |  |  |  |  |  |  |  |  |
|---|---|---|---|---|---|---|---|---|---|---|---|
| Thioether Antioxidant 3 | — | — | — | 0.2 | 0.2 | 0.2 | 0.2 | 0.2 | 0.2 | 0.2 | 0.2 |
| Inorganic Filler 2 | 10 | 10 | 10 | 10 | 10 | 10 | 10 | 10 | 10 | 10 | 10 |
| Inorganic Filler 3 | 10 | 10 | 10 | 10 | 10 | 10 | 10 | 10 | 10 | 10 | 10 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × $10^4$ (kgf/cm$^2$) | 2.28 | 2.29 | 2.30 | 2.31 | 2.30 | 2.28 | 2.29 | 2.31 | 2.33 | 2.32 | 2.34 |
| Heat Distortion Temperature (°C.) | 140 | 140 | 141 | 140 | 141 | 140 | 141 | 141 | 142 | 142 | 141 |

|  | Comparative Example No. | | | | | | | | | | |
|---|---|---|---|---|---|---|---|---|---|---|---|
|  | 67 | 68 | 69 | 70 | 71 | 72 | 73 | 74 | 75 | 76 | 77 |
| Composition (part *): | | | | | | | | | | | |
| Compound A (IV) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound A (IX) | — | — | — | — | — | — | — | — | — | — | — |
| Compound B (VI) | — | — | — | — | — | — | — | — | — | — | — |
| Compound B (XVIII) | — | — | — | — | — | — | — | — | — | — | — |
| Compound B (XIX) | — | — | — | — | — | — | — | — | — | — | — |
| Compound B (XX) | — | — | — | — | — | — | — | — | — | — | — |
| Compound C (XIV) | — | — | — | — | — | — | — | — | — | — | — |
| Compound C (XV) | — | — | — | — | — | — | — | — | — | — | — |
| Compound C (XVI) | — | — | — | — | — | — | — | — | — | — | — |
| Compound C (XVII) | — | — | — | — | — | — | — | — | — | — | — |
| Phenol Antioxidant 7 | — | 0.1 | 0.1 | 0.1 | 0.1 | 0.1 | 0.1 | 0.1 | 0.1 | 0.1 | 0.1 |
| Thioether Antioxidant 3 | — | 0.2 | 0.2 | 0.2 | 0.2 | 0.2 | 0.2 | 0.2 | 0.2 | 0.2 | 0.2 |
| Inorganic Filler 2 | 10 | 10 | 10 | 10 | 10 | 10 | 10 | 10 | 10 | 10 | 10 |
| Inorganic Filler 3 | 10 | 10 | 10 | 10 | 10 | 10 | 10 | 10 | 10 | 10 | 10 |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus × $10^4$ (kgf/cm$^2$) | 1.65 | 2.10 | 1.90 | 2.12 | 1.51 | 1.50 | 1.70 | 1.60 | 1.50 | 1.55 | 1.56 |
| Heat Distortion Temperature (°C.) | 120 | 135 | 131 | 136 | 121 | 111 | 130 | 118 | 117 | 111 | 120 |

Note:
*: Per 100 parts of a crystalline polyolefin

TABLE 10

|  | Example No. | | | | | | | | | | |
|---|---|---|---|---|---|---|---|---|---|---|---|
|  | 78 | 79 | 80 | 81 | 82 | 83 | 84 | 85 | 86 | 87 | 88 |
| Composition (part*): | | | | | | | | | | | |
| Compound A (IV) | 0.1 | — | — | — | — | — | — | 0.15 | 0.15 | 0.15 | 0.15 |
| Compound A (VII) | — | 0.1 | — | 0.15 | 0.15 | 0.15 | 0.15 | — | — | — | — |
| Compound A (X) | — | — | 0.1 | — | — | — | — | — | — | — | — |
| Compound B (III) | 0.1 | 0.1 | 0.1 | 0.15 | — | — | — | — | — | — | — |
| Compound B (IV) | — | — | — | — | 0.15 | — | — | — | — | — | — |
| Compound B (V) | — | — | — | — | — | 0.15 | — | 0.15 | 0.15 | 0.15 | 0.15 |
| Compound B (VI) | — | — | — | — | — | — | 0.15 | — | — | — | — |
| Compound C (XVI) | — | — | — | — | — | — | — | 0.15 | — | — | — |
| Compound C (XVII) | — | — | — | — | — | — | — | — | 0.15 | — | — |
| Compound C (XVIII) | — | — | — | — | — | — | — | — | — | 0.15 | — |
| Compound C (XIX) | — | — | — | — | — | — | — | — | — | — | 0.15 |
| Phenol Antioxidant 8 | — | — | — | 0.1 | 0.1 | 0.1 | 0.1 | 0.1 | 0.1 | 0.1 | 0.1 |
| Thioether Antioxidant 2 | — | — | — | 0.1 | 0.1 | 0.1 | 0.1 | 0.1 | 0.1 | 0.1 | 0.1 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |

TABLE 10-continued

|  | | | | | | | | | | | |
|---|---|---|---|---|---|---|---|---|---|---|---|
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × $10^4$ (kgf/cm$^2$) | 1.93 | 1.92 | 1.93 | 1.95 | 1.94 | 1.94 | 1.95 | 1.99 | 2.01 | 2.03 | 2.05 |
| Heat Distortion Temperature (°C.) | 141 | 141 | 140 | 141 | 141 | 140 | 141 | 142 | 142 | 143 | 142 |
| Izod Impact Strength (kgf–cm/cm) | 7.5 | 7.4 | 7.3 | 7.5 | 7.6 | 7.5 | 7.4 | 7.5 | 7.4 | 7.4 | 7.5 |

|  | Comparative Example No. | | | | | | | | | | |
|---|---|---|---|---|---|---|---|---|---|---|---|
|  | 78 | 79 | 80 | 81 | 82 | 83 | 84 | 85 | 86 | 87 | 88 |
| Composition (part*): | | | | | | | | | | | |
| Compound A (IV) | — | — | — | — | — | — | — | — | — | — | — |
| Compound A (VII) | 0.1 | — | — | — | 0.1 | 0.1 | 0.1 | 0.1 | 0.10 | 0.1 | 0.1 |
| Compound A (X) | — | — | — | — | — | — | — | — | — | — | — |
| Compound B (III) | — | — | — | — | — | — | — | — | — | — | — |
| Compound B (IV) | — | — | — | — | — | — | — | — | — | — | — |
| Compound B (V) | — | — | — | — | — | — | — | — | — | — | — |
| Compound B (VI) | — | — | — | — | — | — | — | — | — | — | — |
| Compound C (XVI) | — | — | — | — | — | — | — | — | — | — | — |
| Compound C (XVII) | — | — | — | — | — | — | — | — | — | — | — |
| Compound C (XVIII) | — | — | — | — | — | — | — | — | — | — | — |
| Compound C (XIX) | — | — | — | — | — | — | — | — | — | — | — |
| Phenol Antioxidant 8 | — | 0.1 | 0.1 | 0.1 | 0.1 | 0.1 | 0.1 | 0.1 | 0.1 | 0.1 | 0.1 |
| Thioether Antioxidant 2 | — | 0.1 | 0.1 | 0.1 | 0.1 | 0.1 | 0.1 | 0.1 | 0.1 | 0.1 | 0.1 |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus × $10^4$ (kgf/cm$^2$) | 1.60 | 1.73 | 1.70 | 1.77 | 1.55 | 1.51 | 1.62 | 1.56 | 1.51 | 1.58 | 1.56 |
| Heat Distortion Temperature (°C.) | 121 | 135 | 133 | 135 | 120 | 111 | 129 | 120 | 115 | 112 | 120 |
| Izod Impact Strength (kgf–cm/cm) | 7.0 | 7.1 | 7.2 | 7.1 | 7.0 | 7.3 | 7.2 | 7.3 | 7.5 | 7.3 | 7.1 |

Note:
*: Per 100 parts of a crystalline polyolefin

TABLE 11

|  | Example No. | | | | | | | | | | |
|---|---|---|---|---|---|---|---|---|---|---|---|
|  | 89 | 90 | 91 | 92 | 93 | 94 | 95 | 96 | 97 | 98 | 99 |
| Composition (part*): | | | | | | | | | | | |
| Compound A (I) | 0.1 | — | — | — | — | — | — | — | — | — | — |
| Compound A (IV) | — | 0.1 | — | — | — | — | — | 0.2 | 0.2 | 0.2 | 0.2 |
| Compound A (VII) | — | — | 0.1 | 0.2 | 0.2 | 0.2 | 0.2 | — | — | — | — |
| Compound B (III) | — | — | — | 0.2 | — | — | — | — | — | — | — |
| Compound B (IV) | 0.1 | 0.1 | 0.1 | — | 0.2 | — | — | — | — | — | — |
| Compound B (VII) | — | — | — | — | — | 0.2 | — | — | — | — | — |
| Compound B (VIII) | — | — | — | — | — | — | 0.2 | 0.2 | 0.2 | 0.2 | 0.2 |
| Compound C (XVII) | — | — | — | — | — | — | — | 0.2 | — | — | — |
| Compound C (XVIII) | — | — | — | — | — | — | — | — | 0.2 | — | — |
| Compound C (XIX) | — | — | — | — | — | — | — | — | — | 0.2 | — |
| Compound C (XX) | — | — | — | — | — | — | — | — | — | — | 0.2 |
| Phenol Antioxidant 9 | — | — | — | 0.05 | 0.05 | 0.05 | 0.05 | 0.05 | 0.05 | 0.05 | 0.05 |
| Light stabilizer 1 | — | — | — | — | — | — | — | 0.1 | — | 0.05 | — |
| Light stabilizer 2 | — | — | — | — | — | — | — | — | 0.1 | 0.05 | — |
| Light stabilizer 3 | — | — | — | — | — | — | — | 0.1 | 0.1 | 0.1 | — |
| Light stabilizer 4 | — | — | — | 0.1 | — | — | — | 0.1 | — | 0.1 | — |
| Light stabilizer 5 | — | — | — | — | 0.1 | — | — | — | 0.1 | 0.1 | — |
| Light stabilizer 6 | — | — | — | — | — | 0.1 | — | — | — | 0.1 | — |
| Light stabilizer 7 | — | — | — | — | — | — | 0.1 | — | — | — | — |
| Light stabilizer 8 | — | — | — | — | — | — | — | 0.1 | — | — | — |
| Antistatic Agent | — | — | — | 0.5 | 0.5 | 0.5 | 0.5 | 0.5 | 0.5 | 0.5 | 0.5 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |

TABLE 11-continued

|  | | | | | | | | | | | |
|---|---|---|---|---|---|---|---|---|---|---|---|
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × $10^4$ (kgf/cm$^2$) | 1.85 | 1.86 | 1.87 | 1.86 | 1.85 | 1.86 | 1.87 | 1.98 | 1.90 | 1.91 | 1.92 |
| Heat Distortion Temperature (°C.) | 139 | 140 | 140 | 140 | 140 | 140 | 141 | 140 | 141 | 141 | 140 |
| Izod Impact Strength (kgf-cm/cm) | 7.2 | 7.3 | 7.1 | 7.3 | 7.2 | 7.5 | 7.4 | 7.3 | 7.5 | 7.3 | 7.4 |

| | Comparative Example No. | | | | | | | | | | |
|---|---|---|---|---|---|---|---|---|---|---|---|
| | 89 | 90 | 91 | 92 | 93 | 94 | 95 | 96 | 97 | 98 | 99 |
| Composition (part*): | | | | | | | | | | | |
| Compound A (I) | — | — | — | — | — | — | — | — | — | — | — |
| Compound A (IV) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (III) | — | — | — | — | — | — | — | — | — | — | — |
| Compound B (IV) | — | — | — | — | — | — | — | — | — | — | — |
| Compound B (VII) | — | — | — | — | — | — | — | — | — | — | — |
| Compound B (VIII) | — | — | — | — | — | — | — | — | — | — | — |
| Compound C (XVII) | — | — | — | — | — | — | — | — | — | — | — |
| Compound C (XVIII) | — | — | — | — | — | — | — | — | — | — | — |
| Compound C (XIX) | — | — | — | — | — | — | — | — | — | — | — |
| Compound C (XX) | — | — | — | — | — | — | — | — | — | — | — |
| Phenol Antioxidant 9 | — | 0.05 | 0.05 | 0.05 | 0.05 | 0.05 | 0.05 | 0.05 | 0.05 | 0.05 | 0.05 |
| Light stabilizer 1 | — | — | — | — | — | — | — | — | — | — | — |
| Light stabilizer 2 | — | — | — | — | — | — | — | — | — | — | — |
| Light stabilizer 3 | — | — | — | — | — | — | — | — | — | — | — |
| Light stabilizer 4 | — | — | — | — | — | — | — | — | — | — | — |
| Light stabilizer 5 | — | — | — | — | — | — | — | — | — | — | — |
| Light stabilizer 6 | — | — | — | — | — | — | — | — | — | — | — |
| Light stabilizer 7 | — | — | — | — | — | — | — | — | — | — | — |
| Light stabilizer 8 | — | — | — | — | — | — | — | — | — | — | — |
| Antistatic Agent | 0.5 | 0.5 | 0.5 | 0.5 | 0.5 | 0.5 | 0.5 | 0.5 | 0.5 | 0.5 | 0.5 |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus × $10^4$ (kgf/cm$^2$) | 1.55 | 1.70 | 1.68 | 1.75 | 1.54 | 1.50 | 1.58 | 1.54 | 1.48 | 1.55 | 1.54 |
| Heat Distortion Temperature (°C.) | 121 | 133 | 131 | 133 | 120 | 110 | 128 | 118 | 113 | 110 | 119 |
| Izod Impact Strength (kgf-cm/cm) | 6.8 | 7.0 | 7.0 | 6.8 | 6.6 | 7.0 | 7.1 | 7.1 | 7.2 | 7.3 | 6.9 |

Note:
*Per 100 parts of a crystalline polyolefin

TABLE 12

| | Example No. | | | | | | | | | | |
|---|---|---|---|---|---|---|---|---|---|---|---|
| | 100 | 101 | 102 | 103 | 104 | 105 | 106 | 107 | 108 | 109 | 110 |
| Composition (part*): | | | | | | | | | | | |
| Compound A (III) | 0.1 | — | — | — | — | — | — | — | — | — | — |
| Compound A (IV) | — | 0.1 | — | — | — | — | — | 0.5 | 0.5 | 0.5 | 0.5 |
| Compound A (VII) | — | — | 0.1 | 0.5 | 0.5 | 0.5 | 0.5 | — | — | — | — |
| Compound B (V) | — | — | — | 0.5 | — | — | — | — | — | — | — |
| Compound B (IX) | — | — | — | — | 0.5 | — | — | — | — | — | — |
| Compound B (X) | 0.1 | 0.1 | 0.1 | — | — | 0.5 | — | — | — | — | — |
| Compound B (XI) | — | — | — | — | — | — | 0.5 | 0.5 | 0.5 | 0.5 | 0.5 |
| Compound C (XII) | — | — | — | — | — | — | — | 0.06 | — | — | — |
| Compound C (XIII) | — | — | — | — | — | — | — | — | 0.06 | — | 0.2 |
| Compound C (XIV) | — | — | — | — | — | — | — | — | — | 0.06 | 0.3 |
| Compound C (XV) | — | — | — | — | — | — | — | — | — | — | 0.1 |
| Phenol Antioxidant 10 | — | — | — | 0.2 | 0.2 | 0.2 | 0.2 | 0.2 | 0.2 | 0.2 | 0.2 |
| Thioether Antioxidant 3 | — | — | — | 0.5 | 0.5 | 0.5 | 0.5 | 0.5 | 0.5 | 0.5 | 0.5 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |

TABLE 12-continued

| | | | | | | | | | | | |
|---|---|---|---|---|---|---|---|---|---|---|---|
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × $10^4$ (kgf/cm$^2$) | 1.73 | 1.71 | 1.73 | 1.72 | 1.74 | 1.75 | 1.77 | 1.77 | 1.76 | 1.78 | 1.79 |
| Heat Distortion Temperature (°C.) | 138 | 140 | 139 | 139 | 138 | 140 | 139 | 140 | 141 | 141 | 140 |
| Izod Impact Strength (kgf-cm/cm) | 7.0 | 7.0 | 6.9 | 6.8 | 7.0 | 6.9 | 7.0 | 7.1 | 7.1 | 7.0 | 7.1 |

| | Comparative Example No. | | | | | | | | | | |
|---|---|---|---|---|---|---|---|---|---|---|---|
| | 100 | 101 | 102 | 103 | 104 | 105 | 106 | 107 | 108 | 109 | 110 |
| Composition (part*): | | | | | | | | | | | |
| Compound A (III) | — | — | — | — | — | — | — | — | — | — | — |
| Compound A (IV) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (V) | — | — | — | — | — | — | — | — | — | — | — |
| Compound B (IX) | — | — | — | — | — | — | — | — | — | — | — |
| Compound B (X) | — | — | — | — | — | — | — | — | — | — | — |
| Compound B (XI) | — | — | — | — | — | — | — | — | — | — | — |
| Compound C (XII) | — | — | — | — | — | — | — | — | — | — | — |
| Compound C (XIII) | — | — | — | — | — | — | — | — | — | — | — |
| Compound C (XIV) | — | — | — | — | — | — | — | — | — | — | — |
| Compound C (XV) | — | — | — | — | — | — | — | — | — | — | — |
| Phenol Antioxidant 10 | — | 0.2 | 0.2 | 0.2 | 0.2 | 0.2 | 0.2 | 0.2 | 0.2 | 0.2 | 0.2 |
| Thioether Antioxidant 3 | — | 0.5 | 0.5 | 0.5 | 0.5 | 0.5 | 0.5 | 0.5 | 0.5 | 0.5 | 0.5 |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus × $10^4$ (kgf/cm$^2$) | 1.50 | 1.62 | 1.60 | 1.68 | 1.50 | 1.46 | 1.54 | 1.50 | 1.44 | 1.50 | 1.51 |
| Heat Distortion Temperature (°C.) | 120 | 131 | 130 | 132 | 118 | 110 | 126 | 118 | 112 | 110 | 115 |
| Izod Impact Strength (kgf-cm/cm) | 6.7 | 6.8 | 6.6 | 6.5 | 6.4 | 6.9 | 7.0 | 7.0 | 7.1 | 7.0 | 6.8 |

Note:
*Per 100 parts of a crystalline polyolefin

TABLE 13

| | Example No. | | | | | | | | | | |
|---|---|---|---|---|---|---|---|---|---|---|---|
| Composition (part*): | 111 | 112 | 113 | 114 | 115 | 116 | 117 | 118 | 119 | 120 | 121 |
| Compound A (IV) | 0.1 | — | — | — | — | — | — | 0.5 | 0.5 | 0.5 | 0.5 |
| Compound A (V) | — | 0.1 | — | — | — | — | — | 0.1 | 0.1 | 0.1 | 0.1 |
| Compound A (VII) | — | — | 0.1 | 0.7 | 0.7 | 0.7 | 0.7 | 0.1 | 0.1 | 0.1 | 0.1 |
| Compound B (VI) | — | — | — | 0.7 | — | — | — | 0.1 | 0.1 | 0.1 | 0.1 |
| Compound B (XII) | — | — | — | — | 0.7 | — | — | 0.1 | 0.1 | 0.1 | 0.1 |
| Compound B (XIII) | 0.1 | 0.1 | 0.1 | — | — | 0.7 | — | 0.1 | 0.1 | 0.1 | 0.1 |
| Compound B (XIV) | — | — | — | — | — | — | 0.7 | 0.4 | 0.4 | 0.4 | 0.4 |
| Compound C (XII) | — | — | — | — | — | — | — | 1.0 | — | — | — |
| Compound C (XVIII) | — | — | — | — | — | — | — | — | 1.0 | — | — |
| Compound C (XIX) | — | — | — | — | — | — | — | — | — | 1.0 | — |
| Compound C (XX) | — | — | — | — | — | — | — | — | — | — | 1.0 |

| | Comparative Example No. | | | | | | | | | | |
|---|---|---|---|---|---|---|---|---|---|---|---|
| Composition (part*): | 111 | 112 | 113 | 114 | 115 | 116 | 117 | 118 | 119 | 120 | 121 |
| Compound A (IV) | — | — | — | — | — | — | — | — | — | — | — |
| Compound A (V) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (VI) | — | — | — | — | — | — | — | — | — | — | — |
| Compound B (XII) | — | — | — | — | — | — | — | — | — | — | — |
| Compound B (XIII) | — | — | — | — | — | — | — | — | — | — | — |
| Compound B (XIV) | — | — | — | — | — | — | — | — | — | — | — |
| Compound C (XII) | — | — | — | — | — | — | — | — | — | — | — |
| Compound C (XVIII) | — | — | — | — | — | — | — | — | — | — | — |
| Compound C (XIX) | — | — | — | — | — | — | — | — | — | — | — |
| Compound C (XX) | — | — | — | — | — | — | — | — | — | — | — |

| | Example No. | | | | | | | | | | |
|---|---|---|---|---|---|---|---|---|---|---|---|
| Composition (part*): | 111 | 112 | 113 | 114 | 115 | 116 | 117 | 118 | 119 | 120 | 121 |
| Phenol Antioxidant 11 | — | — | — | 0.1 | 0.1 | 0.1 | 0.1 | 0.1 | 0.1 | 0.1 | 0.1 |

TABLE 13-continued

| | | | | | | | | | | | |
|---|---|---|---|---|---|---|---|---|---|---|---|
| Thioether Antioxidant 2 | — | — | — | 0.3 | 0.3 | 0.3 | 0.3 | 0.3 | 0.3 | 0.3 | 0.3 |
| Inorganic Filler 1 | 10 | 10 | 10 | 10 | 10 | 10 | 10 | 10 | 10 | 10 | 10 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |

| | Comparative Example No. | | | | | | | | | | |
|---|---|---|---|---|---|---|---|---|---|---|---|
| Composition (part*): | 111 | 112 | 113 | 114 | 115 | 116 | 117 | 118 | 119 | 120 | 121 |
| Phenol Antioxidant 11 | — | 0.1 | 0.1 | 0.1 | 0.1 | 0.1 | 0.1 | 0.1 | 0.1 | 0.1 | 0.1 |
| Thioether Antioxidant 2 | — | 0.3 | 0.3 | 0.3 | 0.3 | 0.3 | 0.3 | 0.3 | 0.3 | 0.3 | 0.3 |
| Inorganic Filler 1 | 10 | 10 | 10 | 10 | 10 | 10 | 10 | 10 | 10 | 10 | 10 |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |

| | Example No. | | | | | | | | | | |
|---|---|---|---|---|---|---|---|---|---|---|---|
| Composition (part*): | 111 | 112 | 113 | 114 | 115 | 116 | 117 | 118 | 119 | 120 | 121 |
| Metal Salt 6 | — | — | — | — | — | — | — | — | — | — | — |
| Metal Salt 7 | — | — | — | — | — | — | — | — | — | — | — |
| Flexural Modulus × 10⁴ (kgf/cm²) | 2.55 | 2.56 | 2.58 | 2.57 | 2.58 | 2.59 | 2.57 | 2.64 | 2.63 | 2.62 | 2.64 |
| Heat Distortion Temperature (°C.) | 142 | 143 | 142 | 143 | 143 | 144 | 142 | 144 | 145 | 145 | 146 |
| Izod Impact Strength (kgf-cm/cm) | 8.3 | 8.3 | 8.2 | 8.2 | 8.3 | 8.4 | 8.5 | 8.6 | 8.8 | 8.7 | 8.6 |

| | Comparative Example No. | | | | | | | | | | |
|---|---|---|---|---|---|---|---|---|---|---|---|
| Composition (part*): | 111 | 112 | 113 | 114 | 115 | 116 | 117 | 118 | 119 | 120 | 121 |
| Metal Salt 6 | — | — | — | — | — | — | — | — | — | 0.1 | — |
| Metal Salt 7 | — | — | — | — | — | — | — | — | — | — | 0.1 |
| Flexural Modulus × 10⁴ (kgf/cm²) | 2.40 | 2.41 | 2.38 | 2.42 | 2.30 | 2.31 | 2.42 | 2.30 | 2.31 | 2.33 | 2.31 |
| Heat Distortion Temperature (°C.) | 137 | 138 | 137 | 138 | 135 | 132 | 136 | 132 | 132 | 133 | 134 |
| Izod Impact Strength (kgf-cm/cm) | 6.8 | 6.9 | 6.5 | 6.9 | 6.6 | 6.7 | 6.8 | 6.5 | 6.4 | 6.5 | 6.7 |

Note:
*Per 100 parts of a crystalline polyolefin

TABLE 14

| | Example No. | | | | | | | | | | |
|---|---|---|---|---|---|---|---|---|---|---|---|
| Composition (part*): | 122 | 123 | 124 | 125 | 126 | 127 | 128 | 129 | 130 | 131 | 132 |
| Compound A (IV) | 0.1 | — | — | — | — | — | — | 1.0 | 1.0 | 1.0 | 1.0 |
| Compound A (VI) | — | 0.1 | — | — | — | — | — | — | — | — | — |
| Compound A (VII) | — | — | 0.1 | 1.0 | 1.0 | 1.0 | 1.0 | — | — | — | — |
| Compound B (VII) | — | — | — | 1.0 | — | — | — | — | — | — | — |
| Compound B (XV) | — | — | — | — | 1.0 | — | — | — | — | — | — |
| Compound B (XVI) | 0.1 | 0.1 | 0.1 | — | — | 1.0 | — | — | — | — | — |
| Compound B (XVII) | — | — | — | — | — | — | 1.0 | 1.0 | 1.0 | 1.0 | 1.0 |
| Compound C (XIII) | — | — | — | — | — | — | — | 0.07 | — | — | — |
| Compound C (XVIII) | — | — | — | — | — | — | — | — | 0.07 | — | — |
| Compound C (XIX) | — | — | — | — | — | — | — | — | — | 0.07 | — |
| Compound C (XX) | — | — | — | — | — | — | — | — | — | — | 0.07 |

| | Comparative Example No. | | | | | | | | | | |
|---|---|---|---|---|---|---|---|---|---|---|---|
| Composition (part*): | 122 | 123 | 124 | 125 | 126 | 127 | 128 | 129 | 130 | 131 | 132 |
| Compound A (IV) | — | — | — | — | — | — | — | — | — | — | — |
| Compound A (VI) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound B (VII) | — | — | — | — | — | — | — | — | — | — | — |
| Compound B (XV) | — | — | — | — | — | — | — | — | — | — | — |
| Compound B (XVI) | — | — | — | — | — | — | — | — | — | — | — |
| Compound B (XVII) | — | — | — | — | — | — | — | — | — | — | — |
| Compound C (XIII) | — | — | — | — | — | — | — | — | — | — | — |
| Compound C (XVIII) | — | — | — | — | — | — | — | — | — | — | — |
| Compound C (XIX) | — | — | — | — | — | — | — | — | — | — | — |

TABLE 14-continued

| Compound C (XX) | — | — | — | — | — | — | — | — | — | — |

Example No.

| Composition (part*): | 122 | 123 | 124 | 125 | 126 | 127 | 128 | 129 | 130 | 131 | 132 |
|---|---|---|---|---|---|---|---|---|---|---|---|
| Phenol Antioxidant 12 | — | — | — | 0.1 | 0.1 | 0.1 | 0.1 | 0.1 | 0.1 | 0.1 | 0.1 |
| Phosphorus Antioxidant 1 | — | — | — | 0.03 | — | — | — | — | — | 0.01 | — |
| Phosphorus Antioxidant 2 | — | — | — | — | 0.03 | — | — | — | — | 0.01 | — |
| Phosphorus Antioxidant 3 | — | — | — | — | — | 0.03 | — | — | — | 0.01 | — |
| Phosphorus Antioxidant 4 | — | — | — | — | — | — | 0.03 | — | — | — | 0.01 |
| Phosphorus Antioxidant 5 | — | — | — | — | — | — | — | 0.03 | — | — | 0.01 |
| Phosphorus Antioxidant 6 | — | — | — | — | — | — | — | — | 0.03 | — | 0.01 |
| Nucleating Agent 1 | — | — | — | — | — | — | — | — | — | — | — |
| Nucleating Agent 2 | — | — | — | — | — | — | — | — | — | — | — |

Comparative Example No.

| Composition (part*): | 122 | 123 | 124 | 125 | 126 | 127 | 128 | 129 | 130 | 131 | 132 |
|---|---|---|---|---|---|---|---|---|---|---|---|
| Phenol Antioxidant 12 | — | 0.1 | 0.1 | 0.1 | 0.1 | 0.1 | 0.1 | 0.1 | 0.1 | 0.1 | 0.1 |
| Phosphorus Antioxidant 1 | — | — | — | — | — | — | — | — | — | — | — |
| Phosphorus Antioxidant 2 | — | — | — | — | — | — | — | — | — | — | — |
| Phosphorus Antioxidant 3 | — | — | — | — | — | — | — | — | — | — | — |
| Phosphorus Antioxidant 4 | — | — | — | — | — | — | — | — | — | — | — |
| Phosphorus Antioxidant 5 | — | — | — | — | — | — | — | — | — | — | — |
| Phosphorus Antioxidant 6 | — | — | — | — | — | — | — | — | — | — | — |
| Nucleating Agent 1 | — | 0.1 | — | — | — | — | — | — | — | — | — |
| Nucleating Agent 2 | — | — | 0.1 | — | — | — | — | — | — | — | — |

Example No.

| Composition (part*): | 122 | 123 | 124 | 125 | 126 | 127 | 128 | 129 | 130 | 131 | 132 |
|---|---|---|---|---|---|---|---|---|---|---|---|
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × $10^4$ (kgf/cm$^2$) | 1.41 | 1.41 | 1.40 | 1.41 | 1.43 | 1.42 | 1.41 | 1.46 | 1.48 | 1.47 | 1.49 |
| Heat Distortion Temperature (°C.) | 119 | 120 | 120 | 121 | 120 | 120 | 120 | 122 | 121 | 122 | 123 |
| Izod Impact Strength (kgf-cm/cm) | 8.2 | 8.3 | 8.1 | 8.2 | 8.1 | 8.3 | 8.4 | 8.5 | 8.5 | 8.6 | 8.5 |

Comparative Example No.

| Composition (part*): | 122 | 123 | 124 | 125 | 126 | 127 | 128 | 129 | 130 | 131 | 132 |
|---|---|---|---|---|---|---|---|---|---|---|---|
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |
| Flexural Modulus × $10^4$ (kgf/cm$^2$) | 1.18 | 1.31 | 1.30 | 1.35 | 1.21 | 1.18 | 1.24 | 1.21 | 1.15 | 1.21 | 1.23 |
| Heat Distortion Temperature (°C.) | 101 | 110 | 110 | 113 | 100 | 91 | 105 | 100 | 94 | 95 | 98 |
| Izod Impact Strength (kgf-cm/cm) | 8.1 | 8.0 | 8.1 | 7.9 | 8.1 | 8.2 | 8.1 | 8.3 | 8.5 | 8.5 | 8.3 |

Note:
*Per 100 parts of a crystalline polyolefin

TABLE 15

Example No.

| | 133 | 134 | 135 | 136 | 137 | 138 | 139 | 140 | 141 | 142 | 143 |
|---|---|---|---|---|---|---|---|---|---|---|---|
| Composition (part*): | | | | | | | | | | | |

TABLE 15-continued

| | | | | | | | | | | | |
|---|---|---|---|---|---|---|---|---|---|---|---|
| Compound A (IV) | 0.1 | — | — | — | — | — | — | 0.3 | 0.3 | 0.3 | 0.3 |
| Compound A (VII) | — | 0.1 | — | 0.3 | 0.3 | 0.3 | 0.3 | — | — | — | — |
| Compound A (IX) | — | — | 0.1 | — | — | — | — | — | — | — | — |
| Compound B (VIII) | — | — | — | 0.3 | — | — | — | — | — | — | — |
| Compound B (XVIII) | — | — | — | — | 0.3 | — | — | — | — | — | — |
| Compound B (XIX) | 0.1 | 0.1 | 0.1 | — | — | 0.3 | — | — | — | — | — |
| Compound B (XX) | — | — | — | — | — | — | 0.3 | 0.3 | 0.3 | 0.3 | 0.3 |
| Compound C (XIV) | — | — | — | — | — | — | — | 0.8 | — | — | — |
| Compound C (XVIII) | — | — | — | — | — | — | — | — | 0.8 | — | — |
| Compound C (XIX) | — | — | — | — | — | — | — | — | — | 0.8 | — |
| Compound C (XX) | — | — | — | — | — | — | — | — | — | — | 0.8 |
| Phenol Antioxidant 13 | — | — | — | 0.07 | 0.07 | 0.07 | 0.07 | 0.07 | 0.07 | 0.07 | 0.07 |
| Inorganic Filler 1 | 15 | 15 | 15 | 15 | 15 | 15 | 15 | 15 | 15 | 15 | 15 |
| Phosphorus Antioxidant 1 | — | — | — | 0.05 | — | — | — | — | — | 0.01 | — |
| Phosphorus Antioxidant 2 | — | — | — | — | 0.05 | — | — | — | — | 0.01 | — |
| Phosphorus Antioxidant 3 | — | — | — | — | — | 0.05 | — | — | — | 0.01 | — |
| Phosphorus Antioxidant 4 | — | — | — | — | — | — | 0.05 | — | — | — | 0.01 |
| Phosphorus Antioxidant 5 | — | — | — | — | — | — | — | 0.05 | — | — | 0.01 |
| Phorphorus Antioxidant 6 | — | — | — | — | — | — | — | — | 0.05 | — | 0.01 |
| Nucleating Agent 1 | — | — | — | — | — | — | — | — | — | — | — |
| Nucleating Agent 2 | — | — | — | — | — | — | — | — | — | — | — |
| Nucleating Agent 3 | — | — | — | — | — | — | — | — | — | — | — |
| Metal Salt 1 | — | — | — | — | — | — | — | — | — | — | — |
| Metal Salt 2 | — | — | — | — | — | — | — | — | — | — | — |
| Metal Salt 3 | — | — | — | — | — | — | — | — | — | — | — |
| Metal Salt 4 | — | — | — | — | — | — | — | — | — | — | — |
| Metal Salt 5 | — | — | — | — | — | — | — | — | — | — | — |
| Metal Salt 6 | — | — | — | — | — | — | — | — | — | — | — |
| Metal Salt 7 | — | — | — | — | — | — | — | — | — | — | — |
| Flexural Modulus × 10⁴ (kgf/cm²) | 2.83 | 2.85 | 2.84 | 2.83 | 2.85 | 2.82 | 2.83 | 2.91 | 2.90 | 2.93 | 2.95 |
| Heat Distortion Temperature (°C.) | 144 | 143 | 145 | 146 | 146 | 145 | 144 | 145 | 145 | 146 | 145 |
| Izod Impact Strength (kgf-cm/cm) | 7.1 | 7.3 | 7.1 | 7.2 | 7.3 | 7.1 | 7.3 | 7.4 | 7.4 | 7.5 | 7.4 |

| | Comparative Example No. | | | | | | | | | | |
|---|---|---|---|---|---|---|---|---|---|---|---|
| | 133 | 134 | 135 | 136 | 137 | 138 | 139 | 140 | 141 | 142 | 143 |
| Composition (part*): | | | | | | | | | | | |
| Compound A (IV) | — | — | — | — | — | — | — | — | — | — | — |
| Compound A (VII) | 0.1 | — | — | — | 0.1 | 0.1 | 0.1 | 0.1 | 0.1 | 0.1 | 0.1 |
| Compound A (IX) | — | — | — | — | — | — | — | — | — | — | — |
| Compound B (VIII) | — | — | — | — | — | — | — | — | — | — | — |
| Compound B (XVIII) | — | — | — | — | — | — | — | — | — | — | — |
| Compound B (XIX) | — | — | — | — | — | — | — | — | — | — | — |
| Compound B (XX) | — | — | — | — | — | — | — | — | — | — | — |
| Compound C (XIV) | — | — | — | — | — | — | — | — | — | — | — |
| Compound C (XVIII) | — | — | — | — | — | — | — | — | — | — | — |
| Compound C (XIX) | — | — | — | — | — | — | — | — | — | — | — |
| Compound C (XX) | — | — | — | — | — | — | — | — | — | — | — |
| Phenol Antioxidant 13 | — | 0.07 | 0.07 | 0.07 | 0.07 | 0.07 | 0.07 | 0.07 | 0.07 | 0.07 | 0.07 |
| Inorganic Filler 1 | 15 | 15 | 15 | 15 | 15 | 15 | 15 | 15 | 15 | 15 | 15 |
| Phosphorus Antioxidant 1 | — | — | — | — | — | — | — | — | — | — | — |
| Phosphorus Antioxidant 2 | — | — | — | — | — | — | — | — | — | — | — |
| Phosphorus Antioxidant 3 | — | — | — | — | — | — | — | — | — | — | — |
| Phosphorus Antioxidant 4 | — | — | — | — | — | — | — | — | — | — | — |
| Phosphorus Antioxidant 5 | — | — | — | — | — | — | — | — | — | — | — |
| Phorphorus Antioxidant 6 | — | — | — | — | — | — | — | — | — | — | — |
| Nucleating Agent 1 | — | 0.1 | — | — | — | — | — | — | — | — | — |
| Nucleating Agent 2 | — | — | 0.1 | — | — | — | — | — | — | — | — |
| Nucleating Agent 3 | — | — | — | 0.1 | — | — | — | — | — | — | — |
| Metal Salt 1 | — | — | — | — | 0.1 | — | — | — | — | — | — |
| Metal Salt 2 | — | — | — | — | — | 0.1 | — | — | — | — | — |
| Metal Salt 3 | — | — | — | — | — | — | 0.1 | — | — | — | — |
| Metal Salt 4 | — | — | — | — | — | — | — | 0.1 | — | — | — |
| Metal Salt 5 | — | — | — | — | — | — | — | — | 0.1 | — | — |
| Metal Salt 6 | — | — | — | — | — | — | — | — | — | 0.1 | — |
| Metal Salt 7 | — | — | — | — | — | — | — | — | — | — | 0.1 |

TABLE 15-continued

| | | | | | | | | | | | |
|---|---|---|---|---|---|---|---|---|---|---|---|
| Flexural Modulus × $10^4$ (kgf/cm$^2$) | 2.70 | 2.68 | 2.65 | 2.71 | 2.70 | 2.71 | 2.78 | 2.70 | 2.73 | 2.71 | 2.75 |
| Heat Distortion Temperature (°C.) | 137 | 138 | 136 | 139 | 136 | 133 | 135 | 133 | 134 | 135 | 135 |
| Izod Impact Strength (kgf-cm/cm) | 7.0 | 6.5 | 6.6 | 6.8 | 6.2 | 6.5 | 6.5 | 6.0 | 6.1 | 6.3 | 6.2 |

Note: *Per 100 parts of a crystalline polyolefin

TABLE 16

| | Example No. | | | | | | | | | | |
|---|---|---|---|---|---|---|---|---|---|---|---|
| | 144 | 145 | 146 | 147 | 148 | 149 | 150 | 151 | 152 | 153 | 154 |
| Composition (part*): | | | | | | | | | | | |
| Compound A (I) | 0.1 | — | — | — | — | — | — | — | — | — | — |
| Compound A (IV) | — | 0.1 | — | — | — | — | — | 0.1 | 0.1 | 0.1 | 0.1 |
| Compound A (VII) | — | — | 0.1 | 0.1 | 0.1 | 0.1 | 0.1 | — | — | — | — |
| Compound B' (I) | — | — | — | 0.1 | — | — | — | — | — | — | — |
| Compound B' (II) | 0.1 | 0.1 | 0.1 | — | 0.1 | — | — | 0.1 | 0.1 | 0.1 | 0.1 |
| Compound B' (III) | — | — | — | — | — | 0.1 | — | — | — | — | — |
| Compound B' (IV) | — | — | — | — | — | — | 0.1 | — | — | — | — |
| Compound C (I) | — | — | — | — | — | — | — | 0.1 | — | — | — |
| Compound C (II) | — | — | — | — | — | — | — | — | 0.1 | — | — |
| Compound C (XII) | — | — | — | — | — | — | — | — | — | 0.1 | — |
| Compound C (XIII) | 0.1 | 0.1 | 0.1 | 0.1 | 0.1 | 0.1 | 0.1 | — | — | — | 0.1 |
| Phenol Antioxidant 1 | — | — | — | 0.1 | 0.1 | 0.1 | 0.1 | 0.1 | 0.1 | 0.1 | 0.1 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × $10^4$ (kgf/cm$^2$) | 2.32 | 2.31 | 2.32 | 2.29 | 2.32 | 2.44 | 2.44 | 2.30 | 2.31 | 2.33 | 2.32 |
| Heat Distortion Temperature (°C.) | 141 | 141 | 141 | 140 | 141 | 141 | 141 | 141 | 142 | 142 | 141 |

| | Comparative Example No. | | | | | | | | | | |
|---|---|---|---|---|---|---|---|---|---|---|---|
| | 144 | 145 | 146 | 147 | 148 | 149 | 150 | 151 | 152 | 153 | 154 |
| Composition (part*): | | | | | | | | | | | |
| Compound A (I) | — | — | — | — | — | — | — | — | — | — | — |
| Compound A (IV) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound B' (I) | — | — | — | — | — | — | — | — | — | — | — |
| Compound B' (II) | — | 0.1 | — | — | — | — | 0.1 | — | — | — | — |
| Compound B' (III) | — | — | — | — | — | — | — | — | — | — | — |
| Compound B' (IV) | — | — | — | — | — | — | — | — | — | — | — |
| Compound C (I) | — | — | — | — | — | — | — | — | — | — | — |
| Compound C (II) | — | — | — | — | — | — | — | — | — | — | — |
| Compound C (XII) | — | — | — | — | — | — | — | — | — | — | — |
| Compound C (XIII) | — | — | — | — | — | 0.1 | — | 0.1 | 0.1 | 0.1 | 0.1 |
| Phenol Antioxidant 1 | — | 0.1 | 0.1 | 0.1 | 0.1 | 0.1 | 0.1 | 0.1 | 0.1 | 0.1 | 0.1 |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | — | 0.1 | — | — | — | — |
| Flexural Modulus × $10^4$ (kgf/cm$^2$) | 1.75 | 1.86 | 1.60 | 2.13 | 2.07 | 1.56 | 1.64 | 2.15 | 1.73 | 1.93 | 2.19 |
| Heat Distortion Temperature (°C.) | 125 | 130 | 125 | 140 | 130 | 121 | 122 | 136 | 117 | 136 | 132 |

Note: *Per 100 parts of a crystalline polyolefin

TABLE 17

| | Example No. | | | | | | | | | | |
|---|---|---|---|---|---|---|---|---|---|---|---|
| | 155 | 156 | 157 | 158 | 159 | 160 | 161 | 162 | 163 | 164 | 165 |
| Composition (part*): | | | | | | | | | | | |
| Compound A (II) | 0.1 | — | — | — | — | — | — | — | — | — | — |
| Compound A (IV) | — | 0.1 | — | — | — | — | — | 0.001 | 0.001 | 0.001 | 0.001 |
| Compound A (VII) | — | — | 0.1 | 0.001 | 0.001 | 0.001 | 0.001 | — | — | — | — |
| Compound B' (V) | — | — | — | 0.001 | — | — | — | — | — | — | — |
| Compound B' (VI) | — | — | — | — | 0.001 | — | — | — | — | — | — |
| Compound B' (VII) | — | — | — | — | — | 0.001 | — | — | — | — | — |
| Compound B' (VIII) | 0.1 | 0.1 | 0.1 | — | — | — | 0.001 | 0.001 | 0.001 | 0.001 | 0.001 |
| Compound C (III) | — | — | — | — | — | — | — | 0.01 | — | — | — |

TABLE 17-continued

|  | | | | | | | | | | | |
|---|---|---|---|---|---|---|---|---|---|---|
| Compound C (IV) | — | — | — | — | — | — | — | — | 0.01 | — | — |
| Compound C (XII) | 0.1 | 0.1 | 0.1 | 0.01 | 0.01 | 0.01 | 0.01 | — | — | 0.01 | — |
| Compound C (XIII) | — | — | — | — | — | — | — | — | — | — | 0.01 |
| Phenol Antioxidant 2 | — | — | — | 0.05 | 0.05 | 0.05 | 0.05 | 0.05 | 0.05 | 0.05 | 0.05 |
| Thioether Antioxidant 1 | — | — | — | 0.1 | 0.1 | 0.1 | 0.1 | 0.1 | 0.1 | 0.1 | 0.1 |
| Clarifier 1 | — | — | — | 0.25 | — | — | — | — | — | — | — |
| Clarifier 2 | — | — | — | — | 0.25 | — | — | — | — | — | — |
| Clarifier 3 | — | — | — | — | — | 0.25 | — | — | — | — | — |
| Clarifier 4 | — | — | — | — | — | — | 0.25 | — | — | — | — |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × $10^4$ (kgf/cm$^2$) | 2.40 | 2.41 | 2.42 | 2.42 | 2.44 | 2.32 | 2.44 | 2.42 | 2.43 | 2.44 | 2.45 |
| Heat Distortion Temperature (°C.) | 143 | 144 | 144 | 143 | 144 | 141 | 142 | 143 | 142 | 143 | 143 |

| | Comparative Example No. | | | | | | | | | |
|---|---|---|---|---|---|---|---|---|---|---|
| | 155 | 156 | 157 | 158 | 159 | 160 | 161 | 162 | 163 | 164 | 165 |
| Composition (part*): | | | | | | | | | | | |
| Compound A (II) | — | — | — | — | — | — | — | — | — | — | — |
| Compound A (IV) | — | — | — | — | — | — | — | — | — | — | — |
| Compound A (VII) | 0.1 | —0.1 | 0.1 | 0.1 | 0.1 | 0.1 | 0.1 | 0.1 | 0.1 | 0.1 | 0.1 |
| Compound B' (V) | — | — | — | — | — | — | — | — | — | — | — |
| Compound B' (VI) | — | — | — | — | — | — | — | — | — | — | — |
| Compound B' (VII) | — | — | — | — | — | — | — | — | — | — | — |
| Compound B' (VIII) | — | 0.1 | — | — | — | — | 0.1 | — | — | — | — |
| Compound C (III) | — | — | — | — | — | — | — | — | — | — | — |
| Compound C (IV) | — | — | — | — | — | — | — | — | — | — | — |
| Compound C (XII) | — | — | — | — | — | — | — | — | — | — | — |
| Compound C (XIII) | — | — | — | — | — | 0.1 | — | 0.1 | 0.1 | 0.1 | 0.1 |
| Phenol Antioxidant 2 | — | 0.05 | 0.05 | 0.05 | 0.05 | 0.05 | 0.05 | 0.05 | 0.05 | 0.05 | 0.05 |
| Thioether Antioxidant 1 | — | 0.1 | 0.1 | 0.1 | 0.1 | 0.1 | 0.1 | 0.1 | 0.1 | 0.1 | 0.1 |
| Clarifier 1 | — | — | — | — | — | — | — | — | — | — | — |
| Clarifier 2 | — | — | — | — | — | — | — | — | — | — | — |
| Clarifier 3 | — | — | — | — | — | — | — | — | — | — | — |
| Clarifier 4 | — | — | — | — | — | — | — | — | — | — | — |
| Metal Salt 1 (lubricant) | — | — | 0.1 | — | — | — | — | — | 0.1 | — | — |
| Metal Salt 2 (lubricant) | — | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | — | 0.1 | — | — | — | — |
| Flexural Modulus × $10^4$ (kgf/cm$^2$) | 1.70 | 1.83 | 1.88 | 2.10 | 2.02 | 1.55 | 1.60 | 2.11 | 1.70 | 1.90 | 2.16 |
| Heat Distortion Temperature (°C.) | 123 | 128 | 130 | 140 | 127 | 120 | 120 | 133 | 116 | 134 | 130 |

Note: *Per 100 parts of crystalline polyolefin

TABLE 18

| | Example No. | | | | | | | | | | |
|---|---|---|---|---|---|---|---|---|---|---|---|
| | 166 | 167 | 168 | 169 | 170 | 171 | 172 | 173 | 174 | 175 | 176 |
| Composition (part*): | | | | | | | | | | | |
| Compound A (II) | 0.1 | — | — | — | — | — | — | 0.001 | 0.001 | 0.001 | 0.001 |
| Compound A (IV) | — | 0.1 | — | — | — | — | — | 0.002 | 0.002 | 0.002 | 0.002 |
| Compound A (VII) | — | — | 0.1 | 0.005 | 0.005 | 0.005 | 0.005 | 0.001 | 0.001 | 0.001 | 0.001 |
| Compound B' (IX) | 0.1 | 0.1 | 0.1 | 0.005 | — | — | — | 0.002 | 0.002 | 0.002 | 0.002 |
| Compound B' (X) | — | — | — | — | 0.005 | — | — | 0.001 | 0.001 | 0.001 | 0.001 |
| Compound B' (XI) | — | — | — | — | — | 0.005 | — | 0.001 | 0.001 | 0.001 | 0.001 |
| Compound B' (XII) | — | — | — | — | — | — | 0.005 | 0.001 | 0.001 | 0.001 | 0.001 |
| Compound C (V) | — | — | — | — | — | — | — | 0.03 | — | — | — |
| Compound C (VI) | — | — | — | — | — | — | — | — | 0.03 | — | — |
| Compound C (XII) | — | — | — | — | — | — | — | — | — | 0.03 | — |
| Compound C (XIII) | 0.1 | 0.1 | 0.1 | 0.03 | 0.03 | 0.03 | 0.03 | — | — | — | 0.03 |
| Inorganic Filler 1 | 0.1 | 0.1 | 0.1 | 0.1 | 0.1 | 0.1 | 0.1 | 0.1 | 0.1 | 0.1 | 0.1 |
| Phenol Antioxidant 3 | — | — | — | 0.1 | 0.1 | 0.1 | 0.1 | 0.1 | 0.1 | 0.1 | 0.1 |
| Metal Deactivator 1 | — | — | — | 0.1 | — | — | — | — | — | — | — |
| Metal Deactivator 2 | — | — | — | — | 0.1 | — | — | — | — | — | — |
| Metal Deactivator 3 | — | — | — | — | — | 0.1 | — | — | — | — | — |

TABLE 18-continued

|  |  |  |  |  |  |  |  |  |  |  |  |
|---|---|---|---|---|---|---|---|---|---|---|---|
| Metal Deactivator 4 | — | — | — | — | — | — | 0.1 | — | — | — | — |
| Metal Deactivator 5 | — | — | — | — | — | — | — | 0.1 | — | — | — |
| Lubricant 1 | — | — | — | — | — | — | — | — | 0.1 | — | — |
| Lubricant 2 | — | — | — | — | — | — | — | — | — | 0.1 | — |
| Lubricant 3 | — | — | — | — | — | — | — | — | — | — | 0.1 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 4 | — | — | — | — | — | — | — | — | — | — | — |
| Aromatic Amine | — | — | — | — | — | — | — | — | — | — | — |
| Flexural Modulus × $10^4$ (kgf/cm$^2$) | 2.72 | 2.70 | 2.71 | 2.72 | 2.69 | 2.70 | 2.68 | 2.72 | 2.71 | 2.73 | 2.73 |
| Heat Distortion Temperature (°C.) | 148 | 147 | 148 | 150 | 147 | 149 | 147 | 147 | 148 | 149 | 148 |

|  | Comparative Example No. | | | | | | | | | | |
|---|---|---|---|---|---|---|---|---|---|---|---|
|  | 166 | 167 | 168 | 169 | 170 | 171 | 172 | 173 | 174 | 175 | 176 |
| Composition (part*): | | | | | | | | | | | |
| Compound A (II) | — | — | — | — | — | — | — | — | — | — | — |
| Compound A (IV) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound B' (IX) | — | 0.1 | — | — | — | — | 0.1 | — | — | — | — |
| Compound B' (X) | — | — | — | — | — | — | — | — | — | — | — |
| Compound B' (XI) | — | — | — | — | — | — | — | — | — | — | — |
| Compound B' (XII) | — | — | — | — | — | — | — | — | — | — | — |
| Compound C (V) | — | — | — | — | — | — | — | — | — | — | — |
| Compound C (VI) | — | — | — | — | — | — | — | — | — | — | — |
| Compound C (XII) | — | — | — | — | — | — | — | — | — | — | — |
| Compound C (XIII) | — | — | — | — | — | 0.1 | — | 0.1 | 0.1 | 0.1 | 0.1 |
| Inorganic Filler 1 | 0.1 | 0.1 | 0.1 | 0.1 | 0.1 | 0.1 | 0.1 | 0.1 | 0.1 | 0.1 | 0.1 |
| Phenol Antioxidant 3 | — | 0.1 | 0.1 | 0.1 | 0.1 | 0.1 | 0.1 | 0.1 | 0.1 | 0.1 | 0.1 |
| Metal Deactivator 1 | — | — | — | — | — | — | — | — | — | — | — |
| Metal Deactivator 2 | — | — | — | — | — | — | — | — | — | — | — |
| Metal Deactivator 3 | — | — | — | — | — | — | — | — | — | — | — |
| Metal Deactivator 4 | — | — | — | — | — | — | — | — | — | — | — |
| Metal Deactivator 5 | — | — | — | — | — | — | — | — | — | — | — |
| Lubricant 1 | — | — | — | — | — | — | — | — | — | — | — |
| Lubricant 2 | — | — | — | — | — | — | — | — | — | — | — |
| Lubricant 3 | — | — | — | — | — | — | — | — | — | — | — |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 4 | — | — | — | — | 0.1 | — | — | — | — | — | 0.1 |
| Aromatic Amine | — | — | — | — | — | — | 0.1 | — | — | — | — |
| Flexural Modulus × $10^4$ (kgf/cm$^2$) | 2.00 | 2.11 | 1.88 | 2.39 | 2.33 | 1.80 | 1.90 | 2.42 | 1.98 | 2.18 | 2.43 |
| Heat Distortion Temperature (°C.) | 129 | 135 | 130 | 146 | 134 | 125 | 127 | 140 | 120 | 140 | 137 |

Note: *Per 100 parts of a crystalline polyolefin

TABLE 19

| Composition (part*): | 177 | 178 | 179 | 180 | 181 | 182 | 183 | 184 | 185 | 186 | 187 |
|---|---|---|---|---|---|---|---|---|---|---|---|
| | Example No. | | | | | | | | | | |
| Compound A (IV) | 0.1 | — | — | — | — | — | — | 0.01 | 0.01 | 0.01 | 0.01 |
| Compound A (V) | — | 0.1 | — | — | — | — | — | — | — | — | — |
| Compound A (VII) | — | — | 0.1 | 0.01 | 0.01 | 0.01 | 0.01 | — | — | — | — |
| Compound B' (XIII) | — | — | — | 0.01 | — | — | — | — | — | — | — |
| Compound B' (XIV) | — | — | — | — | 0.01 | — | — | — | — | — | — |
| Compound B' (XV) | — | — | — | — | — | 0.01 | — | — | — | — | — |
| Compound B' (XVI) | 0.1 | 0.1 | 0.1 | — | — | — | 0.01 | 0.02 | 0.02 | 0.02 | 0.02 |
| Compound C (VII) | — | — | — | — | — | — | — | 0.5 | — | — | — |
| Compound C (VIII) | — | — | — | — | — | — | — | — | 0.5 | — | — |
| Compound C (XII) | 0.1 | 0.1 | 0.1 | 0.5 | 0.5 | 0.5 | 0.5 | — | — | 0.5 | — |
| Compound C (XIII) | — | — | — | — | — | — | — | — | — | — | 0.5 |
| Phenol Antioxidant 4 | — | — | — | 0.1 | 0.1 | 0.1 | 0.1 | 0.1 | 0.1 | 0.1 | 0.1 |
| | Comparative Example No. | | | | | | | | | | |
| Compound A (IV) | — | — | — | — | — | — | — | — | — | — | — |
| Compound A (V) | — | — | — | — | — | — | — | — | — | — | — |

TABLE 19-continued

| Composition (part*): | 177 | 178 | 179 | 180 | 181 | 182 | 183 | 184 | 185 | 186 | 187 |
|---|---|---|---|---|---|---|---|---|---|---|---|
| Compound A (VII) | 0.1 | 0.1 | 0.1 | 0.1 | 0.1 | 0.1 | 0.1 | 0.1 | 0.1 | 0.1 | 0.1 |
| Compound B' (XIII) | — | — | — | — | — | — | — | — | — | — | — |
| Compound B' (XIV) | — | — | — | — | — | — | — | — | — | — | — |
| Compound B' (XV) | — | — | — | — | — | — | — | — | — | — | — |
| Compound B' (XVI) | — | 0.1 | — | — | — | — | 0.1 | — | — | — | — |
| Compound C (VII) | — | — | — | — | — | — | — | — | — | — | — |
| Compound C (VIII) | — | — | — | — | — | — | — | — | — | — | — |
| Compound C (XII) | — | — | — | — | — | 0.1 | — | 0.1 | 0.1 | 0.1 | 0.1 |
| Compound C (XIII) | — | — | — | — | — | — | — | — | — | — | — |
| Phenol Antioxidant 4 | — | 0.1 | 0.1 | 0.1 | 0.1 | 0.1 | 0.1 | 0.1 | 0.1 | 0.1 | 0.1 |
| | | | | | Example No. | | | | | | |
| Thioether Antioxidant 2 | — | — | — | 0.1 | 0.1 | 0.1 | 0.1 | 0.1 | 0.1 | 0.1 | 0.1 |
| Light stabilizer 1 | — | — | — | — | — | — | — | — | 0.1 | — | — |
| Light stabilizer 2 | — | — | — | — | — | — | — | — | — | 0.1 | — |
| Light stabilizer 3 | — | — | — | — | — | — | — | — | — | — | 0.1 |
| Light stabilizer 4 | — | — | — | 0.1 | — | — | — | — | 0.1 | — | — |
| Light stabilizer 5 | — | — | — | — | 0.1 | — | — | — | — | 0.1 | — |
| Light stabilizer 6 | — | — | — | — | — | 0.1 | — | — | — | — | 0.1 |
| Light stabilizer 7 | — | — | — | — | — | — | 0.1 | — | — | — | — |
| Light stabilizer 8 | — | — | — | — | — | — | — | 0.1 | — | — | — |
| Radical Generator 1 | 0.05 | 0.05 | 0.05 | 0.05 | 0.05 | 0.05 | 0.05 | 0.05 | 0.05 | 0.05 | 0.05 |
| EPR | 10 | 10 | 10 | 10 | 10 | 10 | 10 | 10 | 10 | 10 | 10 |
| | | | | | Comparative Example No. | | | | | | |
| Thioether Antioxidant 2 | — | 0.1 | 0.1 | 0.1 | 0.1 | 0.1 | 0.1 | 0.1 | 0.1 | 0.1 | 0.1 |
| Light stabilizer 1 | — | — | — | — | — | — | — | — | — | — | — |
| Light stabilizer 2 | — | — | — | — | — | — | — | — | — | — | — |
| Light stabilizer 3 | — | — | — | — | — | — | — | — | — | — | — |
| Light stabilizer 4 | — | — | — | — | — | — | — | — | — | — | — |
| Light stabilizer 5 | — | — | — | — | — | — | — | — | — | — | — |
| Light stabilizer 6 | — | — | — | — | — | — | — | — | — | — | — |
| Light stabilizer 7 | — | — | — | — | — | — | — | — | — | — | — |
| Light stabilizer 8 | — | — | — | — | — | — | — | — | — | — | — |
| Radical Generator 1 | 0.05 | 0.05 | 0.05 | 0.05 | 0.05 | 0.05 | 0.05 | 0.05 | 0.05 | 0.05 | 0.05 |
| EPR | 10 | 10 | 10 | 10 | 10 | 10 | 10 | 10 | 10 | 10 | 10 |
| | | | | | Example No. | | | | | | |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × $10^4$ (kgf/cm$^2$) | 1.40 | 1.41 | 1.42 | 1.45 | 1.42 | 1.41 | 1.41 | 1.42 | 1.41 | 1.43 | 1.42 |
| Heat Distortion Temperature (°C.) | 107 | 107 | 108 | 102 | 106 | 106 | 106 | 108 | 108 | 110 | 109 |
| Izod Impact Strength (kgf-cm/cm) | 7.5 | 7.6 | 7.7 | 7.6 | 7.5 | 7.8 | 7.6 | 7.9 | 7.7 | 8.0 | 8.1 |
| | | | | | Comparative Example No. | | | | | | |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | 0.1 | — | — | — | — | — |
| Flexural Modulus × $10^4$ (kgf/cm$^2$) | 0.82 | 0.98 | 0.80 | 1.20 | 1.14 | 0.65 | 0.72 | 1.22 | 0.80 | 1.01 | 1.24 |
| Heat Distortion Temperature (°C.) | 82 | 85 | 82 | 98 | 87 | 79 | 80 | 93 | 75 | 92 | 89 |
| Izod Impact Strength (kgf-cm/cm) | 6.8 | 6.8 | 6.5 | 6.6 | 6.5 | 6.9 | 6.8 | 6.6 | 7.1 | 7.3 | 6.8 |

Note:
*Per 100 parts of a crystalline polyolefin

TABLE 20

| Composition (part*): | 188 | 189 | 190 | 191 | 192 | 193 | 194 | 195 | 196 | 197 | 198 |
|---|---|---|---|---|---|---|---|---|---|---|---|
| | | | | | Example No. | | | | | | |
| Compound A (IV) | 0.1 | — | — | — | — | — | — | 0.03 | 0.03 | 0.03 | 0.03 |
| Compound A (VI) | — | 0.1 | — | — | — | — | — | — | — | — | — |
| Compound A (VII) | — | — | 0.1 | 0.03 | 0.03 | 0.03 | 0.03 | — | — | — | — |
| Compound B' (XVII) | — | — | — | 0.03 | — | — | — | — | — | — | — |
| Compound B' (XVIII) | — | — | — | — | 0.03 | — | — | — | — | — | — |
| Compound B' (XIX) | — | — | — | — | — | 0.03 | — | — | — | — | — |
| Compound B' (XX) | 0.1 | 0.1 | 0.1 | — | — | — | 0.03 | 0.03 | 0.03 | 0.03 | 0.03 |

TABLE 20-continued

| Composition (part*): | 188 | 189 | 190 | 191 | 192 | 193 | 194 | 195 | 196 | 197 | 198 |
|---|---|---|---|---|---|---|---|---|---|---|---|
| Compound C (IX) | — | — | — | — | — | — | — | 0.05 | — | — | — |
| Compound C (X) | — | — | — | — | — | — | — | — | 0.05 | — | — |
| Compound C (XI) | — | — | — | — | — | — | — | — | — | 0.05 | — |
| Compound C (XII) | 0.1 | 0.1 | 0.1 | 0.05 | 0.05 | 0.05 | 0.05 | — | — | — | 0.05 |
| Phenol Antioxidant 5 | — | — | — | 0.1 | 0.1 | 0.1 | 0.1 | 0.1 | 0.1 | 0.1 | 0.1 |
| Thioether Antioxidant 1 | — | — | — | 0.2 | 0.2 | 0.2 | 0.2 | 0.2 | 0.2 | 0.2 | 0.2 |
| | | | | | Comparative Example No. | | | | | | |
| Compound A (IV) | — | — | — | — | — | — | — | — | — | — | — |
| Compound A (VI) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound B' (XVII) | — | — | — | — | — | — | — | — | — | — | — |
| Compound B' (XVIII) | — | — | — | — | — | — | — | — | — | — | — |
| Compound B' (XIX) | — | — | — | — | — | — | — | — | — | — | — |
| Compound B' (XX) | — | 0.1 | — | — | — | — | 0.1 | — | — | — | — |
| Compound C (IX) | — | — | — | — | — | — | — | — | — | — | — |
| Compound C (X) | — | — | — | — | — | — | — | — | — | — | — |
| Compound C (XI) | — | — | — | — | — | — | — | — | — | — | — |
| Compound C (XII) | — | — | — | — | — | 0.1 | — | 0.1 | 0.1 | 0.1 | 0.1 |
| Phenol Antioxidant 5 | — | 0.1 | 0.1 | 0.1 | 0.1 | 0.1 | 0.1 | 0.1 | 0.1 | 0.1 | 0.1 |
| Thioether Antioxidant 1 | — | 0.2 | 0.2 | 0.2 | 0.2 | 0.2 | 0.2 | 0.2 | 0.2 | 0.2 | 0.2 |
| | | | | | Example No. | | | | | | |
| Radical Generator 2 | 0.05 | 0.05 | 0.05 | 0.05 | 0.05 | 0.05 | 0.05 | 0.05 | 0.05 | 0.05 | 0.05 |
| EPDM | 5 | 5 | 5 | 5 | 5 | 5 | 5 | 5 | 5 | 5 | 5 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × 10$^4$ (kgf/cm$^2$) | 1.82 | 1.83 | 1.82 | 1.79 | 1.74 | 1.85 | 1.82 | 1.83 | 1.81 | 1.82 | 1.83 |
| Heat Distortion Temperature (°C.) | 137 | 136 | 138 | 136 | 136 | 134 | 137 | 136 | 137 | 137 | 138 |
| Izod Impact Strength (kgf-cm/cm) | 7.5 | 7.4 | 7.6 | 7.4 | 7.5 | 7.6 | 7.5 | 7.6 | 7.5 | 7.7 | 7.6 |
| | | | | | Comparative Example No. | | | | | | |
| Radical Generator 2 | 0.05 | 0.05 | 0.05 | 0.05 | 0.05 | 0.05 | 0.05 | 0.05 | 0.05 | 0.05 | 0.05 |
| EPDM | 5 | 5 | 5 | 5 | 5 | 5 | 5 | 5 | 5 | 5 | 5 |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | 0.1 | — | — | — | — | — |
| Flexural Modulus × 10$^4$ (kgf/cm$^2$) | 1.51 | 1.56 | 1.45 | 1.70 | 1.69 | 1.42 | 1.46 | 1.70 | 1.49 | 1.69 | 1.71 |
| Heat Distortion Temperature (°C.) | 120 | 127 | 116 | 131 | 126 | 117 | 117 | 130 | 112 | 130 | 127 |
| Izod Impact Strength (kgf-cm/cm) | 6.7 | 6.8 | 6.5 | 6.9 | 6.8 | 6.7 | 6.5 | 6.6 | 6.4 | 6.7 | 6.6 |

Note:
*Per 100 parts of a crystalline polyolefin

TABLE 21

| Composition (part*): | 199 | 200 | 201 | 202 | 203 | 204 | 205 | 206 | 207 | 208 | 209 |
|---|---|---|---|---|---|---|---|---|---|---|---|
| | | | | | Example No. | | | | | | |
| Compound A (IV) | 0.1 | — | — | — | — | — | — | 0.05 | 0.05 | 0.05 | 0.05 |
| Compound A (VII) | — | 0.1 | — | 0.05 | 0.05 | 0.05 | 0.05 | — | — | — | — |
| Compound A (VIII) | — | — | 0.1 | — | — | — | — | — | — | — | — |
| Compound B' (XXI) | — | — | — | 0.05 | — | — | — | — | — | — | — |
| Compound B' (XXII) | — | — | — | — | 0.05 | — | — | — | — | — | — |
| Compound B' (XXIII) | 0.1 | 0.1 | 0.1 | — | — | 0.05 | — | 0.05 | 0.05 | 0.05 | 0.05 |
| Compound B' (XXIV) | — | — | — | — | — | — | 0.05 | — | — | — | — |
| Compound C (XI) | — | — | — | — | — | — | — | 1.0 | — | — | — |
| Compound C (XII) | — | — | — | — | — | — | — | — | 1.0 | — | — |
| Compound C (XIII) | 0.1 | 0.1 | 0.1 | 1.0 | 1.0 | 1.0 | 1.0 | — | — | 1.0 | — |
| Compound C (XIV) | — | — | — | — | — | — | — | — | — | — | 1.0 |
| | | | | | Comparative Example No. | | | | | | |
| Compound A (IV) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound A (VIII) | — | — | — | — | — | — | — | — | — | — | — |
| Compound B' (XXI) | — | — | — | — | — | — | — | — | — | — | — |
| Compound B' (XXII) | — | — | — | — | — | — | — | — | — | — | — |

TABLE 21-continued

| Composition (part*): | 199 | 200 | 201 | 202 | 203 | 204 | 205 | 206 | 207 | 208 | 209 |
|---|---|---|---|---|---|---|---|---|---|---|---|
| Compound B' (XXIII) | — | 0.1 | — | — | — | — | 0.1 | — | — | — | — |
| Compound B' (XXIV) | — | — | — | — | — | — | — | — | — | — | — |
| Compound C (XI) | — | — | — | — | — | — | — | — | — | — | — |
| Compound C (XII) | — | — | — | — | — | — | — | — | — | — | — |
| Compound C (XIII) | — | — | — | — | — | 0.1 | — | 0.1 | 0.1 | 0.1 | 0.1 |
| Compound C (XIV) | — | — | — | — | — | — | — | — | — | — | — |
| | | | | Example No. | | | | | | | |
| Phenol Antioxidant 6 | — | — | — | 0.03 | 0.03 | 0.03 | 0.03 | 0.03 | 0.03 | 0.03 | 0.03 |
| Thioether Antioxidant 3 | — | — | — | 0.1 | 0.1 | 0.1 | 0.1 | 0.1 | 0.1 | 0.1 | 0.1 |
| Phosphorus Antioxidant 1 | — | — | — | 0.05 | — | — | — | — | — | 0.01 | — |
| Phosphorus Antioxidant 2 | — | — | — | — | 0.05 | — | — | — | — | 0.01 | — |
| Phosphorus Antioxidant 3 | — | — | — | — | — | 0.05 | — | — | — | 0.01 | — |
| Phosphorus Antioxidant 4 | — | — | — | — | — | — | 0.05 | — | — | — | 0.01 |
| Phosphorus Antioxidant 5 | — | — | — | — | — | — | — | 0.05 | — | — | 0.01 |
| Phosphorus Antioxidant 6 | — | — | — | — | — | — | — | — | 0.05 | — | 0.01 |
| | | | Comparative Example No. | | | | | | | | |
| Phenol Antioxidant 6 | — | 0.03 | 0.03 | 0.03 | 0.03 | 0.03 | 0.03 | 0.03 | 0.03 | 0.03 | 0.03 |
| Thioether Antioxidant 3 | — | 0.1 | 0.1 | 0.1 | 0.1 | 0.1 | 0.1 | 0.1 | 0.1 | 0.1 | 0.1 |
| Phosphorus Antioxidant 1 | — | — | — | — | — | — | — | — | — | — | — |
| Phosphorus Antioxidant 2 | — | — | — | — | — | — | — | — | — | — | — |
| Phosphorus Antioxidant 3 | — | — | — | — | — | — | — | — | — | — | — |
| Phosphorus Antioxidant 4 | — | — | — | — | — | — | — | — | — | — | — |
| Phosphorus Antioxidant 5 | — | — | — | — | — | — | — | — | — | — | — |
| Phosphorus Antioxidant 6 | — | — | — | — | — | — | — | — | — | — | — |
| | | | | Example No. | | | | | | | |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × $10^4$ (kgf/cm$^2$) | 2.21 | 2.20 | 2.23 | 2.20 | 2.19 | 2.24 | 2.25 | 2.22 | 2.24 | 2.23 | 2.24 |
| Heat Distortion Temperature (°C.) | 125 | 125 | 125 | 124 | 126 | 125 | 126 | 125 | 125 | 126 | 125 |
| | | | Comparative Example No. | | | | | | | | |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | — | 0.1 | — | — | — | — |
| Flexural Modulus × $10^4$ (kgf/cm$^2$) | 1.38 | 1.99 | 1.11 | 1.76 | 1.70 | 1.19 | 1.28 | 1.78 | 1.35 | 1.56 | 1.82 |
| Heat Distortion Temperature (°C.) | 105 | 120 | 106 | 121 | 110 | 100 | 102 | 115 | 100 | 117 | 113 |

Note:
*Per 100 parts of a crystalline polyolefin

TABLE 22

| Composition (part*): | 210 | 211 | 212 | 213 | 214 | 215 | 216 | 217 | 218 | 219 | 220 |
|---|---|---|---|---|---|---|---|---|---|---|---|
| | | | | Example No. | | | | | | | |
| Compound A (IV) | 0.1 | — | — | — | — | — | — | 0.07 | 0.07 | 0.07 | 0.07 |
| Compound A (VII) | — | 0.1 | — | 0.07 | 0.07 | 0.07 | 0.07 | — | — | — | — |
| Compound A (IX) | — | — | 0.1 | — | — | — | — | — | — | — | — |
| Compound B' (XXV) | — | — | — | 0.07 | — | — | — | — | — | — | — |
| Compound B' (XXVI) | — | — | — | — | 0.07 | — | — | — | — | — | — |
| Compound B' (XXVII) | — | — | — | — | — | 0.07 | — | — | — | — | — |
| Compound B' (XXVIII) | 0.1 | 0.1 | 0.1 | — | — | — | 0.07 | 0.07 | 0.07 | 0.07 | 0.07 |
| Compound C (XIV) | 0.1 | 0.1 | 0.1 | 0.03 | 0.03 | 0.03 | 0.03 | 0.03 | — | — | — |
| Compound C (XV) | — | — | — | — | — | — | — | — | 0.03 | — | — |

TABLE 22-continued

| Composition (part*): | 210 | 211 | 212 | 213 | 214 | 215 | 216 | 217 | 218 | 219 | 220 |
|---|---|---|---|---|---|---|---|---|---|---|---|
| Compound C (XVI) | — | — | — | — | — | — | — | — | — | 0.03 | — |
| Compound C (XVII) | — | — | — | — | — | — | — | — | — | — | 0.03 |
| Phenol Antioxidant 7 | — | — | — | 0.1 | 0.1 | 0.1 | 0.1 | 0.1 | 0.1 | 0.1 | 0.1 |
| | | | | Comparative Example No. | | | | | | | |
| Compound A (IV) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound A (IX) | — | — | — | — | — | — | — | — | — | — | — |
| Compound B' (XXV) | — | — | — | — | — | — | — | — | — | — | — |
| Compound B' (XXVI) | — | — | — | — | — | — | — | — | — | — | — |
| Compound B' (XXVII) | — | — | — | — | — | — | — | — | — | — | — |
| Compound B' (XXVIII) | — | 0.1 | — | — | — | — | 0.1 | — | — | — | — |
| Compound C (XIV) | — | — | — | — | — | 0.1 | — | 0.1 | 0.1 | 0.1 | 0.1 |
| Compound C (XV) | — | — | — | — | — | — | — | — | — | — | — |
| Compound C (XVI) | — | — | — | — | — | — | — | — | — | — | — |
| Compound C (XVII) | — | — | — | — | — | — | — | — | — | — | — |
| Phenol Antioxidant 7 | — | 0.1 | 0.1 | 0.1 | 0.1 | 0.1 | 0.1 | 0.1 | 0.1 | 0.1 | 0.1 |
| | | | | Example No. | | | | | | | |
| Thioether Antioxidant 3 | — | — | — | 0.2 | 0.2 | 0.2 | 0.2 | 0.2 | 0.2 | 0.2 | 0.2 |
| Inorganic Filler 3 | 10 | 10 | 10 | 10 | 10 | 10 | 10 | 10 | 10 | 10 | 10 |
| Inorganic Filler 4 | 10 | 10 | 10 | 10 | 10 | 10 | 10 | 10 | 10 | 10 | 10 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × $10^4$ (kgf/cm²) | 2.38 | 2.39 | 2.40 | 2.41 | 2.40 | 2.38 | 2.39 | 2.40 | 2.40 | 2.41 | 2.40 |
| Heat Distortion Temperature (°C.) | 142 | 142 | 141 | 140 | 141 | 143 | 143 | 142 | 140 | 142 | 143 |
| | | | | Comparative Example No. | | | | | | | |
| Thioether Antioxidant 3 | — | 0.2 | 0.2 | 0.2 | 0.2 | 0.2 | 0.2 | 0.2 | 0.2 | 0.2 | 0.2 |
| Inorganic Filler 3 | 10 | 10 | 10 | 10 | 10 | 10 | 10 | 10 | 10 | 10 | 10 |
| Inorganic Filler 4 | 10 | 10 | 10 | 10 | 10 | 10 | 10 | 10 | 10 | 10 | 10 |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | — | 0.1 | — | — | — | — |
| Flexural Modulus × $10^4$ (kgf/cm²) | 1.65 | 1.70 | 1.51 | 2.02 | 1.97 | 1.47 | 1.55 | 2.05 | 1.64 | 1.83 | 2.09 |
| Heat Distortion Temperature (°C.) | 120 | 127 | 121 | 136 | 126 | 117 | 117 | 131 | 112 | 131 | 127 |

Note:
*Per 100 parts of a crystalline polyolefin

TABLE 23

| | Example No. | | | | | | | | | | |
|---|---|---|---|---|---|---|---|---|---|---|---|
| Composition (part*): | 221 | 222 | 223 | 224 | 225 | 226 | 227 | 228 | 229 | 230 | 231 |
| Compound A (IV) | 0.1 | — | — | — | — | — | — | 0.15 | 0.15 | 0.15 | 0.15 |
| Compound A (VII) | — | 0.1 | — | 0.15 | 0.15 | 0.15 | 0.15 | — | — | — | — |
| Compound A (X) | — | — | 0.1 | — | — | — | — | — | — | — | — |
| Compound B' (XXIX) | 0.1 | 0.1 | 0.1 | 0.15 | — | — | — | 0.15 | 0.15 | 0.15 | 0.15 |
| Compound B' (XXX) | — | — | — | — | 0.15 | — | — | — | — | — | — |
| Compound B' (XXXI) | — | — | — | — | — | 0.15 | — | — | — | — | — |
| Compound B' (XXXII) | — | — | — | — | — | — | 0.15 | — | — | — | — |
| Compound C (XVI) | 0.1 | 0.1 | 0.1 | 0.15 | 0.15 | 0.15 | 0.15 | 0.15 | — | — | — |
| Compound C (XVII) | — | — | — | — | — | — | — | — | 0.15 | — | — |
| Compound C (XVIII) | — | — | — | — | — | — | — | — | — | 0.15 | — |
| Compound C (XIX) | — | — | — | — | — | — | — | — | — | — | 0.15 |
| Phenol Antioxidant 8 | — | — | — | 0.1 | 0.1 | 0.1 | 0.1 | 0.1 | 0.1 | 0.1 | 0.1 |
| | Comparative Example No. | | | | | | | | | | |
| Composition (part*): | 221 | 222 | 223 | 224 | 225 | 226 | 227 | 228 | 229 | 230 | 231 |
| Compound A (IV) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound A (X) | — | — | — | — | — | — | — | — | — | — | — |
| Compound B' (XXIX) | — | 0.1 | — | — | — | — | 0.1 | — | — | — | — |
| Compound B' (XXX) | — | — | — | — | — | — | — | — | — | — | — |
| Compound B' (XXXI) | — | — | — | — | — | — | — | — | — | — | — |
| Compound B' (XXXII) | — | — | — | — | — | — | — | — | — | — | — |
| Compound C (XVI) | — | — | — | — | — | 0.1 | — | 0.1 | 0.1 | 0.1 | 0.1 |
| Compound C (XVII) | — | — | — | — | — | — | — | — | — | — | — |

TABLE 23-continued

|  |  |  |  |  |  |  |  |  |  |  |
|---|---|---|---|---|---|---|---|---|---|---|
| Compound C (XVIII) | — | — | — | — | — | — | — | — | — | — |
| Compound C (XIX) | — | — | — | — | — | — | — | — | — | — |
| Phenol Antioxidant 8 | — | 0.1 | 0.1 | 0.1 | 0.1 | 0.1 | 0.1 | 0.1 | 0.1 | 0.1 |

| | Example No. | | | | | | | | | |
|---|---|---|---|---|---|---|---|---|---|---|
| Composition (part*): | 221 | 222 | 223 | 224 | 225 | 226 | 227 | 228 | 229 | 230 | 231 |
| Thioether Antioxidant 2 | — | — | — | 0.1 | 0.1 | 0.1 | 0.1 | 0.1 | 0.1 | 0.1 | 0.1 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × 10⁴ (kgf/cm²) | 2.23 | 2.22 | 2.23 | 2.25 | 2.24 | 2.27 | 2.29 | 2.24 | 2.23 | 2.23 | 2.24 |
| Heat Distortion Temperature (°C.) | 136 | 136 | 135 | 136 | 135 | 137 | 135 | 136 | 135 | 136 | 136 |
| Izod Impact Strength (kgf-cm/cm) | 7.3 | 7.4 | 7.3 | 7.5 | 7.4 | 7.5 | 7.4 | 7.5 | 7.4 | 7.4 | 7.5 |

| | Comparative Example No. | | | | | | | | | |
|---|---|---|---|---|---|---|---|---|---|---|
| Composition (part*): | 221 | 222 | 223 | 224 | 225 | 226 | 227 | 228 | 229 | 230 | 231 |
| Thioether Antioxidant 2 | — | 0.1 | 0.1 | 0.1 | 0.1 | 0.1 | 0.1 | 0.1 | 0.1 | 0.1 | 0.1 |
| Metal Salt 1 (lubricant) | — | — | 0.1 | — | — | — | — | — | 0.1 | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | — | 0.1 | — | — | — | — |
| Flexural Modulus × 10⁴ (kgf/cm²) | 1.60 | 2.00 | 1.55 | 1.98 | 1.92 | 1.41 | 1.50 | 2.00 | 1.59 | 1.78 | 2.05 |
| Heat Distortion Temperature (°C.) | 121 | 128 | 120 | 138 | 126 | 117 | 119 | 132 | 113 | 132 | 128 |
| Izod Impact Strength (kgf-cm/cm) | 7.0 | 7.1 | 7.0 | 7.1 | 7.1 | 7.3 | 7.3 | 7.3 | 7.5 | 7.3 | 7.2 |

Note:
*Per 100 parts of a crystalline polyolefin

TABLE 24

| | Example No. | | | | | | | | | | |
|---|---|---|---|---|---|---|---|---|---|---|---|
| Composition (part*): | 232 | 233 | 234 | 235 | 236 | 237 | 238 | 239 | 240 | 241 | 242 |
| Compound A (I) | 0.1 | — | — | — | — | — | — | — | — | — | — |
| Compound A (IV) | — | 0.1 | — | — | — | — | — | 0.2 | 0.2 | 0.2 | 0.2 |
| Compound A (VII) | — | — | 0.1 | 0.2 | 0.2 | 0.2 | 0.2 | — | — | — | — |
| Compound B (XXXIII) | 0.1 | 0.1 | 0.1 | 0.2 | — | — | — | 0.2 | 0.2 | 0.2 | 0.2 |
| Compound B (XXXIV) | — | — | — | — | 0.2 | — | — | — | — | — | — |
| Compound B (XXXV) | — | — | — | — | — | 0.2 | — | — | — | — | — |
| Compound B (XXXVI) | — | — | — | — | — | — | 0.2 | — | — | — | — |
| Compound C (XVII) | 0.1 | 0.1 | 0.1 | 0.2 | 0.2 | 0.2 | 0.2 | 0.2 | — | — | — |
| Compound C (XVIII) | — | — | — | — | — | — | — | — | 0.2 | — | — |
| Compound C (XIX) | — | — | — | — | — | — | — | — | — | 0.2 | — |
| Compound C (XX) | — | — | — | — | — | — | — | — | — | — | 0.2 |
| Phenol Antioxidant 9 | — | — | — | 0.05 | 0.05 | 0.05 | 0.05 | 0.05 | 0.05 | 0.05 | 0.05 |
| Light stabilizer 1 | — | — | — | — | — | — | — | — | 0.1 | — | 0.05 |

| | Comparative Example No. | | | | | | | | | | |
|---|---|---|---|---|---|---|---|---|---|---|---|
| Composition (part*): | 232 | 233 | 234 | 235 | 236 | 237 | 238 | 239 | 240 | 241 | 242 |
| Compound A (I) | — | — | — | — | — | — | — | — | — | — | — |
| Compound A (IV) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound B (XXXIII) | — | 0.1 | — | — | — | — | 0.1 | — | — | — | — |
| Compound B (XXXIV) | — | — | — | — | — | — | — | — | — | — | — |
| Compound B (XXXV) | — | — | — | — | — | — | — | — | — | — | — |
| Compound B (XXXVI) | — | — | — | — | — | — | — | — | — | — | — |
| Compound C (XVII) | — | — | — | — | — | 0.1 | — | 0.1 | 0.1 | 0.1 | 0.1 |
| Compound C (XVIII) | — | — | — | — | — | — | — | — | — | — | — |
| Compound C (XIX) | — | — | — | — | — | — | — | — | — | — | — |
| Compound C (XX) | — | — | — | — | — | — | — | — | — | — | — |
| Phenol Antioxidant 9 | — | 0.05 | 0.05 | 0.05 | 0.05 | 0.05 | 0.05 | 0.05 | 0.05 | 0.05 | 0.05 |
| Light stabilizer 1 | — | — | — | — | — | — | — | — | — | — | — |

| | Example No. | | | | | | | | | | |
|---|---|---|---|---|---|---|---|---|---|---|---|
| Composition (part*): | 232 | 233 | 234 | 235 | 236 | 237 | 238 | 239 | 240 | 241 | 242 |
| Light Stabilizer 2 | — | — | — | — | — | — | — | — | — | 0.1 | 0.05 |

TABLE 24-continued

| Composition (part*): | 223 | 224 | 225 | 226 | 227 | 228 | 229 | 230 | 231 |
|---|---|---|---|---|---|---|---|---|---|
| Light Stabilizer 3 | — | — | — | — | — | — | — | 0.1 | 0.1 | 0.1 |
| Light Stabilizer 4 | — | — | — | 0.1 | — | — | — | — | 0.1 | — | 0.1 |
| Light Stabilizer 5 | — | — | — | — | 0.1 | — | — | — | — | 0.1 | 0.1 |
| Light Stabilizer 6 | — | — | — | — | — | 0.1 | — | — | — | — | 0.1 |
| Light Stabilizer 7 | — | — | — | — | — | — | 0.1 | — | — | — | — |
| Light Stabilizer 8 | — | — | — | — | — | — | — | 0.1 | — | — | — |
| Antistatic Agent | — | — | — | 0.5 | 0.5 | 0.5 | 0.5 | 0.5 | 0.5 | 0.5 | 0.5 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |

Comparative Example No.

| Composition (part*): | 232 | 233 | 234 | 235 | 236 | 237 | 238 | 239 | 240 | 241 | 242 |
|---|---|---|---|---|---|---|---|---|---|---|---|
| Light Stabilizer 2 | — | — | — | — | — | — | — | — | — | — | — |
| Light Stabilizer 3 | — | — | — | — | — | — | — | — | — | — | — |
| Light Stabilizer 4 | — | — | — | — | — | — | — | — | — | — | — |
| Light Stabilizer 5 | — | — | — | — | — | — | — | — | — | — | — |
| Light Stabilizer 6 | — | — | — | — | — | — | — | — | — | — | — |
| Light Stabilizer 7 | — | — | — | — | — | — | — | — | — | — | — |
| Light Stabilizer 8 | — | — | — | — | — | — | — | — | — | — | — |
| Antistatic Agent | 0.5 | 0.5 | 0.5 | 0.5 | 0.5 | 0.5 | 0.5 | 0.5 | 0.5 | 0.5 | 0.5 |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |

Example No.

| Composition (part*): | 232 | 233 | 234 | 235 | 236 | 237 | 238 | 239 | 240 | 241 | 242 |
|---|---|---|---|---|---|---|---|---|---|---|---|
| Aromatic Amine | — | — | — | — | — | — | — | — | — | — | — |
| Flexural Modulus × $10^4$ (kgf/cm$^2$) | 2.15 | 2.16 | 2.17 | 2.17 | 2.19 | 2.18 | 2.10 | 2.16 | 2.16 | 2.16 | 2.17 |
| Heat Distortion Temperature (°C.) | 136 | 137 | 136 | 135 | 136 | 138 | 138 | 137 | 136 | 138 | 137 |
| Izod Impact Strength (kgf-cm/cm) | 7.2 | 7.1 | 7.1 | 7.3 | 7.2 | 7.2 | 7.4 | 7.1 | 7.3 | 7.3 | 7.2 |

Comparative Example No.

| Composition (part*): | 232 | 233 | 234 | 235 | 236 | 237 | 238 | 239 | 240 | 241 | 242 |
|---|---|---|---|---|---|---|---|---|---|---|---|
| Aromatic Amine | — | — | — | — | — | — | 0.1 | — | — | — | — |
| Flexural Modulus × $10^4$ (kgf/cm$^2$) | 1.55 | 1.80 | 1.54 | 1.93 | 1.87 | 1.36 | 1.44 | 1.94 | 1.54 | 1.75 | 1.99 |
| Heat Distortion Temperature (°C.) | 121 | 125 | 120 | 137 | 126 | 117 | 120 | 133 | 113 | 132 | 129 |
| Izod Impact Strength (kgf-cm/cm) | 6.8 | 7.1 | 6.6 | 6.8 | 6.6 | 7.0 | 7.1 | 7.1 | 7.2 | 7.1 | 6.9 |

Note:
*Per 100 parts of a crystalline polyolefin

TABLE 25

| | Example No. | | | | | | | | | | |
|---|---|---|---|---|---|---|---|---|---|---|---|
| Composition (part*): | 243 | 244 | 245 | 246 | 247 | 248 | 249 | 250 | 251 | 252 | 253 |
| Compound A (III) | 0.1 | — | — | — | — | — | — | — | — | — | — |
| Compound A (IV) | — | 0.1 | — | — | — | — | — | 0.5 | 0.5 | 0.5 | 0.5 |
| Compound A (VII) | — | — | 0.1 | 0.5 | 0.5 | 0.5 | 0.5 | — | — | — | — |
| Compound B' (XXXVII) | — | — | — | 0.5 | — | — | — | — | — | — | — |
| Compound B' (XXXVIII) | 0.1 | 0.1 | 0.1 | — | 0.5 | — | — | 0.5 | 0.5 | 0.5 | 0.5 |
| Compound B' (XXXIX) | — | — | — | — | — | 0.5 | — | — | — | — | — |
| Compound B' (XL) | — | — | — | — | — | — | 0.5 | — | — | — | — |
| Compound C (XII) | — | — | — | — | — | — | — | 0.06 | — | — | — |
| Compound C (XIII) | — | — | — | 0.2 | 0.2 | 0.2 | 0.2 | — | 0.06 | — | — |
| Compound C (XIV) | 0.1 | 0.1 | 0.1 | 0.3 | 0.3 | 0.3 | 0.3 | — | — | 0.06 | — |
| Compound C (XV) | — | — | — | 0.1 | 0.1 | 0.1 | 0.1 | — | — | — | 0.06 |
| Phenol Antioxidant 10 | — | — | — | 0.2 | 0.2 | 0.2 | 0.2 | 0.2 | 0.2 | 0.2 | 0.2 |
| Thioether Antioxidant 3 | — | — | — | 0.5 | 0.5 | 0.5 | 0.5 | 0.5 | 0.5 | 0.5 | 0.5 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × $10^4$ (kgf/cm$^2$) | 2.15 | 2.16 | 2.15 | 2.01 | 2.17 | 2.15 | 2.17 | 2.16 | 2.16 | 2.18 | 2.17 |

TABLE 25-continued

| | | | | | | | | | | | |
|---|---|---|---|---|---|---|---|---|---|---|---|
| Heat Distortion Temperature (°C.) | 137 | 138 | 137 | 135 | 138 | 136 | 138 | 138 | 137 | 138 | 137 |
| Izod Impact Strength (kgf-cm/cm) | 7.1 | 7.0 | 6.9 | 6.9 | 7.0 | 6.9 | 7.0 | 7.1 | 7.0 | 7.0 | 7.1 |

| | Comparative Example No. | | | | | | | | | | |
|---|---|---|---|---|---|---|---|---|---|---|---|
| Composition (part*): | 243 | 244 | 245 | 246 | 247 | 248 | 249 | 250 | 251 | 252 | 253 |
| Compound A (III) | — | — | — | — | — | — | — | — | — | — | — |
| Compound A (IV) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound B' (XXXVII) | — | — | — | — | — | — | — | — | — | — | — |
| Compound B' (XXXVIII) | — | 0.1 | — | — | — | — | 0.1 | — | — | — | — |
| Compound B' (XXXIX) | — | — | — | — | — | — | — | — | — | — | — |
| Compound B' (XL) | — | — | — | — | — | — | — | — | — | — | — |
| Compound C (XII) | — | — | — | — | — | — | — | — | — | — | — |
| Compound C (XIII) | — | — | — | — | — | — | — | — | — | — | — |
| Compound C (XIV) | — | — | — | — | — | 0.1 | — | 0.1 | 0.1 | 0.1 | 0.1 |
| Compound C (XV) | — | — | — | — | — | — | — | — | — | — | — |
| Phenol Antioxidant 10 | — | 0.2 | 0.2 | 0.2 | 0.2 | 0.2 | 0.2 | 0.2 | 0.2 | 0.2 | 0.2 |
| Thioether Antioxidant 3 | — | 0.5 | 0.5 | 0.5 | 0.5 | 0.5 | 0.5 | 0.5 | 0.5 | 0.5 | 0.5 |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | — | 0.1 | — | — | — | — |
| Flexural Modulus × 10⁴ (kgf/cm²) | 1.50 | 1.55 | 1.50 | 1.88 | 1.82 | 1.32 | 1.40 | 1.90 | 1.50 | 1.67 | 1.94 |
| Heat Distortion Temperature (°C.) | 120 | 114 | 118 | 134 | 125 | 117 | 118 | 130 | 112 | 131 | 126 |
| Izod Impact Strength (kgf-cm/cm) | 6.7 | 6.9 | 6.4 | 6.7 | 6.8 | 6.9 | 7.0 | 7.0 | 7.1 | 7.0 | 6.8 |

Note:
*Per 100 parts of a crystalline polyolefin

TABLE 26

| | Example No. | | | | | | | | | | |
|---|---|---|---|---|---|---|---|---|---|---|---|
| Composition (part*): | 254 | 255 | 256 | 257 | 258 | 259 | 260 | 261 | 262 | 263 | 264 |
| Compound A (IV) | 0.1 | — | — | — | — | — | — | 0.5 | 0.5 | 0.5 | 0.5 |
| Compound A (V) | — | 0.1 | — | — | — | — | — | 0.1 | 0.1 | 0.1 | 0.1 |
| Compound A (VII) | — | — | 0.1 | 0.7 | 0.7 | 0.7 | 0.7 | 0.1 | 0.1 | 0.1 | 0.1 |
| Compound B' (XLI) | — | — | — | 0.7 | — | — | — | 0.1 | 0.1 | 0.1 | 0.1 |
| Compound B' (XLII) | 0.1 | 0.1 | 0.1 | — | 0.7 | — | — | 0.4 | 0.4 | 0.4 | 0.4 |
| Compound B' (XLIII) | — | — | — | — | — | 0.7 | — | 0.1 | 0.1 | 0.1 | 0.1 |
| Compound B' (XLIV) | — | — | — | — | — | — | 0.7 | 0.1 | 0.1 | 0.1 | 0.1 |
| Compound C (XII) | — | — | — | — | — | — | — | 1.0 | — | — | — |
| Compound C (XVIII) | 0.1 | 0.1 | 0.1 | 1.0 | 1.0 | 1.0 | 1.0 | — | 1.0 | — | — |
| Compound C (XIX) | — | — | — | — | — | — | — | — | — | 1.0 | — |
| Compound C (XX) | — | — | — | — | — | — | — | — | — | — | 1.0 |
| Phenol Antioxidant 11 | — | — | — | 0.1 | 0.1 | 0.1 | 0.1 | 0.1 | 0.1 | 0.1 | 0.1 |
| Thioether Antioxidant 2 | — | — | — | 0.3 | 0.3 | 0.3 | 0.3 | 0.3 | 0.3 | 0.3 | 0.3 |
| Inorganic Filler 1 | 10 | 10 | 10 | 10 | 10 | 10 | 10 | 10 | 10 | 10 | 10 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 4 | — | — | — | — | — | — | — | — | — | — | — |
| Aromatic Amine | — | — | — | — | — | — | — | — | — | — | — |
| Flexural Modulus × 10⁴ (kgf/cm²) | 2.65 | 2.66 | 2.68 | 2.67 | 2.68 | 2.69 | 2.67 | 2.68 | 2.67 | 2.66 | 2.68 |
| Heat Distortion Temperature (°C.) | 146 | 146 | 145 | 147 | 146 | 147 | 148 | 147 | 147 | 146 | 148 |
| Izod Impact Strength (kgf-cm/cm) | 8.6 | 8.7 | 8.6 | 8.5 | 8.7 | 8.8 | 8.6 | 8.6 | 8.8 | 8.7 | 8.8 |

| | Comparative Example No. | | | | | | | | | | |
|---|---|---|---|---|---|---|---|---|---|---|---|
| Composition (part*): | 254 | 255 | 256 | 257 | 258 | 259 | 260 | 261 | 262 | 263 | |
| Compound A (IV) | — | — | — | — | — | — | — | — | — | — | |
| Compound A (V) | — | — | — | — | — | — | — | — | — | — | |
| Compound A (VII) | 0.1 | 0.1 | 0.1 | 0.1 | 0.1 | 0.1 | 0.1 | 0.1 | 0.1 | 0.1 | |
| Compound B' (XLI) | — | — | — | — | — | — | — | — | — | — | |
| Compound B' (XLII) | — | 0.1 | — | — | — | — | 0.1 | — | — | — | |
| Compound B' (XLIII) | — | — | — | — | — | — | — | — | — | — | |
| Compound B' (XLIV) | — | — | — | — | — | — | — | — | — | — | |
| Compound C (XII) | — | — | — | — | — | — | — | — | — | — | |
| Compound C (XVIII) | — | — | — | — | — | 0.1 | — | 0.1 | 0.1 | 0.1 | |
| Compound C (XIX) | — | — | — | — | — | — | — | — | — | — | |

TABLE 26-continued

| Compound C (XX) | — | — | — | — | — | — | — | — | — | — |
|---|---|---|---|---|---|---|---|---|---|---|
| Phenol Antioxidant 11 | — | 0.1 | 0.1 | 0.1 | 0.1 | 0.1 | 0.1 | 0.1 | 0.1 | 0.1 | 0.1 |
| Thioether Antioxidant 2 | — | 0.3 | 0.3 | 0.3 | 0.3 | 0.3 | 0.3 | 0.3 | 0.3 | 0.3 | 0.3 |
| Inorganic Filler 1 | 10 | 10 | 10 | 10 | 10 | 10 | 10 | 10 | 10 | 10 | 10 |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 4 | — | — | — | — | 0.1 | — | — | — | — | — | 0.1 |
| Aromatic Amine | — | — | — | — | — | 0.1 | — | — | — | — | — |
| Flexural Modulus × $10^4$ (kgf/cm$^2$) | 2.40 | 2.45 | 2.30 | 2.45 | 2.43 | 2.31 | 2.32 | 2.40 | 2.38 | 2.41 | 2.41 |
| Heat Distortion Temperature (°C.) | 137 | 139 | 135 | 139 | 138 | 133 | 132 | 138 | 129 | 139 | 138 |
| Izod Impact Strength (kgf-cm/cm) | 6.8 | 6.9 | 6.6 | 6.7 | 6.6 | 6.7 | 6.8 | 6.6 | 6.4 | 6.5 | 6.8 |

Note:
*Per 100 parts of a crystalline polyolefin

TABLE 27

| Composition (part*): | Example No. | | | | | | | | | | |
|---|---|---|---|---|---|---|---|---|---|---|---|
| | 265 | 266 | 267 | 268 | 269 | 270 | 271 | 272 | 273 | 274 | 275 |
| Compound A (IV) | 0.1 | — | — | — | — | — | — | 1.0 | 1.0 | 1.0 | 1.0 |
| Compound A (VI) | — | 0.1 | — | — | — | — | — | — | — | — | — |
| Compound A (VII) | — | — | 0.1 | 1.0 | 1.0 | 1.0 | 1.0 | — | — | — | — |
| Compound B' (XLV) | — | — | — | 1.0 | — | — | — | — | — | — | — |
| Compound B' (XLVI) | 0.1 | 0.1 | 0.1 | — | 1.0 | — | — | 1.0 | 1.0 | 1.0 | 1.0 |
| Compound B' (XLVII) | — | — | — | — | — | 1.0 | — | — | — | — | — |
| Compound B' (XLVIII) | — | — | — | — | — | — | 1.0 | — | — | — | — |
| Compound C (XIII) | — | — | — | — | — | — | — | 0.07 | — | — | — |
| Compound C (XVIII) | — | — | — | — | — | — | — | — | 0.07 | — | — |
| Compound C (XIX) | 0.1 | 0.1 | 0.1 | 0.07 | 0.07 | 0.07 | 0.07 | — | — | 0.07 | — |
| Compound C (XX) | — | — | — | — | — | — | — | — | — | — | 0.07 |
| Phenol Antioxidant 12 | — | — | — | 0.1 | 0.1 | 0.1 | 0.1 | 0.1 | 0.1 | 0.1 | 0.1 |
| Phosphorus Antioxidant 1 | — | — | — | 0.03 | — | — | — | — | — | 0.01 | — |
| Phosphorus Antioxidant 2 | — | — | — | — | 0.03 | — | — | — | — | 0.01 | — |
| Phosphorus Antioxidant 3 | — | — | — | — | — | 0.03 | — | — | — | 0.01 | — |
| Phosphorus Antioxidant 4 | — | — | — | — | — | — | 0.03 | — | — | — | 0.01 |
| Phosphorus Antioxidant 5 | — | — | — | — | — | — | — | 0.03 | — | — | 0.01 |
| Phosphorus Antioxidant 6 | — | — | — | — | — | — | — | — | 0.03 | — | 0.01 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 1 | — | — | — | — | — | — | — | — | — | — | — |
| Aromatic Amine | — | — | — | — | — | — | — | — | — | — | — |
| Flexural Modulus × $10^4$ (kgf/cm$^2$) | 1.51 | 1.51 | 1.50 | 1.51 | 1.50 | 1.49 | 1.40 | 1.50 | 1.51 | 1.50 | 1.51 |
| Heat Distortion Temperature (°C.) | 121 | 120 | 120 | 121 | 120 | 120 | 117 | 122 | 121 | 121 | 120 |
| Izod Impact Strength (kgf-cm/cm) | 8.4 | 8.6 | 8.5 | 8.6 | 8.4 | 8.5 | 8.6 | 8.5 | 8.5 | 8.6 | 8.5 |

| Composition (part*): | Comparative Example No. | | | | | | | | | | |
|---|---|---|---|---|---|---|---|---|---|---|---|
| | 265 | 266 | 267 | 268 | 269 | 270 | 271 | 272 | 273 | 274 | 275 |
| Compound A (IV) | — | — | — | — | — | — | — | — | — | — | — |
| Compound A (VI) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound B' (XLV) | — | — | — | — | — | — | — | — | — | — | — |
| Compound B' (XLVI) | — | 0.1 | — | — | — | — | 0.1 | — | — | — | — |
| Compound B' (XLVII) | — | — | — | — | — | — | — | — | — | — | — |
| Compound B' (XLVIII) | — | — | — | — | — | — | — | — | — | — | — |
| Compound C (XIII) | — | — | — | — | — | — | — | — | — | — | — |
| Compound C (XVIII) | — | — | — | — | — | — | — | — | — | — | — |
| Compound C (XIX) | — | — | — | — | — | 0.1 | — | 0.1 | 0.1 | 0.1 | 0.1 |
| Compound C (XX) | — | — | — | — | — | — | — | — | — | — | — |
| Phenol Antioxidant 12 | — | 0.1 | 0.1 | 0.1 | 0.1 | 0.1 | 0.1 | 0.1 | 0.1 | 0.1 | 0.1 |
| Phosphorus Antioxidant 1 | — | — | — | — | — | — | — | — | — | — | — |
| Phosphorus Antioxidant | — | — | — | — | — | — | — | — | — | — | — |

TABLE 27-continued

| | | | | | | | | | | |
|---|---|---|---|---|---|---|---|---|---|---|
| oxidant 2 | | | | | | | | | | |
| Phosphorus Anti-oxidant 3 | — | — | — | — | — | — | — | — | — | — |
| Phosphorus Anti-oxidant 4 | — | — | — | — | — | — | — | — | — | — |
| Phorphorus Anti-oxidant 5 | — | — | — | — | — | — | — | — | — | — |
| Phorphorus Anti-oxidant 6 | — | — | — | — | — | — | — | — | — | — |
| Metal Salt 1 (lubricant) | — | — | 0.1 | — | — | — | — | 0.1 | — | — |
| Metal Salt 2 (lubricant) | — | — | — | — | — | — | — | — | 0.1 | — |
| Nucleating Agent 4 | — | — | — | 0.1 | — | — | — | — | — | 0.1 | — |
| Inorganic Filler 1 | — | — | — | — | 0.1 | — | — | — | — | — | 0.1 |
| Aromatic Amine | — | — | — | — | — | 0.1 | — | — | — | — |
| Flexural Modulus ×10$^4$ (kgf/cm$^2$) | 1.18 | 1.30 | 1.21 | 1.35 | 1.31 | 1.00 | 1.07 | 1.33 | 1.15 | 1.36 | 1.33 |
| Heat Distortion Temperature (°C.) | 101 | 109 | 100 | 108 | 106 | 97 | 98 | 110 | 97 | 101 | 110 |
| Izod Impact Strength (kgf-cm/cm) | 8.1 | 8.0 | 8.0 | 7.9 | 8.1 | 8.1 | 8.1 | 8.2 | 8.1 | 8.0 | 8.1 |

Note:
*Per 100 parts of a crystalline polyolefin

TABLE 28

| Composition (part*): | Example No. | | | | | | | | | | |
|---|---|---|---|---|---|---|---|---|---|---|---|
| | 276 | 277 | 278 | 279 | 280 | 281 | 282 | 283 | 284 | 285 | 286 |
| Compound A (IV) | 0.1 | — | — | — | — | — | — | 0.3 | 0.3 | 0.3 | 0.3 |
| Compound A (VII) | — | 0.1 | — | 0.3 | 0.3 | 0.3 | 0.3 | — | — | — | — |
| Compound A (IX) | — | — | 0.1 | — | — | — | — | — | — | — | — |
| Compound B' (XLIX) | 0.1 | 0.1 | 0.1 | 0.3 | — | — | — | 0.3 | 0.3 | 0.3 | 0.3 |
| Compound B' (L) | — | — | — | — | 0.3 | — | — | — | — | — | — |
| Compound B' (LI) | — | — | — | — | — | 0.3 | — | — | — | — | — |
| Compound C (LII) | — | — | — | — | — | — | 0.3 | — | — | — | — |
| Compound C (XIV) | — | — | — | — | — | — | — | 0.8 | — | — | — |
| Compound C (XVIII) | — | — | — | — | — | — | — | — | 0.8 | — | — |
| Compound C (XIX) | — | — | — | — | — | — | — | — | — | 0.8 | — |
| Compound C (XX) | 0.1 | 0.1 | 0.1 | 0.8 | 0.8 | 0.8 | 0.8 | — | — | — | 0.8 |
| Phenol Antioxidant 13 | — | — | — | 0.07 | 0.07 | 0.07 | 0.07 | 0.07 | 0.07 | 0.07 | 0.07 |
| Inorganic Filler 1 | 15 | 15 | 15 | 15 | 15 | 15 | 15 | 15 | 15 | 15 | 15 |
| Phosphorus Anti-oxidant 1 | — | — | — | 0.05 | — | — | — | — | — | 0.01 | — |
| Phosphorus Anti-oxidant 2 | — | — | — | — | 0.05 | — | — | — | — | 0.01 | — |
| Phosphorus Anti-oxidant 3 | — | — | — | — | — | 0.05 | — | — | — | 0.01 | — |
| Phosphorus Anti-oxidant 4 | — | — | — | — | — | — | 0.05 | — | — | — | 0.01 |
| Phosphorus Anti-oxidant 5 | — | — | — | — | — | — | — | 0.05 | — | — | 0.01 |
| Phosphorus Anti-oxidant 6 | — | — | — | — | — | — | — | — | 0.05 | — | 0.01 |
| Metal Salt 1 (lubricant) | — | — | — | — | — | — | — | — | — | — | — |
| Metal Salt 2 (lubricant) | — | — | — | — | — | — | — | — | — | — | — |
| Nucleating Agent 4 | — | — | — | — | — | — | — | — | — | — | — |
| Inorganic Filler 4 | — | — | — | — | — | — | — | — | — | — | — |
| Aromatic Amine | — | — | — | — | — | — | — | — | — | — | — |
| Flexural Modulus ×10$^4$ (kgf/cm$^2$) | 2.98 | 2.99 | 2.99 | 2.98 | 2.87 | 2.85 | 2.93 | 2.97 | 2.98 | 2.98 | 2.99 |
| Heat Distortion Temperature (°C.) | 147 | 146 | 147 | 147 | 143 | 142 | 147 | 146 | 147 | 148 | 147 |
| Izod Impact Strength (kgf-cm/cm) | 7.2 | 7.3 | 7.3 | 7.2 | 7.3 | 7.1 | 7.3 | 7.2 | 7.4 | 7.3 | 7.4 |

| Composition (part*): | Comparative Example No. | | | | | | | | | | |
|---|---|---|---|---|---|---|---|---|---|---|---|
| | 276 | 277 | 278 | 279 | 280 | 281 | 282 | 283 | 284 | 285 | 286 |
| Compound A (IV) | — | — | — | — | — | — | — | — | — | — | — |
| Compound A (VII) | 0.1 | 0.1 | 0.1 | 0.1 | 0.1 | 0.1 | 0.1 | 0.1 | 0.1 | 0.1 | 0.1 |
| Compound A (IX) | — | — | — | — | — | — | — | — | — | — | — |
| Compound B' (XLIX) | — | 0.1 | — | — | — | — | 0.1 | — | — | — | — |
| Compound B' (L) | — | — | — | — | — | — | — | — | — | — | — |
| Compound B' (LI) | — | — | — | — | — | — | — | — | — | — | — |
| Compound C (LII) | — | — | — | — | — | — | — | — | — | — | — |
| Compound C (XIV) | — | — | — | — | — | — | — | — | — | — | — |
| Compound C (XVIII) | — | — | — | — | — | — | — | — | — | — | — |
| Compound C (XIX) | — | — | — | — | — | — | — | — | — | — | — |

TABLE 28-continued

| | | | | | | | | | | |
|---|---|---|---|---|---|---|---|---|---|---|
| Compound C (XX) | — | — | — | — | — | 0.1 | — | 0.1 | 0.1 | 0.1 | 0.1 |
| Phenol Antioxidant 13 | — | 0.07 | 0.07 | 0.07 | 0.07 | 0.07 | 0.07 | 0.07 | 0.07 | 0.07 | 0.07 |
| Inorganic Filler 1 | 15 | 15 | 15 | 15 | 15 | 15 | 15 | 15 | 15 | 15 | 15 |
| Phosphorus Antioxidant 1 | — | — | — | — | — | — | — | — | — | — | — |
| Phosphorus Antioxidant 2 | — | — | — | — | — | — | — | — | — | — | — |
| Phosphorus Antioxidant 3 | — | — | — | — | — | — | — | — | — | — | — |
| Phosphorus Antioxidant 4 | — | — | — | — | — | — | — | — | — | — | — |
| Phosphorus Antioxidant 5 | — | — | — | — | — | — | — | — | — | — | — |
| Phosphorus Antioxidant 6 | — | — | — | — | — | — | — | — | — | — | — |
| Metal Salt 1 (lubricant) | — | — | 0.1 | — | — | — | — | 0.1 | — | — | — |
| Metal Salt 2 (lubricant) | — | — | — | — | — | — | — | — | 0.1 | — | — |
| Nucleating Agent 4 | — | — | — | 0.1 | — | — | — | — | — | 0.1 | — |
| Inorganic Filler 4 | — | — | — | — | 0.1 | — | — | — | — | — | 0.1 |
| Aromatic Amine | — | — | — | — | — | — | 0.1 | — | — | — | — |
| Flexural Modulus ×10⁴ (kgf/cm²) | 2.70 | 2.72 | 2.70 | 2.72 | 2.71 | 2.65 | 2.66 | 2.73 | 2.70 | 2.71 | 2.74 |
| Heat Distortion Temperature (°C.) | 137 | 138 | 136 | 139 | 138 | 135 | 135 | 138 | 134 | 139 | 138 |
| Izod Impact Strength (kgf-cm/cm) | 7.0 | 7.1 | 6.2 | 6.8 | 7.2 | 7.5 | 6.8 | 6.0 | 7.1 | 7.1 | 7.2 |

Note:
*Per 100 parts of a crystalline polyolefin

The compositions of Table 3 comprise a crystalline propylene homopolymer as a crystalline polyolefin. The compositions of Examples 1 to 11 contain Compounds A and B according to the present invention. On comparing Examples 1 to 11 with Comparative Example 1 containing only Compound A, it can be seen that the compositions of the present invention have markedly improved stiffness characteristics. The compositions of Comparative Examples 2 to 4 using a conventional nucleating agent show some improvement in stiffness characteristics over Comparative Example 1 but are still insufficient as compared with the compositions of the present invention. Further, Comparative Examples 5 to 11 using a metal salt other than Compound B in combination with Compound A show substantially no improvement in stiffness characteristics in view of Comparative Example 1. Thus, none of the comparative compositions which do not contain both Compounds A and B produces effects as observed in the present invention. It is thus revealed that the improvement in stiffness characteristics as obtained in the present invention is exclusive with a combination of Compound A and Compound B with a crystalline polyolefin.

In addition, on comparing Examples 1 to 7 with Examples 8 to 11 in which Compound C is used in combination with Compounds A and B, it can be seen that significant synergistic effects of Compound C are exerted without impairing the effects of Compounds A and B in improving stiffness characteristics.

The compositions shown in Tables 4 through 15 comprise, as a crystalline polyolefin, (1) a crystalline propylene homopolymer, (2) a mixture of a crystalline propylene homopolymer, a crystalline ethylene-propylene random copolymer and a high-density ethylene homopolymer, (3) a mixture of a crystalline propylene homopolymer, a crystalline ethylene-propylene random copolymer, a crystalline ethylene-propylene-butene-1 terpolymer and a high-density ethylene-propylene copolymer or (4) a crystalline ethylene-propylene block copolymer. With respect to these compositions, the same effects as described above can be confirmed.

Further, in Tables 6, 7 and 10 to 15, it is confirmed that the compositions of the present invention are by no means inferior in impact strength to the comparative compositions, proving that improvement in stiffness characteristics brought about by compounding Compounds A and B is not attended by reduction in impact strength.

The compositions shown in Table 16 comprise a crystalline propylene homopolymer as a crystalline polyolefin. As can be seen from Table 16, Examples 144 to 154 using Compounds A, B', and C according to the present invention exhibit significantly excellent stiffness characteristics as compared with Comparative Example 144 using only Compound A. Further, the improvement in stiffness characteristics obtained in Comparative Examples 145 to 149 in which Compound A is combined with Compound B,, a compound other than Compound B' (i.e., a metal salt as lubricant, a nucleating agent or an inorganic filler) or Compound C is not sufficient as compared with Examples 144 to 154. In particular, the composition of Comparative Example 149 in which Compound A is combined with Compound C undergoes reduction in stiffness characteristics as compared with Comparative Example 144. Moreover, in Comparative Examples 150 to 154 in which an aromatic amine other than Compound C is used in place of Compound C and a compound other than Compound B' (i.e., a metal salt as lubricant, a nucleating agent or an inorganic filler) in place of Compound B,, the degree of improvement in stiffness characteristics is no more than that obtained in Comparative Examples 145 to 148. In other words, no substantial improvement in stiffness characteristics can be produced by combining Compound A and Compound B' with aromatic amines other than Compound C or combining Compound A and Compound C with compounds other than Compound B' (e.g., lubricants, nucleating agents or inorganic fillers). Accordingly, none of the comparative compositions which do not contain the three components of Compounds A, B' and C produce any improving effect, and the improvement in stiffness characteristics as observed in the present invention is an effect exclusive with a combination of Compounds A, B', and C with a crystalline polyolefin.

The compositions of Tables 17 to 28 comprise, as a crystalline polyolefin, (1) a crystalline propylene homopolymer, (2) a mixture of a crystalline propylene homopolymer, a crystalline ethylene-propylene random copolymer and a high-density ethylene homopolymer, (3) a mixture of a crystalline propylene homopolymer, a crystalline ethylene-propylene random copolymer, a crystalline ethylenepropylene-butene-1 terpolymer and a high-density ethylenepropylene copolymer or (4) a crystalline ethylene-propylene block copolymer. With respect to these compositions, too, the same effects as described above can be confirmed.

In Tables 19, 20 and 23 to 28, it can be seen that the compositions according to the present invention are by no means inferior in impact strength to the respective comparative compositions, that is, improvement in stiffness characteristics brought about by compounding Compounds A, B', and C is not attended by reduction in impact strength.

The compositions according to the present invention provide molded articles having markedly excellent stiffness characteristics. Hence, molded articles produced from the compositions of the invention can have their wall thickness reduced, which makes a contribution not only to saving of resources but also to an increase in molding rate per unit time because of an increase in cooling rate, leading to improved reproducibility.

While the invention has been described in detail and with reference to specific embodiments thereof, it will be apparent to one skilled in the art that various changes and modifications can be made therein without departing from the spirit and scope thereof.

What is claimed is:

1. A crystalline polyolefin composition comprising 100 parts by weight of a crystalline polyolefin, (A) from 0.001 to 1 part by weight of a fluorophosphite compound represented by formula (I):

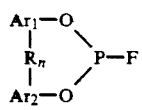

wherein R represents an alkylidene group having from 1 to 4 carbon atoms or a sulfur atom; $Ar_1$ and $Ar_2$, which may be the same or different, each represents an alkylarylene group or a cycloalkylarylene group; and n represents 0 or 1, and (B) from 0.001 to 1 part by weight of at least one compound selected from the group consisting of (1) an aliphatic monocarboxylic acid salt of lithium or sodium, (2) a dithiocarbamic acid salt of lithium, sodium or potassium, (3) a 2-mercaptobenzothiazole salt of lithium, sodium or potassium, (4) a 2-mercaptobenzimidazole salt of lithium, sodium or potassium and (5) a benzotriazole salt of lithium, sodium or potassium.

2. A composition as claimed in claim 1, wherein said fluorophosphite compound is selected from the group consisting of 2,2'-bis(4,6-di-t-butylphenyl) fluorophosphite, 2,2'-methylenebis(4-methyl-6-t-butylphenyl) fluorophosphite, 2,2'-methylenebis(4,6-di-t-butylphenyl) fluorophosphite, 2,2'-ethylidenebis(4-methyl-6-t-butylphenyl) fluorophosphite, 2,2'-ethylidenebis(4,6-di-t-butylphenyl) fluorophosphite and 2,2'-thiobis(4-methyl-6-t-butylphenyl) fluorophosphite.

3. A composition as claimed in claim 1, wherein said compound as component (B) is selected from the group consisting of lithium stearate, sodium stearate, lithium montanate, sodium montanate, lithium 12-hydroxyoctadecanoate, sodium 12-hydroxyoctadecanoate, lithium di-n-butyldithiocarbamate, sodium di-n-butyldithiocarbamate, potassium di-n-butyldithiocarbamate, lithium 2-benzothiazolethiolate, sodium 2-benzothiazolethiolate, potassium 2-benzothiazolethiolate, lithium 2-benzimidazolethiolate, sodium 2-benzimidazolethiolate, potassium 2-benzimidazolethiolate, lithium benzotriazole, sodium benzotriazole and potassium benzotriazole.

4. A composition as claimed in claim 1, wherein said composition further comprises (C) from 0.01 to 1 part by weight of an aliphatic amine per 100 parts by weight of the crystalline polyolefin.

5. A composition as claimed in claim 4, wherein said aliphatic amine is selected from the group consisting of hexamethylenetetramine, triethanolamine, triisopropanolamine, N,N-bis(2-hydroxyethyl)laurylamine, N,N-bis(2-hydroxyethyl)tridecylamine, N,N-bis(2-hydroxyethyl)myristylamine, N,N-bis(2-hydroxyethyl)pentadecylamine, N,N-bis(2-hydroxyethyl)palmitylamine, N,N-bis(2-hydroxyethyl)stearylamine, N,N-bis(2-hydroxyethyl)oleylamine, N,N-bis(2-hydroxyethyl)docosylamine, N,N-bis(2-hydroxyethyl)octacosylamine, N,N-bis(2-hydroxyethyl)cocoamine and N,N-bis(2-hydroxyethyl)tallowamine.

6. A composition as claimed in claim 1, wherein said composition further comprises from 0.01 to 25 parts by weight of an inorganic filler per 100 parts by weight of the crystalline polyolefin.

7. A composition as claimed in claim 6, wherein said inorganic filler is selected from the group consisting of talc, mica, clay, wollastonite, zeolite, kaolin, bentonite, perlite, diatomaceous earth, asbestos, calcium carbonate, aluminum hydroxide, magnesium hydroxide, silicon dioxide, titanium dioxide, zinc oxide, magnesium oxide, zinc sulfide, barium sulfate, calcium silicate, aluminum silicate, glass fibers, potassium titanate, carbon fibers, carbon black, graphite and metallic fibers.

8. A composition as claimed in claim 1, wherein said crystalline polyolefin is a crystalline propylene homopolymer whose isotactic pentad ratio (P) and melt flow rate (MFR; output of a molten resin per 10 minutes at 230° C. under a load of 2.16 kg) satisfy a relationship of $1.00 \geq P \geq 0.015 \log MFR + 0.955$.

9. A composition as claimed in claim 1, wherein said crystalline polyolefin is a crystalline ethylene-propylene block copolymer having an ethylene content of from 3 to 20% by weight which is obtained by polymerizing propylene to prepare a propylene homopolymer whose isotactic pentad ratio (P) and melt flow rate (MFR) satisfy a relationship of $1.00 \geq P \geq 0.015 \log MFR + 0.955$, said propylene homopolymer being in a proportion of from 70 to 95% by weight based on the total polymer, and then polymerizing from 5 to 30% by weight, based on the total polymer, of ethylene or a mixture of ethylene and propylene through one or more stages.

10. A crystalline polyolefin composition comprising 100 parts by weight of a crystalline polyolefin, (A) from 0.001 to 1 part by weight of a fluorophosphite compound represented by formula (I):

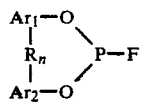

(I)

wherein R represents an alkylidene group having from 1 to 4 carbon atoms or a sulfur atom; $Ar_1$ and $Ar_2$, which may be the same or different, each represents an alkylarylene group or a cycloalkylarylene group; and n represents 0 or 1, (B') from 0.001 to 1 part by weight of at least one compound selected from the group consisting of (1) an aliphatic monocarboxylic acid salt of potassium, strontium or barium, (2) a hydroxy-higher fatty acid salt of potassium, strontium or barium, (3) an aliphatic polycarboxylic acid salt of lithium, sodium, potassium, strontium or barium, (4) a salt of an aliphatic hydroxy acid having from 2 to 6 carbon atoms with lithium, sodium, potassium, magnesium, strontium or barium, (5) an aromatic carboxylic acid salt of lithium, sodium, strontium, barium or aluminum, (6) a glutamic acid salt of lithium, sodium, potassium, strontium or barium, (7) an aliphatic phosphoric acid salt of sodium, potassium, calcium, strontium or barium, (8) a lithium, sodium, potassium or barium salt of a cyclic phosphorus compound represented by formula (II):

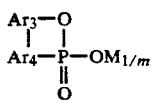

(II)

wherein $Ar_3$ and $Ar_4$, which may be the same or different, each represents an arylene group, an alkylarylene group, a cycloalkylarylene group, an arylarylene group or an aralkylarylene group; M represents lithium, sodium, potassium or barium; and m represents an atomic valence of M, (9) magnesium or aluminum hydroxide, (10) magnesium oxide, (11) magnesium or calcium carbonate and (12) hydrotalcite, and (C) from 0.01 to 1 part by weight of an aliphatic amine.

11. A composition as claimed in claim 10, wherein said fluorophosphite compound is selected from the group consisting of 2,2'-bis(4,6-di-t-butylphenyl) fluorophosphite, 2,2'-methylenebis(4-methyl-6-t-butylphenyl) fluorophosphite, 2,2'-methylenebis(4,6-di-t-butylphenyl) fluorophosphite, 2,2'-ethylidenebis(4-methyl-6-t-butylphenyl) fluorophosphite, 2,2'-ethylidenebis(4,6-di-t-butylphenyl) fluorophosphite and 2,2'-thiobis(4-methyl-6-t-butylphenyl) fluorophosphite.

12. A composition as claimed in claim 10, wherein said compound as component B' is selected from the group consisting of potassium stearate, strontium stearate, barium stearate, potassium 12-hydroxyoctadecanoate, strontium 12-hydroxyoctadecanoate, barium 12-hydroxyoctadecanoate, lithium adipate, sodium adipate, potassium adipate, strontium adipate, barium adipate, lithium lactate, sodium lactate, potassium lactate, magnesium lactate, strontium lactate, barium lactate, lithium citrate, sodium citrate, potassium citrate, magnesium citrate, strontium citrate, barium citrate, lithium benzoate, sodium benzoate, strontium benzoate, barium benzoate, aluminum p-t-butylbenzoate, monolithium glutamate, monosodium glutamate, monopotassium glutamate, strontium glutamate, barium glutamate, sodium (mono- and di-mixed) stearyl phosphate, potassium (mono-and di-mixed) stearylphosphate, calcium (mono- and di-mixed) stearylphosphate, strontium (mono- and di-mixed) stearylphosphate, barium (mono- and dimixed) stearylphosphate, 10-hydroxy-9,10-dihydro-9-oxa-10-phosphaphenanthrene-10-oxide lithium salt, 10-hydroxy-9,10-dihydro-9-oxa-10-phosphaphenanthrene-10-oxide sodium salt, 10-hydroxy-9,10-dihydro-9-oxa-10-phosphaphenanthrene-10-oxide potassium salt, 10-hydroxy-9,10-dihydro-9-oxa-10-phosphaphenanthrene-10-oxide barium salt, magnesium hydroxide, aluminum hydroxide, magnesium oxide, magnesium carbonate, calcium carbonate and hydrotalcite.

13. A composition as claimed in claim 10, wherein said aliphatic amine is selected from the group consisting of hexamethylenetetramine, triethanolamine, triisopropanolamine, N,N-bis(2-hydroxyethyl)laurylamine, N,N-bis(2-hydroxyethyl)tridecylamine, N,N-bis(2-hydroxyethyl)myristylamine, N,N-bis(2-hydroxyethyl)pentadecylamine, N,N-bis(2-hydroxyethyl)palmitylamine, N,N-bis(2-hydroxyethyl)stearylamine, N,N-bis(2-hydroxyethyl)oleylamine, N,N-bis(2-hydroxyethyl)docosylamine, N,N-bis(2-hydroxyethyl)octacosylamine, N,N-bis(2-hydroxyethyl)cocoamine and N,N-bis(2-hydroxyethyl)tallowamine.

14. A composition as claimed in claim 10, wherein said composition further comprises from 0.01 to 25 parts by weight of an inorganic filler exclusive of magnesium hydroxide, aluminum hydroxide, magnesium oxide, magnesium carbonate and calcium carbonate per 100 parts by weight of the crystalline polyolefin.

15. A composition as claimed in claim 14, wherein said inorganic filler is selected from the group consisting of talc, mica, clay, wollastonite, zeolite, kaolin, bentonite, perlite, diatomaceous earth, asbestos, silicon dioxide, titanium dioxide, zinc oxide, zinc sulfide, barium sulfate, calcium silicate, aluminum silicate, glass fibers, potassium titanate, carbon fibers, carbon black, graphite and metallic fibers.

16. A composition as claimed in claim 10, wherein said crystalline polyolefin is a crystalline propylene homopolymer whose isotactic pentad ratio (P) and melt flow rate (MFR; output of a molten resin per 10 minutes at 230° C. under the load of 2.16 kg) satisfy a relationship of $1.00 \geq P \geq 0.015 \log MFR + 0.955$.

17. A composition as claimed in claim 10, wherein said crystalline polyolefin is a crystalline ethylene-propylene block copolymer having an ethylene content of from 3 to 20% by weight which is obtained by polymerizing propylene to prepare a propylene homopolymer whose isotactic pentad ratio (P) and melt flow rate (MFR) satisfy a relationship of $1.00 \geq P \geq 0.015 \log MFR + 0.955$, said propylene homopolymer being in a proportion of from 70 to 95% by weight based on the total polymer, and then polymerizing from 5 to 30% by weight, based on the total polymer, of ethylene or a mixture of ethylene and propylene through one or more stages.

18. A composition as claimed in claim 1, wherein said composition further comprises at least one of an antioxidant excluding the fluorophosphite compound as Component A, a light stabilizer and a metal deactivator.

19. A composition as claimed in claim 10, wherein said composition further comprises at least one of an antioxidant excluding the fluorophosphite compound as Component A, a light stabilizer and a metal deactivator.

20. A composition as claimed in claim 1, wherein said composition further comprises from 0.01 to 1 part by weight, per 100 parts by weight of the crystalline polyolefin, of an antioxidant selected from the group consisting of 2,6-di-t-butyl-p-cresol, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl)benzene, tris(3,5-di-t-butyl-4-hydroxybenzyl) isocyanurate, n-octadecyl-β-(4'-hydroxy-3',5'-di-t-butylphenyl) propionate, tris(4-t-butyl-3-hydroxy-2,6-dimethylbenzyl) isocyanurate, 3,9-bis[1,1-dimethyl-2-{β-(3-t-butyl-4-hydroxy-5-methylphenyl)propionyloxy}ethyl]-2,4,8,10-tetraoxaspiro[5.5]undecane, 2,2-bis[4-{2-(3,5-di-t-butyl-4-hydroxyphenylpropionyloxy)ethoxy}phenyl]propane, bis[2-(3'-t-butyl-2'-hydroxy-5'-methylbenzyl)-6-t-butyl-4-methylphenyl] terephthalate, bis[3,3-bis(4'-hydroxy-3'-t-butylphenyl)butyric acid] ethylene glycol ester, 2,2-thio-diethylenebis[3-(3,5-di-t-butyl-4-hydroxyphenyl) propionate], 4,4'-thiobis(6-t-butyl-3-methylphenol), 2,2'-methylenebis(6-t-butyl-4-methylphenol), 2,2'-ethylidenebis(4,6-di-t-butylphenol), calcium bis[O-ethyl-(3,5-di-t-butyl-4-hydroxybenzyl) phosphonate], 2-t-butyl-6-(3-t-butyl-2-hydroxy-5-methylbenzyl)-4-methylphenol acrylate, tocopherol, dilauryl thiodipropionate, dimyristyl thiodipropionate, distearyl thiodipropionate, pentaerythritol tetrakis(3-laurylthiopropionate), distearyl disulfide, distearylpentaerythritol diphosphite, bis(2,4-di-t-butylphenyl)-pentaerythritol diphosphite, bis(2,6-di-t-butyl-4-methylphenyl)pentaerythritol diphosphite, bis(2,4,6-tri-t-butylphenyl)pentaerythritol diphosphite, tetrakis(2,4-di-t-butylphenyl)-4,4'-biphenylene diphosphonite, tris(2,4-di-t-butylphenyl) phosphite and 2,2'-methylenebis(4,6-di-t-butylphenyl)octyl phosphite.

21. A composition as claimed in claim 10, wherein said composition further comprises from 0.01 to 1 part by weight, per 100 parts by weight of the crystalline polyolefin, of an antioxidant selected from the group consisting of 2,6-di-t-butyl-p-cresol, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl)benzene, tris(3,5-di-t-butyl-4-hydroxybenzyl) isocyanurate, n-octadecyl-β-(4'-hydroxy-3',5'-di-t-butylphenyl) propionate, tris(4-t-butyl-3-hydroxy-2,6-dimethylbenzyl) isocyanurate, 3,9-bis[1,1-dimethyl-2-{β-(3-t-butyl-4-hydroxy-5-methylphenyl)propionyloxy}ethyl]-2,4,8,10-tetraoxaspiro[5.5]undecane, 2,2-bis[4-{2-(3,5-di-t-butyl-4-hydroxyphenylpropionyloxy)ethoxy}phenyl]propane, bis[2-(3'-t-butyl-2'-hydroxy-5'-methylbenzyl)-6-t-butyl-4-methylphenyl] terephthalate, bis[3,3-bis(4'-hydroxy-3'-t-butylphenyl)butyric acid] ethylene glycol ester, 2,2-thio-diethylenebis[3-(3,5-di-t-butyl-4-hydroxyphenyl) propionate], 4,4'-thiobis(6-t-butyl-3-methylphenol), 2,2'-methylenebis(6-t-butyl-4-methylphenol), 2,2'-ethylidenebis(4,6-di-t-butylphenol), calcium bis[O-ethyl-(3,5-di-t-butyl-4-hydroxybenzyl) phosphonate], 2-t-butyl-6-(3-t-butyl-2-hydroxy-5-methylbenzyl)-4-methylphenyl acrylate, tocopherol, dilauryl thiodipropionate, dimyristyl thiodipropionate, distearyl thiodipropionate, pentaerythritol tetrakis(3-laurylthiopropionate), distearyl disulfide, distearylpentaerythritol diphosphite, bis(2,4-di-t-butylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, tetrakis(2,4-di-t-butylphenyl)-4,4'-biphenylene diphosphonite, tris(2,4-di-t-butylphenyl) phosphite and 2,2'-methylenebis(4,6-di-t-butylphenyl)octyl phosphite.

22. A composition as claimed in claim 1, wherein said composition further comprises from 0.01 to 1 part by weight, per 100 parts by weight of the crystalline polyolefin, of a light stabilizer selected from the group consisting of 2-hydroxy-4-n-octoxybenzophenone, 2-(2'-hydroxy-3'-t-butyl-5'-methylphenyl)-5chlorobenzotriazole, 2-(2'-hydroxy-3',5'-di-t-butylphenyl)-5-chlorobenzotriazole, 2,4-di-t-butylphenyl 3',5'-di-t-butyl-4'-hydroxybenzoate, n-hexadecyl 3,5-di-t-butyl-4-hydroxybenzoate, bis(2,2,6,6-tetramethyl-4-piperidyl) succinate, bis(1,2,2,6,6-pentamethyl-4-piperidyl) succinate, bis(2,2,6,6-tetramethyl-4-piperidyl) sebacate, bis(1,2,2,6,6-pentamethyl-4-piperidyl) sebacate, bis(2,2,6,6-tetramethyl-4-piperidyl) 1,5-dioxaspiro[5.5]undecane-3,3-dicarboxylate, bis(1,2,2,6,6-pentamethyl-4-piperidyl) 1,5-dioxaspiro[5.5]undecane-3,3-dicarboxylate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane, poly[[6-[(1,1,3,3-tetramethylbutyl)imino]-1,3,5-triazine-2,4-diyl] [(2,2,6,6-tetramethyl-4-piperidyl)imino] hexamethylene [(2,2,6,6-tetramethyl-4-piperidyl)imino]], poly[[6-morpholino-1,3,5-triazine-2,4-diyl] [(2,2,6,6-tetramethyl-4-piperidyl)imino] hexamethylene[(2,2,6,6-tetramethyl-4-piperidyl)imino]] and 1,5,8,12-tetrakis[4,6-bis(N-(1,2,2,6,6-pentamethyl-4-piperidyl)butylamino)-1,3,5-triazine-2-yl]-1,5,8,12-tetraazadodecane.

23. A composition as claimed in claim 10, wherein said composition further comprises from 0.01 to 1 part by weight, per 100 parts by weight of the crystalline polyolefin, of a light stabilizer selected from the group consisting of 2-hydroxy-4-n-octoxybenzophenone, 2-(2'-hydroxy-3'-t-butyl-5'-methylphenyl)-5-chlorobenzotriazole, 2-(2'-hydroxy-3', 5'-di-t-butylphenyl)-5-chlorobenzotriazole, 2,4-di-t-butylphenyl 3',5'-di-t-butyl-4'-hydroxybenzoate, n-hexadecyl 3,5-di-t-butyl-4-hydroxybenzoate, bis(2,2,6,6-tetramethyl-4-piperidyl) succinate, bis(1,2,2,6,6-pentamethyl-4-piperidyl) succinate, bis(2,2,6,6-tetramethyl-4-piperidyl) sebacate, bis(1,2,2,6,6-pentamethyl-4-piperidyl) sebacate, bis(2,2,6,6-tetramethyl-4-piperidyl) 1,5-dioxaspiro[5.5]undecane-3,3-dicarboxylate, bis(1,2,2,6,6-pentamethyl-4-piperidyl) 1,5-dioxaspiro[5.5]undecane-3,3-dicarboxylate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane, poly[[6-[(1,1,3,3-tetramethylbutyl)imino]-1,3,5-triazine-2,4-diyl] [(2,2,6,6-tetramethyl-4-piperidyl)imino] hexamethylene[(2,2,6,6-tetramethyl-4-piperidyl)imino]], poly[[6-morpholino-1,3,5-triazine-2,4-diyl] ](2,2,6,6-tetramethyl-4-piperidyl)imino] hexamethylene-[(2,2,6,6-tetramethyl-4-piperidyl)imino]]and 1,5,8,12-tetrakis[4,6-bis(N-(1,2,2,6,6-pentamethyl-4-piperidyl)butylamino)-1,3,5-triazine-2-yl]-1,5,8,12-tetraazadodecane.

* * * * *